United States Patent
Hanratty et al.

(10) Patent No.: US 12,444,506 B2
(45) Date of Patent: *Oct. 14, 2025

(54) SYSTEMS AND METHODS FOR AUTOMATED SEGMENTATION OF PATIENT SPECIFIC ANATOMIES FOR PATHOLOGY SPECIFIC MEASUREMENTS

(71) Applicant: Axial Medical Printing Limited, Belfast (GB)

(72) Inventors: Rory Hanratty, Belfast (GB); Daniel Crawford, Belfast (GB); Martin Jaere, Belfast (GB); Luis Trindade, Craigavon (GB); Thomas Schwarz, Sussex (GB); Adam Harpur, Bangor (GB)

(73) Assignee: Axial Medical Printing Limited, Belfast (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/959,412

(22) Filed: Nov. 25, 2024

(65) Prior Publication Data

US 2025/0095864 A1    Mar. 20, 2025

Related U.S. Application Data

(63) Continuation-in-part of application No. 18/407,286, filed on Jan. 8, 2024, now Pat. No. 12,154,691, which
(Continued)

(30) Foreign Application Priority Data

Feb. 11, 2021  (GB) .................................. 2101908.8

(51) Int. Cl.
*G16H 50/50*    (2018.01)
*G06T 7/00*     (2017.01)
(Continued)

(52) U.S. Cl.
CPC ........... *G16H 50/50* (2018.01); *G06T 7/0016* (2013.01); *G06T 7/62* (2017.01); *G06T 15/04* (2013.01);
(Continued)

(58) Field of Classification Search
CPC ........ G16H 50/50; G16H 30/40; G06V 10/26; G06V 10/764; G06V 20/70;
(Continued)

(56) References Cited

U.S. PATENT DOCUMENTS 5,859,891 A    1/1999  Hibbard
9,437,119 B1   9/2016  Bernal
(Continued)

FOREIGN PATENT DOCUMENTS

CN    105051784 A    11/2015
CN    105608728 A     5/2016
(Continued)

OTHER PUBLICATIONS

U.S. Appl. No. 16/341,554 / U.S. Pat. No. 11,497,557, filed Apr. 12, 2019 / Nov. 15, 2022.
(Continued)

*Primary Examiner* — Sing-Wai Wu
(74) *Attorney, Agent, or Firm* — Greenberg Traurig, LLP; Christopher C. Bolten; Albert K. Heng

(57) ABSTRACT

Systems and methods are provided for multi-schema analysis of patient specific anatomical features from medical images. The system may receive medical images of a patient and metadata associated with the medical images indicative of a selected pathology, and automatically classify the medical images using a segmentation algorithm. The system may use an anatomical landmark detection algorithm leveraging Deep Reinforcement Learning (DRL) techniques to automatically locate one or more anatomical landmarks
(Continued)

associated with the patient specific anatomical feature within the medical images. A 3D surface mesh model may be generated representing the patient specific anatomical features including the located one or more anatomical landmarks. The located one or more anatomical landmarks may be used to guide placement of a 3D model of a medical device that may be fused with the 3D surface mesh model to generate a patient specific 3D model of the medical device.

30 Claims, 40 Drawing Sheets

Related U.S. Application Data is a continuation of application No. 18/131,859, filed on Apr. 6, 2023, now Pat. No. 11,869,670, which is a continuation of application No. 17/662,802, filed on May 10, 2022, now Pat. No. 11,626,212, which is a continuation of application No. PCT/IB2022/051216, filed on Feb. 10, 2022.

(51) Int. Cl.
  *G06T 7/62* (2017.01)
  *G06T 15/04* (2011.01)
  *G06T 15/06* (2011.01)
  *G06T 17/20* (2006.01)
  *G06V 10/26* (2022.01)
  *G06V 10/764* (2022.01)
  *G06V 20/70* (2022.01)
  *G16H 30/40* (2018.01)

(52) U.S. Cl.
  CPC .............. *G06T 15/06* (2013.01); *G06T 17/20* (2013.01); *G06V 10/26* (2022.01); *G06V 10/764* (2022.01); *G06V 20/70* (2022.01); *G16H 30/40* (2018.01); *G06T 2210/21* (2013.01); *G06T 2210/41* (2013.01); *G06V 2201/03* (2022.01)

(58) Field of Classification Search
  CPC ..... G06V 2201/03; G06T 7/0016; G06T 7/62; G06T 15/04; G06T 15/06; G06T 17/20; G06T 2210/21; G06T 2210/41
  See application file for complete search history.

(56) References Cited

U.S. PATENT DOCUMENTS

| | | | |
|---|---|---|---|
| 9,646,411 | B2 | 5/2017 | Lee |
| 10,032,281 | B1 | 7/2018 | Ghesu et al. |
| 10,409,235 | B2 | 9/2019 | Zhou et al. |
| 10,946,586 | B2 | 3/2021 | Casey et al. |
| 10,981,680 | B2 | 4/2021 | Colson et al. |
| 11,010,800 | B2 | 5/2021 | Norman |
| 11,059,228 | B2 | 7/2021 | Elber et al. |
| 11,138,790 | B2 | 10/2021 | Haslam et al. |
| 11,288,865 | B2 | 3/2022 | Haslam et al. |
| 11,436,801 | B2 | 9/2022 | Haslam et al. |
| 11,497,557 | B2 | 11/2022 | Haslam et al. |
| 11,551,420 | B2 | 1/2023 | Haslam et al. |
| 11,626,212 | B2 | 4/2023 | Crawford et al. |
| 11,715,210 | B2 | 8/2023 | Haslam et al. |
| 11,869,670 | B2 | 1/2024 | Crawford et al. |
| 11,922,631 | B2 | 3/2024 | Haslam et al. |
| 12,020,375 | B2 | 6/2024 | Haslam et al. |
| 2009/0316975 | A1 | 12/2009 | Kunz et al. |
| 2010/0156904 | A1 | 6/2010 | Hartung |
| 2011/0038516 | A1 | 2/2011 | Koehler et al. |
| 2011/0218428 | A1 | 9/2011 | Westmoreland et al. |
| 2012/0059252 | A1 | 3/2012 | Li et al. |
| 2012/0224755 | A1 | 9/2012 | Wu |
| 2013/0002646 | A1 | 1/2013 | Lin et al. |
| 2014/0328529 | A1 | 11/2014 | Koceski et al. |
| 2014/0361453 | A1 | 12/2014 | Triantafyllou |
| 2015/0089337 | A1 | 3/2015 | Grady et al. |
| 2015/0169985 | A1 | 6/2015 | Burger et al. |
| 2015/0231417 | A1* | 8/2015 | Metcalf ..................... A61N 7/02 601/3 |
| 2015/0342537 | A1 | 12/2015 | Taylor et al. |
| 2016/0086078 | A1 | 3/2016 | Ji et al. |
| 2016/0110517 | A1 | 4/2016 | Taylor |
| 2016/0300350 | A1 | 10/2016 | Choi et al. |
| 2017/0007129 | A1 | 1/2017 | Kaib et al. |
| 2017/0228505 | A1 | 8/2017 | Allen et al. |
| 2017/0245821 | A1 | 8/2017 | Itu et al. |
| 2017/0329930 | A1 | 11/2017 | Fonte et al. |
| 2017/0333604 | A1* | 11/2017 | Cohn ..................... A61L 27/18 |
| 2018/0028265 | A1 | 2/2018 | Azevedo et al. |
| 2018/0092699 | A1 | 4/2018 | Finley |
| 2018/0165867 | A1 | 6/2018 | Kuhn et al. |
| 2018/0276815 | A1 | 9/2018 | Xu et al. |
| 2018/0365835 | A1 | 12/2018 | Yan et al. |
| 2019/0053855 | A1 | 2/2019 | Siemionow et al. |
| 2019/0105009 | A1 | 4/2019 | Siemionow et al. |
| 2019/0108635 | A1 | 4/2019 | Hibbard et al. |
| 2019/0205606 | A1 | 7/2019 | Zhou et al. |
| 2019/0251694 | A1 | 8/2019 | Han et al. |
| 2019/0392942 | A1 | 12/2019 | Sorenson et al. |
| 2020/0074637 | A1 | 3/2020 | Wong |
| 2020/0367970 | A1 | 11/2020 | Qiu et al. |
| 2020/0402647 | A1 | 12/2020 | Domracheva et al. |
| 2021/0068714 | A1 | 3/2021 | Crowley et al. |
| 2021/0074425 | A1 | 3/2021 | Carter et al. |
| 2021/0097690 | A1 | 4/2021 | Mostapha et al. |
| 2021/0110605 | A1 | 4/2021 | Haslam et al. |
| 2021/0335041 | A1 | 10/2021 | Haslam et al. |
| 2023/0281842 | A1 | 9/2023 | Ribeiro et al. |
| 2024/0005504 | A1 | 1/2024 | Ribeiro et al. |

FOREIGN PATENT DOCUMENTS

| | | |
|---|---|---|
| CN | 106373168 A | 2/2017 |
| CN | 106456125 A | 2/2017 |
| CN | 108601552 A | 9/2018 |
| EP | 3020537 A1 | 5/2016 |
| WO | WO-2016161198 A1 | 10/2016 |
| WO | WO-2018069736 A1 | 4/2018 |
| WO | WO-2018222779 A1 | 12/2018 |
| WO | WO-2020144483 A1 | 7/2020 |
| WO | WO-2023096516 A1 | 6/2023 |

OTHER PUBLICATIONS

U.S. Appl. No. 17/115,102 / U.S. Pat. No. 11,138,790, filed Dec. 8, 2020 / Oct. 5, 2021.
U.S. Appl. No. 17/372,087 / U.S. Pat. No. 11,436,801, filed Jul. 9, 2021 / Sep. 6, 2022.
U.S. Appl. No. 17/491,183 / U.S. Pat. No. 11,288,865, filed Sep. 30, 2021 / Mar. 26, 2022.
U.S. Appl. No. 17/656,189 / U.S. Pat. No. 11,551,420, filed Mar. 23, 2022 / Jan. 10, 2023.
U.S. Appl. No. 17/662,802 / U.S. Pat. No. 11,626,212, filed May 10, 2022 / Apr. 11, 2023.
U.S. Appl. No. 17/929,702 / U.S. Pat. No. 12,020,375, filed Sep. 4, 2022 / Jun. 25, 2024.
U.S. Appl. No. 18/131,859 / U.S. Pat. No. 11,869,670, filed Apr. 6, 2023 / Jan. 9, 2024.
U.S. Appl. No. 18/150,112 / U.S. Pat. No. 11,715,210, filed Jan. 4, 2023 / Aug. 1, 2023.
U.S. Appl. No. 18/359,821 / U.S. Pat. No. 11,922,631, filed Jul. 26, 2023 / Mar. 5, 2024.
U.S. Appl. No. 18/407,286 / U.S. Pat. No. 12,154,691, filed Jan. 8, 2024 / Nov. 26, 2024.
U.S. Appl. No. 18/595,213, filed Mar. 4, 2024.
U.S. Appl. No. 18/751,032, filed Jun. 21, 2024.

(56) References Cited

OTHER PUBLICATIONS

Aisaeed et al., "A Novel Fast Otsu Digital Image Segmentation Method," The International Arab Journal of Information Technology, vol. 13(4):427-433 (Jul. 2016).

Baghaie, et al., An Optimization Method For Slice Interpolation of Medical Images, arXiv preprint arXiv:1402.0936 (Feb. 2014).

Boulton, et al., Lessons from the National Hip Fracture Database, Orthopaedics and Trauma, 30(2):123-127 (Apr. 2016).

Brown, et al., Using Machine Learning for Sequence-Level Automated MRI Protocol Selection in Neuroradiology, Journal of the American Medical Informatics Association, 25(5):568-71 (May 2018).

Carvalho, et al., Estimating 3D lumen centerlines of carotid arteries in free-hand acquisition ultrasound, International Journal of Computer Assisted Radiology and Surgery, 7(2):207-215 (Mar. 2012).

Cui, et al., Brain MRI Segmentation with Patch-Based CNN Approach, Proceedings of the 35th Chinese Control Conference, Jul. 27-29, 2016, pp. 7026-7031.

Dou, et al., 3D Deeply Supervised Network For Automated Segmentation of Volumetric Medical Images, Medical Image Analysis, 41:40-54 (Oct. 2017).

Geremia, et al., Spatial Decision Forests for MS Lesion Segmentation in Multi-Channel Magnetic Resonance Images, NeuroImage, 57(2):378-390 (Jul. 2011).

Heckelman, et al., "Design and validation of a semi-automatic bone segmentation algorithm from MRI to improve research efficiency," Scientific Reports, vol. 12:7825, https://doi.org/10.1038/s41598-022-11785-6 (2022).

International Search Report & Written Opinion dated Feb. 16, 2018 in Int'l PCT Patent Appl. Serial No. PCT/GB2017/053125 (0110).

International Search Report & Written Opinion dated May 12, 2022 in Int'l PCT Patent Appl. Serial No. PCT/IB2022/051216 (0310).

International Search Report & Written Opinion dated Jun. 25, 2020 in Int'l PCT Patent Appl. Serial No. PCT/GB2020/050063 (0210).

Laosai et al., Acute Leukemia Classification by Using SVM and K-Means Clustering, 2014 Proceedings of the International Electrical Engineering Congress (IEECON), pp. 1-4 (Mar. 19, 2014).

Lee, et al., Human Airway Measurement from CT Images. In Medical Imaging 2008: Computer-Aided Diagnosis, Proc. SPIE 6915:386-383 (Mar. 2008).

Litjens, et al., A Survey on Deep Learning in Medical Image Analysis, Medical Image Analysis, 42:60-88 (Dec. 2017).

Milletari, et al., V-Net: Fully Convolutional Neural networks For Volumetric Medical Image Segmentation, arXiv preprint arXiv: 1606.04797 (Jun. 2016).

Monteiro et al., "Conditional Random Fields as Recurrent Neural Networks for 3D Medical Imaging Segmentation," arXiv preprint arXiv:1807.07464, (Jul. 2019).

Mortensen et al., "Semantic Segmentation of Mixed Crops Using Deep Convolutional Neural Network," CIGr-AgEng Conference, pp. 26-29, (Jun. 2016).

Pinheiro et al., A new Level-Set-Based Protocol for Accurate Bone Segmentation from CT Imaging, IEEE Access, vol. 3:1894-1906 (Sep. 2015).

Richmond et al., "Mapping Stacked Decision Forests to Deep and Sparse Convolution Neural Networks for Semantic Segmentation," arXiv, pp. 1-15 (Dec. 2015).

Rogowska, et al., Overview and Fundamentals of Medical Image Segmentation, Handbook of Medical Imaging, Processing and Analysis, pp. 69-85 (Oct. 2000).

Schmauss D., et al., "Three-Dimensional Printing in Cardiac Surgery and Interventional Cardiology: A Single-Centre Experience," European Journal of Cardio-Thoracic Surgery, Aug. 26, 2014, vol. 47(6), pp. 1044-1052.

Tabrizi, et al., "Acetabular cartilage segmentation in CT arthrography based on a bone-normalized probabilistic atlas," Int J Cars, vol. 10:433-446 (2015).

Yu, et al., 3D FractalNet: Dense Volumetric Segmentation for Cardiovascular MRI Volumes, In Reconstruction, Segmentation, and Analysis of Medical Images, pp. 103-110 (Oct. 2016).

Yu, et al., 3D FractaNet: dense volumetric segmentation for cardiovascular MRI volumes. In Reconstruction, Segmentation, and Analysis of Medical Images. First International Workshops, RAMBO 2016 and HVSMR 2016. Held in Conjunction with MICCAI 2016, Athens, Greece, Oct. 17, 2016, Revised Select.

Zhou, et al., Deep convolutional neural network for segmentation of knee joint anatomy, Mag. Reson. Med., 80(6):2759-2770 (Dec. 2018).

Zhuang, J., "Laddernet: Multi-Path Networks based on U-Net For Medical Image Segmentation," arXiv:preprint arXiv:1810.07810., pp. 1-4, (Oct. 2018).

\* cited by examiner

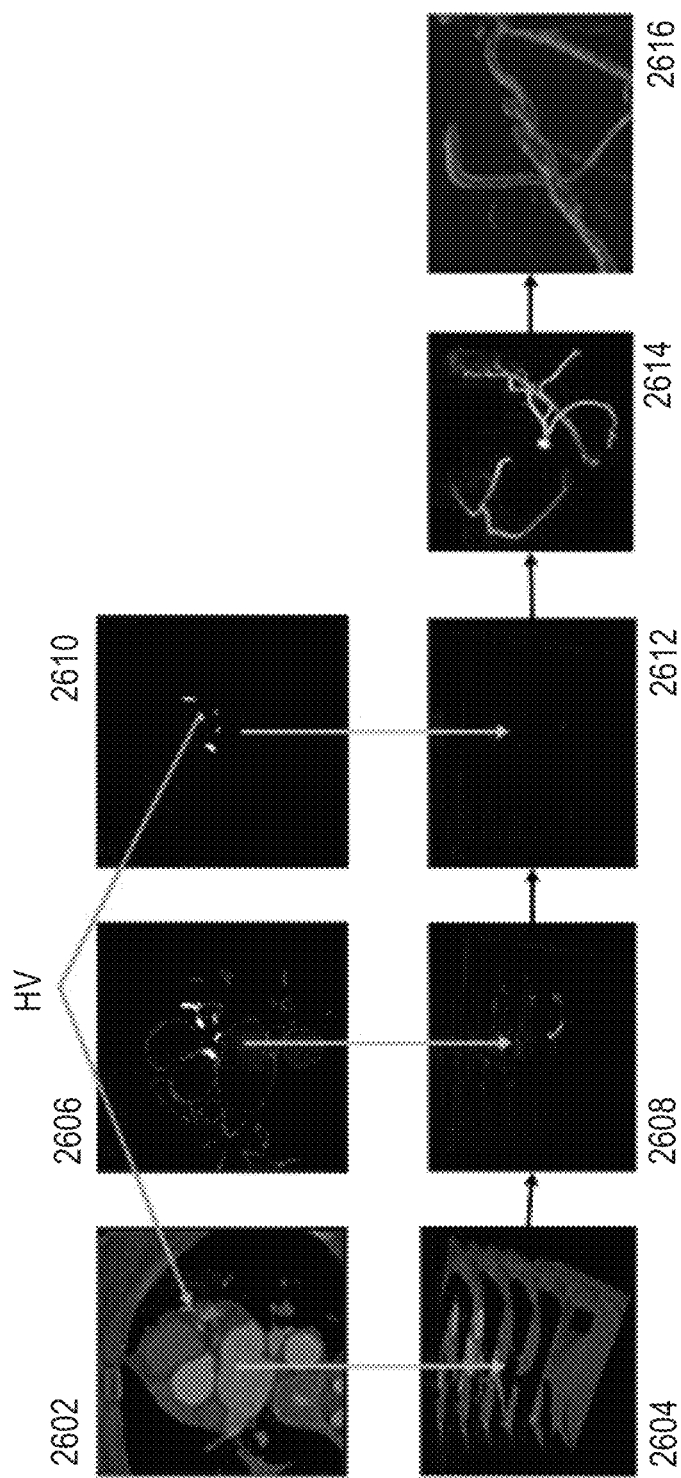

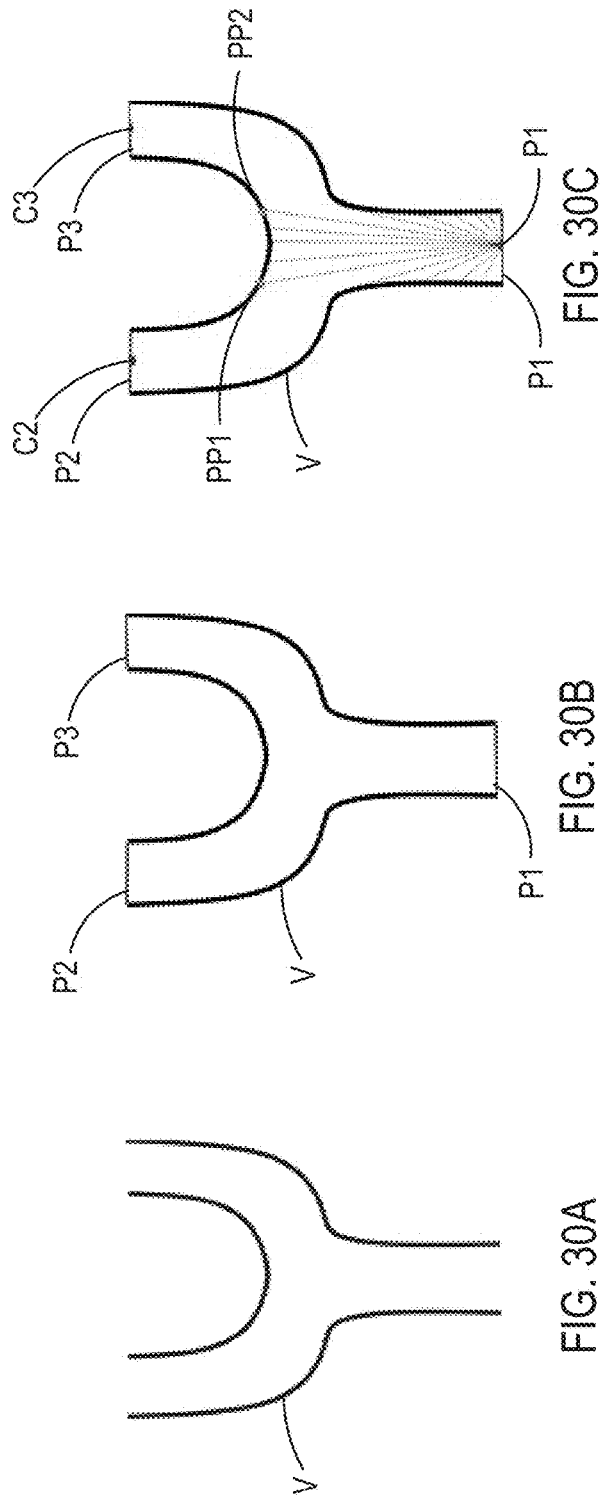
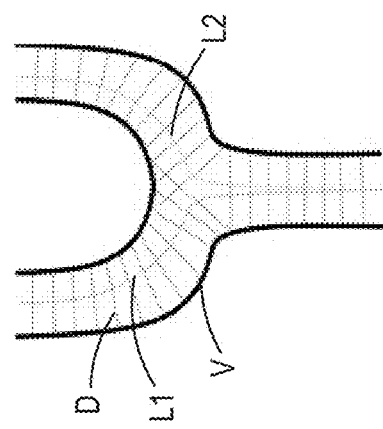
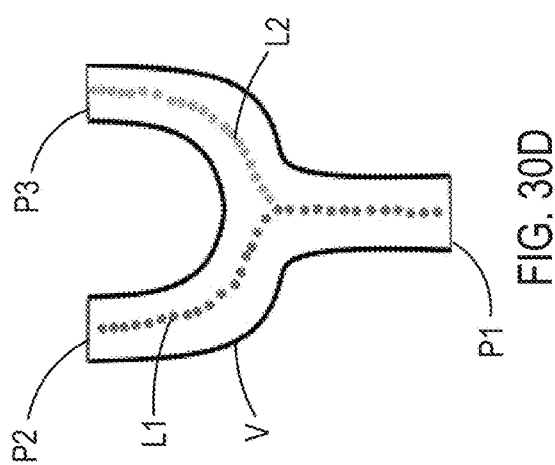
FIG. 30A
FIG. 30B
FIG. 30C
FIG. 30D
FIG. 30E

Example of using the hollow bone labeling schema

Example of using the cardiac only labeling schema

SYSTEMS AND METHODS FOR AUTOMATED SEGMENTATION OF PATIENT SPECIFIC ANATOMIES FOR PATHOLOGY SPECIFIC MEASUREMENTS

CROSS-REFERENCE TO RELATED APPLICATIONS

This application is a continuation-in-part of U.S. patent application Ser. No. 18/407,286, filed Jan. 8, 2024, now U.S. Pat. No. 12,154,691, which is a continuation of U.S. patent application Ser. No. 18/131,859, filed Apr. 6, 2023, now U.S. Pat. No. 11,869,670, which is a continuation of U.S. patent application Ser. No. 17/662,802, filed May 10, 2022, now U.S. Pat. No. 11,626,212, which is a continuation of International PCT Patent Application Serial No. PCT/IB2022/051216, filed Feb. 10, 2022, which claims the benefit of priority of GB Patent Application Serial No. 2101908.8, filed Feb. 11, 2021, the entire contents of each of which are incorporated herein by reference.

TECHNICAL FIELD

This technology generally relates to systems and methods for multi-schema analysis of patient specific anatomical features from medical images for pathology specific measurements for specific use cases in diagnosis, planning and treatment.

BACKGROUND

Creating accurate 3D models of specific parts of a patient's anatomy is helping to transform surgery procedures by providing insights to clinicians for preoperative planning. Benefits include, for example, better clinical outcomes for patients, reduced time and costs for surgery and the ability for patients to better understand a planned surgery. However, there is still a need to provide 3D models providing greater insight on the patient anatomy or pathology.

In view of the foregoing drawbacks of previously known systems and methods, there exists a need for enhanced systems and methods for analyzing medical images of a patient to create 3D models to assist in diagnosis, planning, and/or treatment.

SUMMARY

The present disclosure overcomes the drawbacks of previously-known systems and methods by providing systems and methods for multi-schema analysis of patient specific anatomical features from medical images for pathology specific measurements for specific use cases in diagnosis, planning, and/or treatment.

The generation of a scale virtual replica of the patient's anatomy, e.g., a 3D anatomical model, is an extremely useful tool that can be used to drive personalized patient specific decisions in clinical practice, e.g., for pre-operative planning. The present disclosure demonstrates how to generate patient specific 3D models of a patient's complete anatomy, for example, by building machine learning models to automatically detect and segment anatomy from medical scans. These models may be trained using curated semantically labeled datasets. To produce a 3D segmentation, a neural network or machine learning algorithm is trained to identify the anatomical features within a set of medical images. These images are semantically labeled with the location of the anatomical features and their constituent parts and landmarks. Accordingly, the segmentation algorithm can take new datasets and their complementary landmarks and use those to identify new anatomical features or landmarks.

The segmentation process is the first step in producing patient specific insights into anatomical features, which power decision making in the clinical setting. The technology made available by Axial Medical Printing Limited, Belfast, United Kingdom, turns the 2D medical scans into scale 3D models of the patient's anatomy, which allows 3D decision making and understanding. The output of the segmentation process is the precise set of coordinates that represent the anatomical features in the scan. This representation of the anatomy allows definitive statements about the features to be made, for example, standard measurements such as size, length, volume, diameter, oblique cross-section and others. As a result, the shape and location of the anatomical feature or pathology may be calculated and incorporated into a personalized decision making process by the surgeon. These measurements may be used to drive critical decisions about the patient's condition and any proposed intervention.

More significantly the systems described herein can distinguish between normal and pathological states of the anatomy and any anatomical feature. The training process may be further embellished with this information and may use this to drive further classes of anatomical features. For example, blood may be identified and segmented within a medical scan. By incorporating information about the pathological state, blood clots also may be identified and segmented within a vessel such that the type and severity of the pathology may be identified. In combination with measurement data about the anatomy, this information is crucial for decision making in acute blood clot based pathologies such as stroke or coronary disease.

Pathology specific patentable artifacts may be created by combining the auto-segmentation algorithms described herein with large labeled training datasets that are specific to each pathology, such that the combination of the appropriate algorithm and the specific data creates unique sets of artifacts per pathology. The ability to provide specific grouping of functionalities of a segmentation provides significant benefits to specific clinical problems. Moreover, the ability to provide the automated segmentation also opens up a number of pathology specific applications that would benefit from the systems described herein.

In accordance with one aspect, a system for multi-schema analysis of patient specific anatomical features from medical images is provided. The system may comprise a server and may be configured to receive medical images of a patient and metadata associated with the medical images indicative of a selected pathology; automatically segment the medical images to identify one or more patient specific anatomical features within the medical images; extract an isolated patient specific anatomical feature comprising the selected pathology from the one or more patient specific anatomical features based on the metadata; generate an isolated 3D surface mesh model defining a surface of the isolated patient specific anatomical feature; and provide a medical device to be used to treat the selected pathology based on physiological parameters of the isolated patient specific anatomical feature.

The physiological parameters of the isolated anatomical feature may comprise a size of the selected pathology, such that the medical device provided may comprise a specific sized medical device for treating the selected pathology. The system may be configured to generate physiological information associated with the selected pathology for the isolated 3D surface mesh model. For example, the physiological information may comprise a volume, cross-sectional area, diameter, centerline, surface, density, thickness, tortuosity, fracture size and location, blood clots, occlusions, and/or rate of growth over time of the anatomical feature and/or corresponding landmark. Moreover, the system may be configured to automatically segment the medical images to identify the one or more patient specific anatomical features via a segmentation algorithm programmed to label pixels of the medical images and an anatomical feature identification algorithm programmed to classify the one or more patient specific anatomical features within the medical images based on the labeled pixels.

In addition, the medical device may be selected for fixation to bone and to provide guidance for cutting planes. Additionally, or alternatively, the medical device may be selected for fixation to bone and to provide drilling trajectories within the bone. Further, the medical device may be selected based on a surgical procedure to be performed on the isolated patient specific anatomical feature to treat the selected pathology. For example, the surgical procedure may comprise placement of bone fragments, tools, implants, holes, and/or screws, cutting, and/or bone realignment. Moreover, the medical device may be selectable from a hospital inventory of available medical devices. The system further may be configured to access a medical device database having knowledge of various medical devices, the knowledge comprising function and/or specifications of the various medical devices, such that the medical device may be selectable from a list of medical devices extracted from the medical device database. Additionally, or alternatively, the system further may be configured to access a surgical implement database having knowledge of pathology-specific treatment options, such that the medical device may be selectable from a list of medical devices extracted from the surgical implement database.

Moreover, the system may be configured to provide the medical device by providing a 3D digital model of the medical device specific to the physiological parameters of the isolated patient specific anatomical feature. For example, the system may be configured to receive patient demographic data, such that the 3D digital model of the medical device may be provided based at least partially on the patient demographic data. Additionally, the system may be configured to cause a display to display the 3D digital model of the medical device. For example, the display may comprise a graphical user interface, and the system may be configured to permit a user to move the 3D digital model of the medical device relative to the isolated patient specific anatomical feature via the graphical user interface to position the 3D digital model of the medical device at a target location relative to the isolated patient specific anatomical feature.

In addition, the system may be configured to display one or more anatomical landmarks associated with the isolated patient specific anatomical feature, the one or more anatomical landmarks configured to serve as a guide for positioning of the 3D digital model of the medical device at the target location. The system further may be configured to fuse the 3D digital model of the medical device with the isolated patient specific anatomical feature such that a fitting surface of the 3D digital model matches a surface contour of the isolated patient specific anatomical feature at the target location. The system may further be configured to cause the 3D digital model to be 3D printed to generate a physical, patient specific medical device. For example, the physical, patient-specific medical device may be a cutting guide, pin guide, occlusion device, mitral valve implant, aortic valve implant, stent, coil, clip, fusion plate, or joint replacement implant.

In accordance with another aspect, a method for multi-schema analysis of patient specific anatomical features from medical images is provided. The method may comprise: receiving medical images of a patient and metadata associated with the medical images indicative of a selected pathology; automatically segmenting the medical images to identify one or more patient specific anatomical features within the medical images; extracting an isolated patient specific anatomical feature comprising the selected pathology from the one or more patient specific anatomical features based on the metadata; generating an isolated 3D surface mesh model defining a surface of the isolated patient specific anatomical feature; and providing a medical device to be used to treat the selected pathology based on physiological parameters of the isolated patient specific anatomical feature. For example, automatically segmenting the medical images to identify the one or more patient specific anatomical features may comprise executing a segmentation algorithm programmed to label pixels of the medical images and an anatomical feature identification algorithm programmed to classify the one or more patient specific anatomical features within the medical images based on the labeled pixels.

Moreover, providing the medical device may comprise providing a 3D digital model of the medical device specific to the physiological parameters of the isolated patient specific anatomical feature. In addition, the method may comprise causing a graphical user interface to display the 3D digital model of the medical device, and permitting, via the graphical user interface, a user to move the 3D digital model of the medical device relative to the isolated patient specific anatomical feature to position the 3D digital model of the medical device at a target location relative to the isolated patient specific anatomical feature. In addition, the method may comprise causing the graphical user interface to display one or more anatomical landmarks associated with the isolated patient specific anatomical feature, the one or more anatomical landmarks configured to serve as a guide for positioning of the 3D digital model of the medical device at the target location. The method further may comprise fusing the 3D digital model of the medical device with the isolated patient specific anatomical feature such that a fitting surface of the 3D digital model matches a surface contour of the isolated patient specific anatomical feature at the target location. Moreover, the method may comprise 3D printing the 3D digital model to generate a physical, patient specific medical device.

In accordance with another aspect, a method for multi-schema analysis of patient specific anatomical features from medical images is provided. The method may comprise: receiving medical images of a patient; automatically processing the medical images using a segmentation algorithm to identify a patient specific anatomical feature within the medical images; executing, during an inference phase, an anatomical landmark detection algorithm to deploy one or more Reinforcement Learning (RL) agents to locate one or more anatomical landmarks associated with the patient specific anatomical feature within the medical images, each RL agent configured to employ a learned policy to perform one or more sequential actions that move the RL agent towards one of the one or more anatomical landmarks, each action of the one or more sequential actions selected based on an observational input of the RL agent and an environmental state of the patient specific anatomical feature; and generating a 3D surface mesh model defining a surface of the patient specific anatomical feature, the 3D surface mesh model comprising the located one or more anatomical landmarks.

The method further may comprise training, during a training phase, the RL agent via a Deep Quality Network (DQN) model to search for the one or more anatomical landmarks associated with an anatomical feature corresponding with the patient specific anatomical feature. In addition, the method may comprise formulating, by the DQN model during the training phase, the learned policy based on a path taken by the RL agent from a randomized starting point on the patient specific anatomical feature to a target anatomical landmark associated with the anatomical feature, and the observational input of the RL agent during each step of the path. The randomized starting point may be placed within a predetermined distance from the target anatomical landmark. Further, the method may comprise allocating, by the DQN model, a weight to each of the possible actions defined by the observational input of the RL agent, each weight determined based on a probability that the corresponding action, if taken, will move the RL agent towards the target anatomical landmark. In addition, during the inference phase, each RL agent may select the action to take based on the weight of each of the possible actions defined by the observational input of the RL agent.

Training the RL agent may comprise training the RL agent in a series of episodes within a 3D medical imaging environment, each episode comprising multiple steps, such that the RL agent interacts with and learns from the 3D medical imaging environment in a structured, spatial context. In addition, training the RL agent may comprise employing, by the RL agent, a strategy that balances selecting actions based on exploration to explore new paths and selecting actions based on exploitation of learned knowledge. Moreover, training the RL agent may comprise providing feedback to the RL agent after each action is taken by the RL agent, such that the method further may comprise adjusting a decision-making process of the RL agent based on the feedback. For example, the feedback may comprise information indicative of an environmental state of the anatomical feature, a remaining distance to the target anatomical landmark, and/or a reward signal. Additionally, or alternatively, training the RL agent comprises storing the RL agent's learned knowledge in a replay memory, such that the method further may comprise accessing, by the RL agent during the inference phase, the replay memory to select the action to take based at least partially on the learned knowledge. Training the RL agent further may comprise periodically updating the learned policy based on the learned knowledge stored in the replay memory. Further, training the RL agent may comprise employing a target network to provide a stable target for periodic updates of the learned policy to thereby prevent a moving target problem associated with deep reinforcement learning.

Moreover, the observational input of the RL agent may comprise a plurality of possible actions to be taken by the RL agent. In addition, the observational input of the RL agent may be defined by a localized cube surrounding the RL agent, each face of the localized cube representing a possible action to be taken by the RL agent in a corresponding direction of movement. During the inference phase, each RL agent may be deployed within a volume positioned at a predetermined location of the patient specific anatomical feature, the predetermined location selected based on one or more known areas of the patient specific anatomical feature. The method further may comprise receiving metadata associated with the medical images, the metadata comprising knowledge of the one or more landmarks associated with the patient specific anatomical feature, such that executing the anatomical landmark detection algorithm to locate one or more anatomical landmarks associated with the patient specific anatomical feature within the medical images may comprise executing the anatomical landmark detection algorithm to locate the one or more anatomical landmarks identified within the metadata. Additionally, or alternatively, the method further may comprise accessing an anatomical feature dataset including knowledge of the one or more anatomical landmarks associated with the patient specific anatomical feature, such that executing the anatomical landmark detection algorithm to locate one or more anatomical landmarks associated with the patient specific anatomical feature within the medical images may comprise executing the anatomical landmark detection algorithm to locate the one or more anatomical landmarks identified within the anatomical feature dataset.

In addition, the method may comprise generating a bounding box around the located one or more anatomical landmarks to identify a region of interest of the patient specific anatomical feature. Accordingly, the method further may comprise providing a unique label schema for the identified region of interest of the patient specific anatomical feature, the unique label schema comprising a specific anatomy and/or materials relevant to a pathology associated with the patient specific anatomical feature. Additionally, the method may comprise using the located one or more anatomical landmarks as a plugin for a Picture Archiving Communication System (PACS) to enable rapid navigation to a region of interest of the patient specific anatomical feature in a PACS workstation. Further, the method may comprise automatically reorienting the medical images based on the located one or more anatomical landmarks. Moreover, the method may comprise extracting anatomically derived parameters based on the located one or more anatomical landmarks, and developing a Statistical Shape Model (SSM) of the patient specific anatomical feature based on the anatomically derived parameters. For example, the anatomically derived parameters may comprise a distance between anatomical landmarks, an angle between anatomical landmarks, and/or a circumference around one or more anatomical landmarks.

The method further may comprise: selecting a medical device based on a pathology associated with the patient specific anatomical feature; positioning a 3D model of the medical device at target location of the 3D surface mesh of the patient specific anatomical feature based on the located one or more anatomical landmarks; and fusing a fitting surface of the 3D model of the medical device to an underlying surface contour of the 3D surface mesh of the patient specific anatomical feature at the target location to generate a patient specific 3D model of the medical device. For example, fusing the fitting surface of the 3D model of the medical device to the underlying surface contour of the 3D surface mesh of the patient specific anatomical feature may comprise executing a Boolean difference on the fitting surface of the 3D model of the medical device to remove a volume of the fitting surface of the 3D model of the medical device corresponding to a volume of the underlying surface contour of the 3D surface mesh of the patient specific anatomical feature at the target location. Moreover, the method may comprise automatically orienting one or more subcomponents of the 3D model of the medical device, such that the one or more subcomponents extend perpendicular to the underlying surface contour of the 3D surface mesh of the patient specific anatomical feature at the target location. In addition, the method may comprise 3D printing the patient specific 3D model of the medical device. The method further may comprise receiving metadata associated with the medical images indicative of a selected pathology; extracting an isolated 3D surface mesh model of the patient specific anatomical feature comprising the selected pathology from the 3D surface mesh model based on the metadata; and generating physiological information associated with the selected pathology for the isolated 3D surface mesh model.

In accordance with another aspect, a method for multi-schema analysis of patient specific anatomical features from medical images is provided. The method may include: receiving, by a server, medical images of a patient and metadata associated with the medical images indicative of a selected pathology; automatically processing, by the server, the medical images using a segmentation algorithm to label pixels of the medical images and to generate scores indicative of a likelihood that the pixels were labeled correctly; using, by the server, an anatomical feature identification algorithm to probabilistically match associated groups of the labeled pixels against an anatomical knowledge dataset to classify one or more patient specific anatomical features within the medical images; generating, by the server, a 3D surface mesh model defining a surface of the one or more classified patient specific anatomical features; extracting, by the server, information from the 3D surface mesh model based on the selected pathology; and generating, by the server, physiological information associated with the selected pathology for the 3D surface mesh model based on the extracted information. For example, the information extracted from the 3D surface mesh model may include a 3D surface mesh model of an anatomical feature isolated from the one or more classified patient specific anatomical features based on the selected pathology.

Generating, by the server, physiological information associated with the selected pathology for the 3D surface mesh model may include: determining start and end points of the isolated anatomical feature; taking slices at predefined intervals along an axis from the start point to the end point; calculating a cross-sectional area of each slice defined by a perimeter of the isolated anatomical feature; extrapolating a 3D volume between adjacent slices based on the respective cross-sectional areas; and calculating an overall 3D volume of the isolated anatomical feature based on the extrapolated 3D volumes between adjacent slices.

Generating, by the server, physiological information associated with the selected pathology for the 3D surface mesh model may include: determining start and end points of the isolated anatomical feature and a direction of travel from the start point to the end point; raycasting at predefined intervals along an axis in at least three directions perpendicular to the direction of travel and determining distances between intersections of each ray cast and the 3D surface mesh model; calculating a center point at each interval by triangulating the distances between intersections of each ray cast and the 3D surface mesh model; adjusting the direction of travel at each interval based on a directional vector between adjacent calculated center points, such that raycasting at the predefined intervals occur in at least three directions perpendicular to the adjusted direction of travel at each interval; and calculating a centerline of the isolated anatomical feature based on the calculated center points from the start point to the end point.

Generating, by the server, physiological information associated with the selected pathology for the 3D surface mesh model may include: calculating a centerline of the isolated anatomical feature; determining start and end points of the isolated anatomical feature and a directional vector from the start point to the end point; establishing cutting planes at predefined intervals along the centerline based on the directional vector from the start point to the end point, each cutting plane perpendicular to a direction of travel of the centerline at each interval; raycasting in the cutting plane at each interval to determine a position of intersection on the 3D surface mesh model from the centerline; and calculating a length across the 3D surface mesh model based on the determined positions of intersection at each interval.

Generating, by the server, physiological information associated with the selected pathology for the 3D surface mesh model may include: determining start and end points of the isolated anatomical feature; taking slices at predefined intervals along an axis from the start point to the end point; calculating a cross-sectional area of each slice defined by a perimeter of the isolated anatomical feature; and generating a heat map of the isolated anatomical feature based on the cross-sectional area of each slice.

Generating, by the server, physiological information associated with the selected pathology for the 3D surface mesh model may include: determining start and end points of the isolated anatomical feature; calculating a centerline of the isolated anatomical feature; determining a directional travel vector between adjacent points along the centerline; calculating a magnitude of change of directional travel vectors between adjacent points along the centerline; and generating a heat map of the isolated anatomical feature based on the magnitude of change of directional travel vectors between adjacent points along the centerline.

In some embodiments, the generated physiological information associated with the selected pathology for the 3D surface mesh model may include an associated timestamp, such that the method further includes: recording, by the server, the generated physiological information and the associated timestamp; and calculating, by the server, changes between the recorded physiological information over time based on associated timestamps, indicative of progression of the selected pathology. Accordingly, the method further may include: calculating, by the server, a magnitude of the changes between the recorded physiological information over time; and generating, by the server, a heat map of the isolated anatomical feature based on the magnitude of the changes between the recorded physiological information over time.

Extracting, by the server, information from the 3D surface mesh model based on the selected pathology may include: isolating an anatomical feature from the one or more classified patient specific anatomical features based on the selected pathology; analyzing features of the isolated anatomical feature with an anatomical feature database to identify one or more landmarks of the isolated anatomical feature; associating the one or more identified landmarks with the pixels of the medical images; and generating a 3D surface mesh model defining a surface of the isolated anatomical feature comprising the identified landmarks. Moreover, the method may further include: identifying, by the server, a guided trajectory for performing a surgical procedure from a surgical implement database based on the selected pathology and the one or more identified landmarks; and displaying the guided trajectory to a user.

In addition, the method further may include: receiving, by the server, patient demographic data; identifying, by the server, one or more medical devices from a medical device database based on the patient demographic data and the generated physiological information associated with the selected pathology for the 3D surface mesh model; and displaying the identified one or more medical devices to a user. Moreover, the method further may include: receiving, by the server, patient demographic data; identifying, by the server, one or more treatment options from a surgical implement database based on the patient demographic data and the generated physiological information associated with the selected pathology for the 3D surface mesh model; and displaying the identified one or more treatment options to a user.

Extracting, by the server, information from the 3D surface mesh model based on the selected pathology may include: isolating an anatomical feature from the one or more classified patient specific anatomical features based on the selected pathology; analyzing features of the isolated anatomical feature with an anatomical feature database to identify one or more landmarks of the isolated anatomical feature; analyzing features of the one or more landmarks with a reference fracture database to detect a fracture of the isolated anatomical feature; and generating a 3D surface mesh model of the isolated anatomical feature comprising the one or more identified landmarks and the detected fracture. Accordingly, the method further may include matching the 3D surface mesh model of the isolated anatomical feature against the reference fracture database to classify the detected fracture.

The method further may include: delineating, by the server, the classified one or more patient specific anatomical features into binary labels; separating, by the server, the binary labels into separate anatomical features; and mapping, by the server, the separate anatomical features to original grey scale values of the medical images and removing background within the medical images, and wherein the generated 3D surface mesh model defines a surface of the separate anatomical features, or comprises a volumetric render defined by mapping specific colors or transparency values to the classified one or more patient specific anatomical features. In some embodiments, the segmentation algorithm may include at least one of a threshold-based, decision tree, chained decision forest, or neural network method. The physiological information associated with the selected pathology may include at least one of diameter, volume, density, thickness, surface area, Hounsfield Unit standard deviation, or average.

In accordance with another aspect, a system for multi-schema analysis of patient specific anatomical features from medical images is provided. The system may include a server and may: receive medical images of a patient and metadata associated with the medical images indicative of a selected pathology; automatically process the medical images using a segmentation algorithm to label pixels of the medical images and to generate scores indicative of a likelihood that the pixels were labeled correctly; use an anatomical feature identification algorithm to probabilistically match associated groups of the labeled pixels against an anatomical knowledge dataset to classify one or more patient specific anatomical features within the medical images; generate a 3D surface mesh model defining a surface of the one or more classified patient specific anatomical features; extract information from the 3D surface mesh model based on the selected pathology; and generate physiological information associated with the selected pathology for the 3D surface mesh model based on the extracted information. For example, the information extracted from the 3D surface mesh model may include a 3D surface mesh model of an anatomical feature isolated from the one or more classified patient specific anatomical features based on the selected pathology.

In accordance with yet another aspect, a non-transitory computer-readable memory medium having instructions stored thereon is provided, that when loaded by at least one processor cause the at least one processor to: receive medical images of a patient and metadata associated with the medical images indicative of a selected pathology; automatically process the medical images using a segmentation algorithm to label pixels of the medical images and to generate scores indicative of a likelihood that the pixels were labeled correctly; use an anatomical feature identification algorithm to probabilistically match associated groups of the labeled pixels against an anatomical knowledge dataset to classify one or more patient specific anatomical features within the medical images; generate a 3D surface mesh model defining a surface of the one or more classified patient specific anatomical features; extract information from the 3D surface mesh model based on the selected pathology; and generate physiological information associated with the selected pathology for the 3D surface mesh model based on the extracted information.

BRIEF DESCRIPTION OF THE DRAWINGS

FIG. 26 illustrates generation of 3D volumetric rendering of separate anatomical features in accordance with some embodiments.

FIGS. 30A to 30E illustrate generating measurements of a patient specific anatomical feature in accordance with some embodiments.

DETAILED DESCRIPTION

Figure 1:
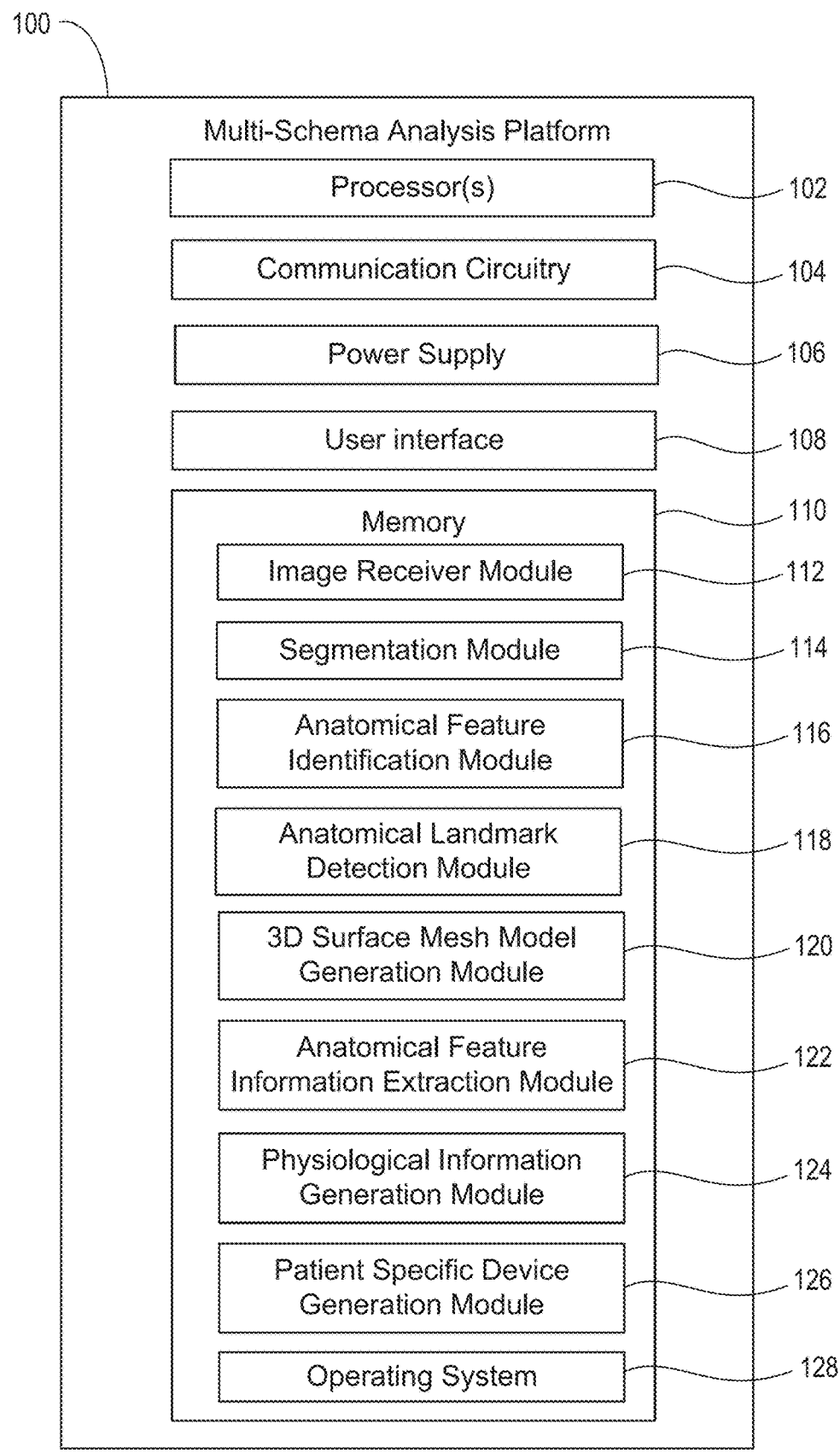
FIG. 1 shows some example components that may be included in an multi-schema analysis platform in accordance with some embodiments.

Referring to FIG. 1, components that may be included in multi-schema analysis platform 100 are described. Platform 100 may include one or more processors 102, communication circuitry 104, power supply 106, user interface 108, and/or memory 110. One or more electrical components and/or circuits may perform some of or all the roles of the various components described herein. Although described separately, it is to be appreciated that electrical components need not be separate structural elements. For example, platform 100 and communication circuitry 104 may be embodied in a single chip. In addition, while platform 100 is described as having memory 110, a memory chip(s) may be separately provided.

Platform 100 may contain memory and/or be coupled, via one or more buses, to read information from, or write information to, memory. Memory 110 may include processor cache, including a multi-level hierarchical cache in which different levels have different capacities and access speeds. The memory may also include random access memory (RAM), other volatile storage devices, or non-volatile storage devices. Memory 110 may be RAM, ROM, Flash, other volatile storage devices or non-volatile storage devices, or other known memory, or some combination thereof, and preferably includes storage in which data may be selectively saved. For example, the storage devices can include, for example, hard drives, optical discs, flash memory, and Zip drives. Programmable instructions may be stored on memory 110 to execute algorithms for automatically segmenting and identifying patient specific anatomical features within medical images, including corresponding anatomical landmarks, generating 3D surface mesh models of the patient specific anatomical features, and extracting information from the 3D surface mesh models to generate physiological information of the patient specific anatomical features based on selected pathologies.

Platform 100 may incorporate processor 102, which may consist of one or more processors and may be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. Platform 100 also may be implemented as a combination of computing devices, e.g., a combination of a DSP and a microprocessor, a plurality of microprocessors, one or more microprocessors in conjunction with a DSP core, or any other such configuration.

Platform 100, in conjunction with firmware/software stored in the memory may execute an operating system (e.g., operating system 128), such as, for example, Windows, Mac OS, Unix or Solaris 5.10. Platform 100 also executes software applications stored in the memory. For example, the software may be programs in any suitable programming language known to those skilled in the art, including, for example, C++, PHP, or Java.

Communication circuitry 104 may include circuitry that allows platform 100 to communicate with an image capture device and/or other computing devices for receiving image files, e.g., 2D medical images, and metadata associated therewith indicative of a patient specific pathology. Additionally or alternatively, image files may be directly uploaded to platform 100. Communication circuitry 104 may be configured for wired and/or wireless communication over a network such as the Internet, a telephone network, a Bluetooth network, and/or a WiFi network using techniques known in the art. Communication circuitry 104 may be a communication chip known in the art such as a Bluetooth chip and/or a WiFi chip. Communication circuitry 104 permits platform 100 to transfer information, such as 3D surface mesh models, physiological measurements, and treatment options, locally and/or to a remote location such as a server.

Power supply 106 may supply alternating current or direct current. In direct current embodiments, power supply may include a suitable battery such as a replaceable battery or rechargeable battery and apparatus may include circuitry for charging the rechargeable battery, and a detachable power cord. Power supply 106 may be charged by a charger via an inductive coil within the charger and inductive coil. Alternatively, power supply 106 may be a port to allow platform 100 to be plugged into a conventional wall socket, e.g., via a cord with an AC to DC power converter and/or a USB port, for powering components within platform 100.

User interface 108 may be used to receive inputs from, and/or provide outputs to, a user. For example, user interface 108 may include a touchscreen, display, switches, dials, lights, etc. Accordingly, user interface 108 may display information such as 3D surface mesh models, physiological measurements, heat maps, list of available medical devices for a patient specific pathology, treatment options, etc. to facilitate diagnosis, preoperative planning, and treatment for specific use cases, as described in further detail below. Moreover, user interface 108 may receive user input including patient demographic data, e.g., patient size, age, weight, medical history, patient specific pathologies, etc., and feedback from the user based on information displayed to the user, e.g., corrected anatomical feature identification, physiological measurements, specific anatomical feature selection, such that platform 100 may adjust the information accordingly. In some embodiments, user interface 108 is not present on platform 100, but is instead provided on a remote, external computing device communicatively connected to platform 100 via communication circuitry 104.

Memory 110, which is one example of a non-transitory computer-readable medium, may be used to store operating system (OS) 128, image receiver module 112, segmentation module 114, anatomical feature identification module 116, anatomical landmark detection module 118, 3D surface mesh model generation module 120, anatomical feature information extraction module 122, physiological information generation module 124, and patient specific device generation module 126. The modules are provided in the form of computer-executable instructions that may be executed by processor 102 for performing various operations in accordance with the disclosure.

Image receiver module 112 may be executed by processor 102 for receiving standard medical images, e.g., 2D and/or 3D medical images, of one or more patient specific anatomical features taken from one or a combination of the following: CT, MRI, PET, and/or SPCET scanner. The medical images may be formatted in a standard compliant manner such as with DICOM. The medical images may include metadata embedded therein indicative of a patient specific pathology associated with the patient specific anatomical features in the medical images. Additionally, the medical images further may include metadata embedded therein indicative of anatomical landmarks associated with the patient specific anatomical features in the medical images. Image receiver module 112 may pre-process the medical images for further processing and analysis as described in further detail below. For example, the medical images may be pre-processed to generate a new set of medical images which are evenly distributed according to a predetermined orientation based on the patient specific anatomic feature, specific pathology of the patient, anatomical landmarks, or any downstream application such as preoperative training and/or for machine learning/neural network training purposes. Moreover, image receiver module 112 may receive medical images taken simultaneously from multiple perspectives of a patient specific anatomical feature to enhance segmentation of the patient specific anatomical features.

Segmentation module 114 may be executed by processor 102 for automated segmentation of the medical images received by image receiver module 112, e.g., to assign a label to each pixel of the medical images. The assigned label may represent a specific tissue type, e.g., bone, soft tissue, blood vessel, organ, etc. Specifically, segmentation module 114 may use machine learning based image segmentation techniques including one or a combination of the following techniques: threshold-based, decision tree, chained decision forest, or a neural network method, such that the results of each technique may be combined to produce a final segmentation result, as described in U.S. Pat. Nos. 11,138,790 and 11,436,801 to Haslam, both assigned to the assignee of the present disclosure, and both incorporated herein in their entireties by reference. The machine learning based image segmentation techniques may be trained using a knowledge database including pre-labeled medical images (i.e., ground truth data).

For example, segmentation module 114 may apply a first segmentation technique, e.g., a threshold-based segmentation, to assign a label to each pixel of the medical images based on whether a characteristic, e.g., Hounsfield value, of the pixel meets/exceeds a predetermined threshold. The predetermined threshold may be determined via, e.g., histogram analysis, as described in U.S. Pat. No. 11,138,790. Segmentation module 114 further may expand on the threshold-based segmentation technique by using a logistic or probabilistic function to calculate a score as to the likelihood of a pixel being the tissue type as labeled by the threshold-based segmentation.

Segmentation module 114 may then apply a decision tree to each labeled pixel of the medical images to thereby classify/label each pixel based at least in part on, but not solely on, the score. As described in U.S. Pat. No. 11,138, 790, the decision tree may be applied to a subset of the labeled pixels by subsampling the medical images, such that segmentation module 114 may recover full segmentation of the medical images by using standard interpolation methods to up-scale the labeled pixels of the subset of pixels of the medical images. The decision tree may consider, for each pixel, the score as well as, for example, the following properties: how many pixels looking almost like bone are near the pixel in question; how many pixels looking exactly like bone are near the pixel in question; or how strong is an overall gradient of the image at the given pixel. For example, if a pixel in question is labeled as bone with a score of 60/100, the first decision node of the decision tree can ask how many pixels looking almost like bone are near the pixel in question. If the answer is close to zero, meaning that very few pixels near the pixel in question look almost like bone, segmentation module 114 may determine that the pixel in question is not bone, even though the previous bone label had a score of 60/100. A new score may then be generated as to the likelihood that the pixel in question was correctly labeled by the decision tree algorithm. Accordingly, applying the decision tree to the pixels of the medical images may produce more accurate final segmentation results with less noise. As will be understood by a person having ordinary skill in the art, the decision tree may consider other properties that may be useful in determining a label for the pixel.

Additionally or alternatively, segmentation module 114 may apply a chained decision forest, in which the results of an initial/previous decision tree and the results of another segmentation technique, e.g., a Neural Network, for the same pixel in question may be fed to a new decision tree along with the scores associated with the results. For example, the new decision tree may ask one or more questions as described above to determine whether each of the previous segmentation techniques correctly labeled the pixel in question. Thus, if the initial/previous decision tree labeled the pixel in question as bone; whereas, the Neural Network labeled the pixel in question as not bone, the new decision tree may determine that the pixel in question is bone based on the responses to the one or more questions asked by the chained decision forest, such that the label allocated by the Neural Network for the pixel in question is discarded. Moreover, each forest-node may be treated as a simple classifier that produces a score as to how likely the pixel was correctly labeled by each subsequent new decision tree. Accordingly, applying the chained decision forest to the pixels of the medical images may produce more accurate final segmentation results.

Anatomical feature identification module 116 may be executed by processor 102 for identifying one or more patient specific anatomical features within the medical images by probabilistically matching the pixels labeled by segmentation module 114 against an anatomical knowledge dataset within the knowledge database. Specifically, as described in U.S. Pat. No. 11,138,790, anatomical feature identification module 116 initially may group the pixels labeled by segmentation module 114, e.g., by establishing links between the different labeled/classified pixels based on similarities between the labeled pixels. For example, all the pixels labeled "bone" may be grouped/linked together in a first group, all the pixels labeled "organ" may be grouped/linked together in a second group, and all the pixels labeled "blood vessel" may be grouped/linked together a third group.

Anatomical feature identification module 116 may then use an anatomical feature identification algorithm to explore the anatomical knowledge dataset to identify the patient specific anatomical features within the medical images by establishing links between the grouped labeled pixels with existing knowledge within the anatomical knowledge dataset. For example, the existing knowledge may include known information regarding various anatomic features such as tissue types, e.g., bone, blood vessel, or organ, etc., represented as nodes within a graph database of the anatomical knowledge dataset, as well as pre-labeled ground truth data that may be used to train the various segmentation algorithms.

The medical ontology of the existing knowledge of anatomic features within the graph database may be represented as a series of nodes which are grouped together through at least one of: functions, proximity, anatomical groupings, or frequency of appearance in the same medical image scan. For example, nodes representing an organ may be grouped together as a heart because they are within a predetermined proximity to each other, are all near nodes representing a blood vessel which are grouped together as an aorta, and have a high frequency of appearance in the same medical image scan. Accordingly, the anatomical feature identification algorithm may identify the patient specific anatomical feature within the medical image through exploration of the graph database to determine which group of nodes most resemble the grouped labeled pixels, e.g., based on the established links between the grouped labeled pixels and the group of nodes. Anatomical feature identification module 116 further may generate a score representing the likelihood that the patient specific anatomical feature was correctly identified by the anatomical feature identification algorithm.

Anatomical landmark detection module 118 may be executed by processor 102 for identifying and defining specific points on the patient specific anatomical structures in the medical images, e.g., anatomical landmarks, which may serve as reference points for describing the location and orientation of other anatomical structures, as well as for planning surgical procedures and/or generating patient specific medical devices, as described in further detail below. For example, anatomical landmark detection module 118 may employ machine learning techniques to rapidly and automatically locate anatomical landmarks associated with the anatomical structures. Specifically, to overcome the challenges associated with anatomical landmarking, anatomical landmark detection module 118 may leverage Deep Reinforcement Learning (DRL) techniques, which has been shown to achieve state-of-the-art accuracy in medical imaging analysis, to automatically locate anatomical landmarks in 3D medical images. DRL techniques provide fast and reliable landmark localization, which is critical in multiple medical imaging analysis applications, such as measurements of anatomical structures, registration of 3D volumes, and extraction of 2D clinical standard planes.

For example, anatomical landmark detection module 118 may execute automated anatomical landmark detection algorithms that are trained, e.g., during a training phase, by a Deep Quality Network (DQN) model to deploy Reinforcement Learning (RL) agents to search for anatomical landmarks in 3D medical scans, as described in further detail below with regard to FIG. 31A. Specifically, the RL agents are trained to learn by communication during their search for different landmarks in the 3D medical scans, which is motivated by the fact that anatomical landmarks are usually spatially correlated in an anatomical structure. Accordingly, during an inference phase, anatomical landmark detection module 118 may execute the trained automated anatomical landmark detection algorithms to deploy the RL agents to search for the same type of anatomical landmarks in 3D medical scans.

In addition, anatomical landmark detection module 118 may receive information indicative of one or more anatomical landmarks associated with the patient specific anatomical structures in the medical images from the metadata received by image receiver module 112. Accordingly, based on the patient specific anatomical structure identified in the 3D medical images, e.g., either via the automated segmentation algorithms executed by anatomical feature identification module 116 or extracted from metadata embedded in the 3D medical images, anatomical landmark detection module 118 may know which anatomical landmark(s) are associated with the patient specific anatomical structure, and thus, are likely to be present in the 3D medical images, such that the automated anatomical landmark detection algorithm may know what target anatomical landmarks to locate within the 3D medical images. For example, anatomical landmark detection module 118 may access a knowledge database with knowledge of various anatomical structures and their associated anatomical landmarks, as well as information regarding, e.g., the environmental state of the anatomical structures and/or spatial locations of the landmarks on the anatomical structures to inform the automated anatomical landmark detection algorithm.

3D surface mesh model generation module 120 may be executed by processor 102 for generating a 3D surface mesh model of the patient specific anatomical features within the medical images based on the results of the segmentation algorithm as well as the results of the anatomical feature identification algorithm, described above, and for extracting a 3D surface mesh model from the scalar volumes to generate a 3D printable model. For example, as described in U.S. Pat. No. 11,138,790, the 3D surface mesh model may have the following properties: all disjointed surfaces are closed manifolds, appropriate supports are used to keep the disjointed surfaces/volumes in place, appropriate supports are used to facilitate 3D printing, and/or no surface volumes are hollow, such that the 3D surface mesh model is 3D printable. Moreover, 3D surface mesh model generation module 120 may generate 3D surface mesh models of the patient specific anatomical features including any corresponding landmarks of the anatomical features located by anatomical landmark detection module 118.

Anatomical feature information extraction module 122 may be executed by processor 102 for extracting information from the 3D surface mesh model generated by 3D surface mesh model generation module 120. For example, anatomical feature information extraction module 122 may extract one or more specific anatomical features from the 3D surface mesh model representing the patient specific anatomical features within the medical images, based on the selected pathology indicated in the metadata received by image receiver module 112. Alternatively, platform 100 may receive information indicative of a selected pathology associated with the medical images directly from the user via user interface 108, e.g., along with patient demographic data and medical history. Accordingly, if a specific pathology is known for a given patient, anatomical feature information extraction module 122 may automatically extract the 3D surface mesh model of the specific anatomical feature including the pathology from the 3D surface mesh model generated by 3D surface mesh model generation module 120.

Physiological information generation module 124 may be executed by processor 102 for generating physiological information associated with the selected pathology for the 3D surface mesh model based on the information extracted by anatomical feature information extraction module 122. For example, based on the selected pathology, physiological information generation module 124 may perform calculations to determine physiological measurements relevant to the diagnosis and/or treatment of the pathology, e.g., by providing a list of medical devices appropriate to treat the pathology and/or treatment options based on measurements of the anatomical feature and patient demographic data. The list of medical devices and/or treatment options may be extracted from a medical device database or a surgical implement database by physiological information generation module 124. As described in further detail below with reference to FIGS. 3 to 24F, the physiological measurements associated with the selected pathologies determined by physiological information generation module 124 may include, but are not limited to, volume, cross-sectional area, diameter, centerline, surface, density, thickness, tortuosity, fracture size and location, blood clots, occlusions, and rate of growth over time of the anatomical feature and/or corresponding landmark. Moreover, physiological information generated by physiological information generation module 124 may be used to generate heat maps to facilitate visual observation of the physiological measurements of the patient specific anatomical feature.

Patient specific device generation module 126 may be executed by processor 102 for fusing a 3D model of a medical device with the underlying surface contour of a 3D surface mesh model of a patient specific anatomical feature to generate a patient specific 3D model of the medical device. For example, patient specific device generation module 126 may complete a Boolean difference on the fitting surface of the 3D model of the medical device to remove a volume of the fitting surface of the 3D model corresponding with the volume of the underlying 3D surface mesh model of a patient specific anatomical feature, such that the final surface contour of the fitting surface matches the surface contour of the underlying patient specific anatomical feature. The 3D model of the medical device may be preconfigured, and selectable from, e.g., a drop down menu of various medical device, based on the pathology associated with the patient specific anatomical feature. The patient specific 3D model of the medical device may then be 3D printed for use in a surgical procedure.

Figure 2:
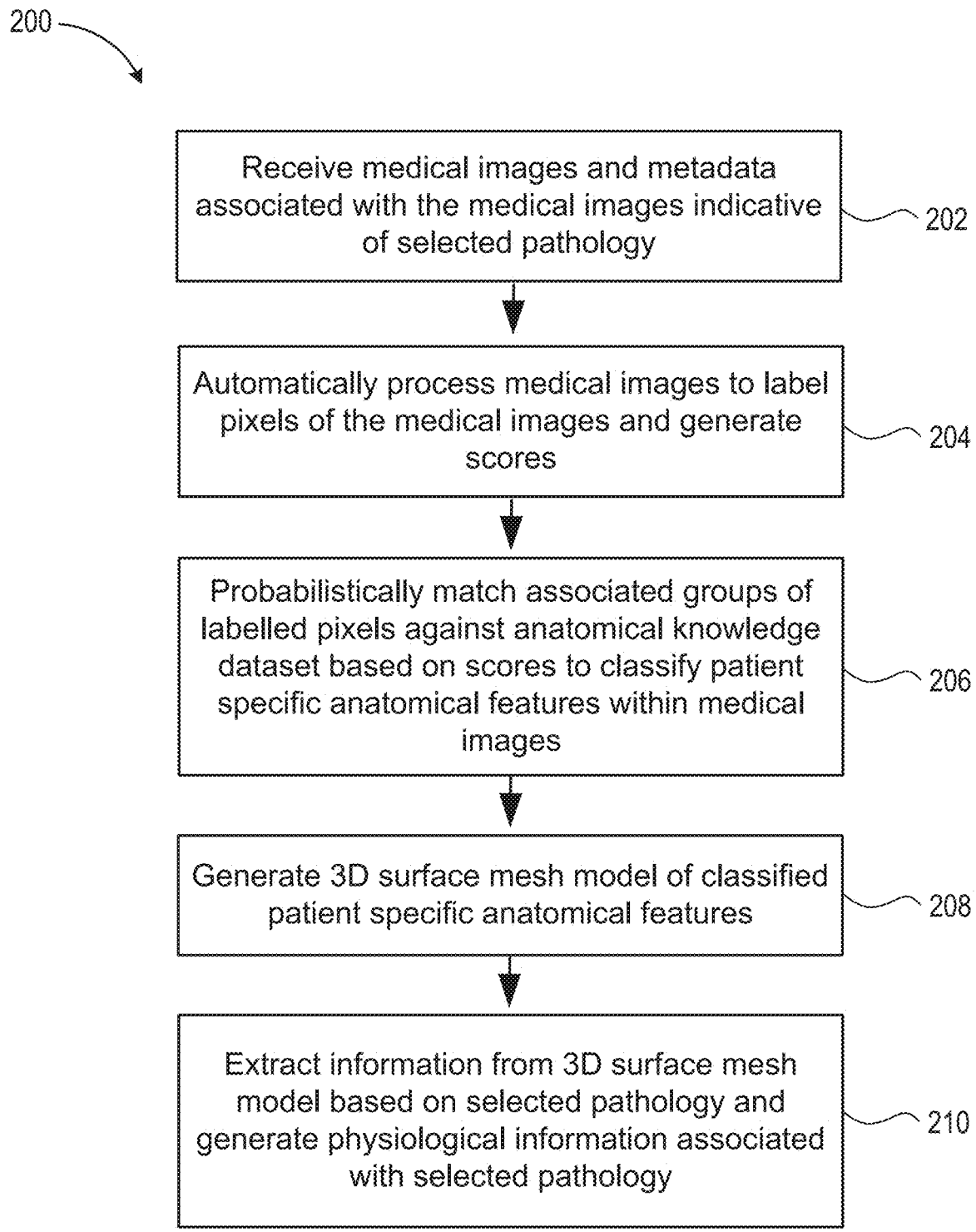
FIG. 2 is a flow chart illustrating exemplary method steps for multi-schema analysis of patient specific anatomical features from medical images in accordance with some embodiments.

Referring now to FIG. 2, exemplary method 200 for multi-schema analysis of patient specific anatomical features from medical images using platform 100 is provided. At step 202, medical images and metadata associated with the medical images indicative of a selected pathology may be received image receiver module 112. As described above, information indicative of the selected pathology may be directly received via user input along with patient demographic data. At step 204, segmentation module 114 may automatically process the medical images using a segmentation algorithm to label pixels of the medical images and to generate scores indicative of a likelihood that the pixels were labeled correctly. For example, the segmentation algorithm may use one or a combination of various machine learning based image segmentation techniques, trained with a knowledge dataset of pre-labeled medical images, to label pixels of the medical images.

At step 206, anatomical feature identification module 116 may group together pixels labeled at step 204 based on similarities, and use an anatomical feature identification algorithm to probabilistically match associated groups of the labeled pixels against an anatomical knowledge dataset to classify one or more patient specific anatomical features within the medical images. At step 208, 3D surface mesh model generation module 120 may generate a 3D surface mesh model defining a surface of the one or more classified patient specific anatomical features within the medical images. At step 210, anatomical feature information extraction module 122 may extract information from the 3D surface mesh model based on the selected pathology, and physiological information generation module 124 may generate physiological information associated with the selected pathology for the 3D surface mesh model based on the extracted information. The physiological information generated is described in further detail below with reference to FIGS. 3 to 24F.

Figure 3:
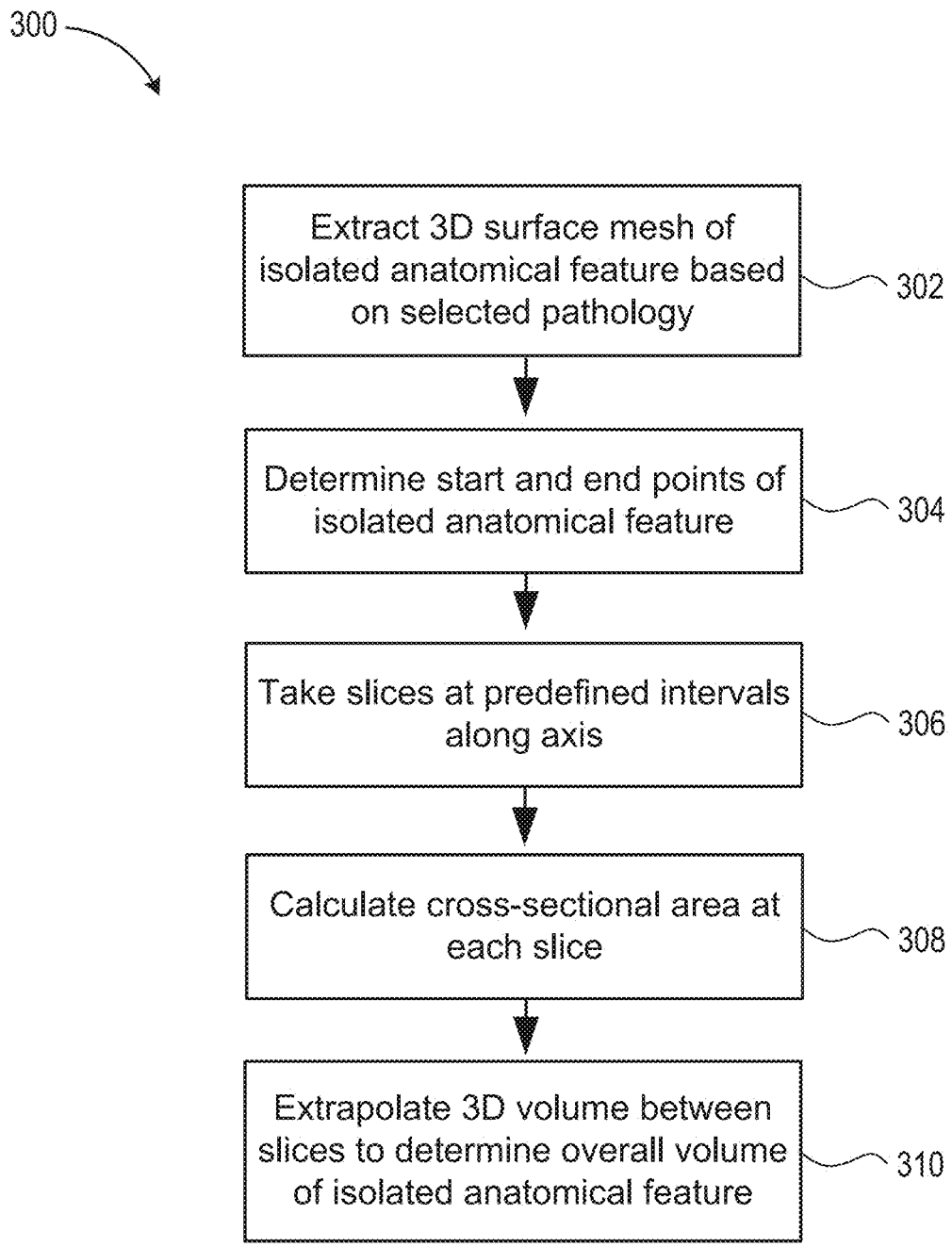
FIG. 3 is a flow chart illustrating exemplary method steps for generating volume measurements of a patient specific anatomical feature in accordance with some embodiments.

Referring now to FIG. 3, exemplary method 300 for generating volume measurements of a patient specific anatomical feature is provided. As described above with regard to step 210 of method 200 for multi-schema analysis of patient specific anatomical features from medical images of FIG. 2, physiological information, e.g., volume measurements of the patient specific anatomical feature associated with the selected pathology, may be generated from the generated 3D surface mesh model. For example, at step 302, a specific anatomical feature may be isolated from the patient specific anatomical features within the medical images based on the selected pathology, e.g., as indicated by the metadata associated with the medical images, for further analysis, such that a 3D surface mesh model of the isolated anatomical feature may be extracted from the 3D surface mesh model of the patient specific anatomical features and recorded. Accordingly, only the anatomical feature(s) comprising the pathology may be further analyzed to generate physiological information associated with the pathology.

At step 304, a start point and an end point of the isolated anatomical feature is determined, e.g., at opposite ends of the isolated anatomical feature. For example, the start and end points may be determined via a machine learning algorithm that explores the anatomical knowledge dataset to derive the start and end points of the isolated anatomical feature. At step 306, a predetermined step size may be determined, such that slices may be taken at regular intervals defined by the predetermined step size along an axis of the isolated anatomical feature. For example, the axis may be the centerline of the isolated anatomical feature determined based on a directional vector extending from the start point to the end point, as described in further detail below. Accordingly, a slice of the isolated anatomical feature may be taken at each interval perpendicular to the direction of travel along the centerline, beginning from the start point and in the direction of the end point.

Figure 4A:
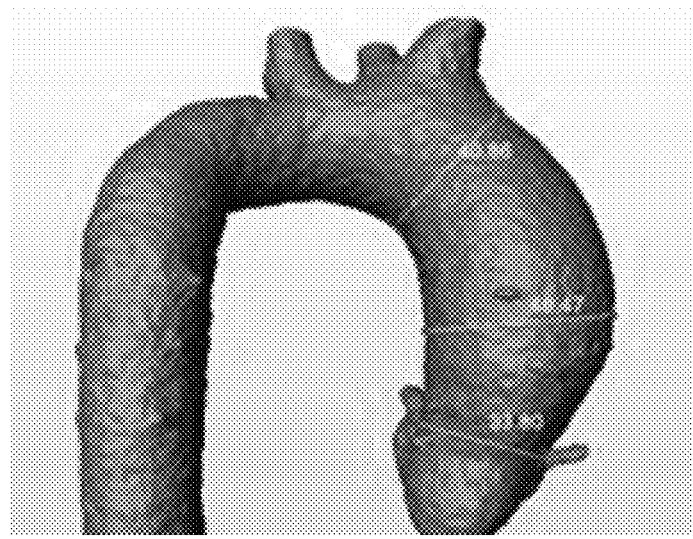
FIG. 4A illustrates cross-sectional area measurements at various points along a vessel.
Figure 4B:
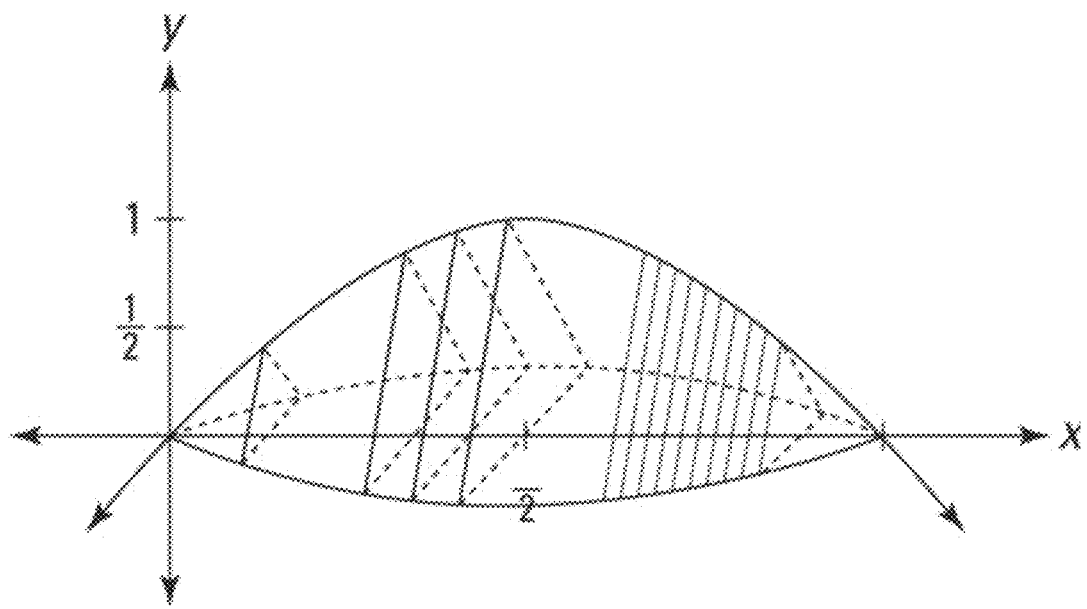
FIG. 4B illustrates determination of volume based on the cross-sectional area measurements in accordance with some embodiments.

At step 308, using standard computational functions, the cross-sectional area at each slice of the isolated anatomical feature may be calculated, as defined by the perimeter of the isolated anatomical feature, as shown in FIG. 4A. For example, the cross-sectional area of the automatically segmented labels for specific portions of anatomy, e.g., the mitral or aortic valve anatomy, may be calculated based on a derivative of the largest two cross sections of the anatomy, e.g., using A×B×T. In the case of an aneurysm, this data may be used to provide surgeons a neck-to-dome ratio automatically for the anatomy. FIG. 4A illustrates three slices along an isolated anatomical feature, e.g., an aorta when the associated pathology is an aneurysm, for which cross-sectional areas have been calculated and displayed over the 3D surface mesh model of the aorta. FIG. 4B illustratively shows how slices may be taken along an axis of a complex structure for purposes of calculating cross-sectional areas thereof.

Referring again to FIG. 3, at step 310, the 3D volume between each adjacent slices may be extrapolated based on the cross-sectional areas of the isolated anatomical feature at adjacent slices, such that the overall volume of the isolated anatomical structure may be determined based on the extrapolated 3D volumes, e.g., by taking the sum of the extrapolated 3D volumes. Alternatively, the volume of the automatically segmented labels for specific portions of an isolated anatomical feature, e.g., the left atrial appendage of the heart, may be calculated based on the number of voxels within the semantically labeled portion of anatomy, such that the volume may be displayed to the user for assessment.

Figure 5:
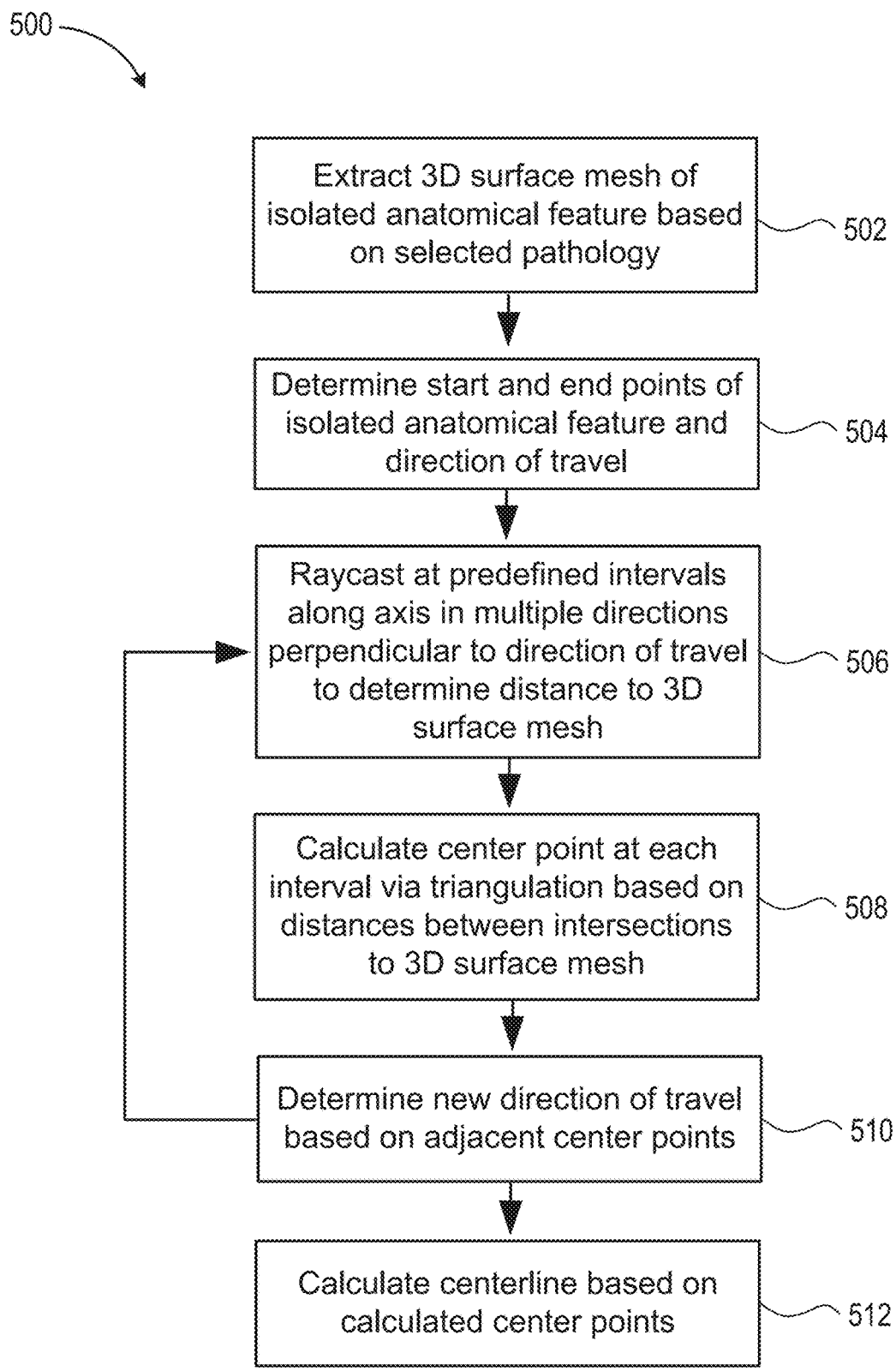
FIG. 5 is a flow chart illustrating exemplary method steps for generating centerline measurements of a patient specific anatomical feature in accordance with some embodiments.

Referring now to FIG. 5, exemplary method 500 for generating centerline measurements of a patient specific anatomical feature is provided. As described above with regard to step 210 of method 200 for multi-schema analysis of patient specific anatomical features from medical images of FIG. 2, physiological information, e.g., centerline measurements of the patient specific anatomical feature associated with the selected pathology, may be generated from the generated 3D surface mesh model. For example, at step 502, a specific anatomical feature may be isolated from the patient specific anatomical features within the medical images based on the selected pathology, as described above, such that a 3D surface mesh model of the isolated anatomical feature may be extracted from the 3D surface mesh model of the patient specific anatomical features and recorded.

At step 504, a start point and an end point of the isolated anatomical feature is determined, e.g., at opposite ends of the isolated anatomical feature, such that a directional vector may be determined that extends from the start point toward to end point. For example, the start and end points may be determined via a machine learning algorithm that explores the anatomical knowledge dataset to derive the start and end points of the isolated anatomical feature. The start and end points further may be close to a bounding box of the 3D surface mesh model, and on a common plane. Moreover, an initial direction of travel may be determined consistent with the directional vector extending from the start point to the end point.

Figure 6:
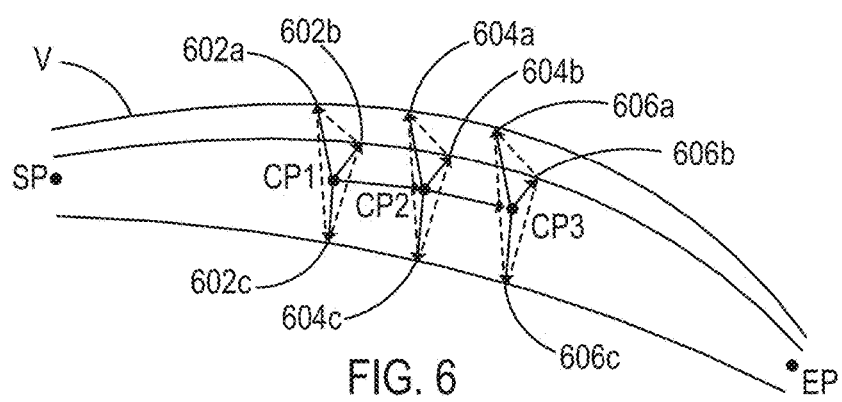
FIG. 6 illustrates determination of a centerline in accordance with some embodiments.

At step 506, a predetermined step size may be determined, such that a cutting plane may be established at regular intervals defined by the predetermined step size along an axis of the isolated anatomical feature. The cutting plane at each interval may be perpendicular to the direction of travel associated with the interval. For example, the initial cutting plane may be perpendicular to the initial direction of travel based on the directional vector extending from the start point to the end point. Moreover, multiple rays, e.g., three rays, may be raycast in multiple predefined directions along the cutting plane at each interval, perpendicular to the direction of travel and radially outwardly toward the perimeter of the isolated anatomical feature, such that the position of the intersections of the rays cast and the 3D surface mesh model may be determined. For example, as shown in FIG. 6, in a direction of travel from start point SP toward end point EP, the first set of three rays cast may intersect the 3D surface mesh model of the isolated anatomical feature, e.g., vessel V, at points 602a, 602b, 602c. At step 506, if the point from which the rays are cast are determined to be outside of the 3D surface mesh model, the point may be moved to within the 3D surface mesh model.

At step 508, the center point, e.g., CP1, of the isolated anatomical feature within the cutting plane at each interval may be determined, e.g., by triangulating the distances between each of the intersection points, e.g., points 602a, 602b, 602c, of the isolated anatomical feature. At step 510, a new direction of travel may be determined at each interval based on a directional vector extending from the previous center point of the previous interval and the current center point. For example, in FIG. 6, the new direction of travel at the first interval may be consistent with a directional vector extending from start point SP to center point CP1. If the isolated anatomical feature is a branched vessel, steps 506 to 510 may be repeated through both branches of the vessel, thereby generating a centerline for each branch of the 3D surface mesh model of the vessel.

Figure 7A:
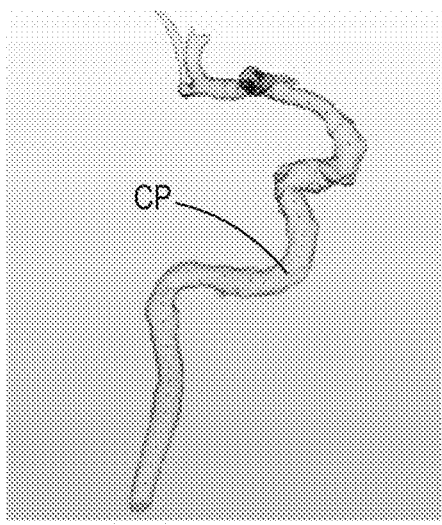
FIG. 7A illustrates center points of a vessel.

Method 500 may repeat steps 506 to 510 until end point EP is reached. For example, as shown in FIG. 6, at the second interval, three rays may be cast along a cutting plane perpendicular to the direction of travel that is defined by the directional vector extending from start point SP to center point CP1. The distances between intersection points 604a, 604b, 604c of the rays cast and the 3D surface mesh model may be triangulated to determine center point CP2 at the second interval. The previous direction of travel may then be adjusted to a new direction of travel defined by the directional vector extending from center point CP1 to center point CP2. Similarly, at the third interval, three rays may be cast along a cutting plane perpendicular to the direction of travel that is defined by the directional vector extending from center point CP1 to center point CP2. The distances between intersection points 606a, 606b, 606c of the rays cast and the 3D surface mesh model may be triangulated to determine center point CP3 at the third interval. The previous direction of travel may then be adjusted to a new direction of travel defined by the directional vector extending from center point CP2 to center point CP3. As described above, steps 510 to 512 may be repeated until end point EP is reached to thereby determine a series of center points CP along an axis of the isolated anatomical feature, as shown in FIG. 7A. Accordingly, as described above, the point from which the rays are cast will be outside of the 3D surface mesh model beyond end point EP, such that the point cannot be returned to within the 3D surface mesh model, thereby indicating an end of the centerline of the isolated anatomical feature.

Figure 7B:
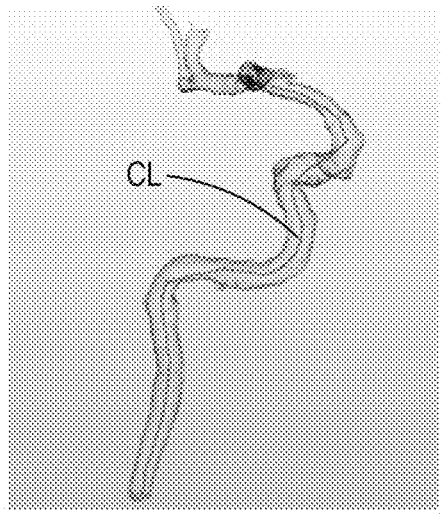
FIG. 7B illustrates a centerline of the vessel.
Figure 7C:
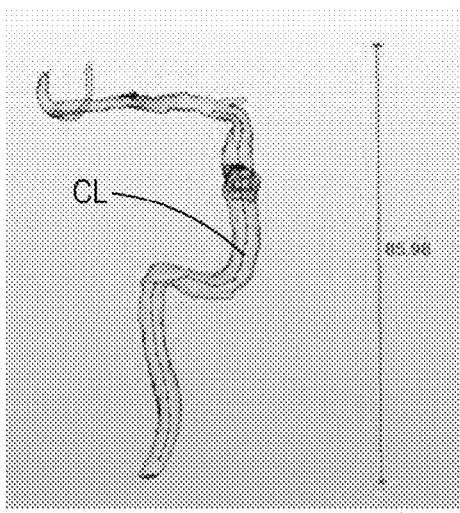
FIG. 7C illustrates measurement of length of the centerline of the vessel.
Figure 7D:
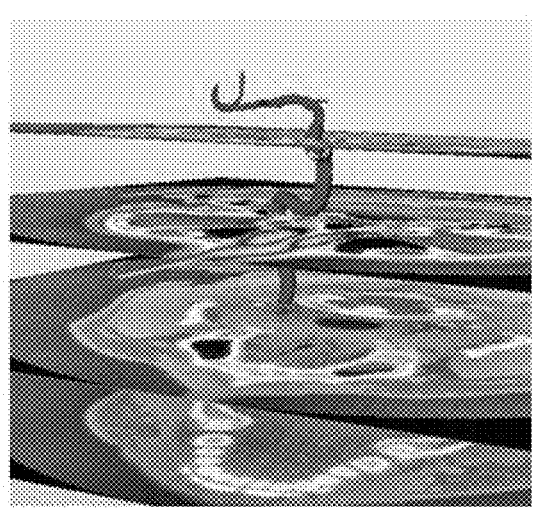
FIG. 7D illustrates the vessel depicted across medical images.
Figure 8A:
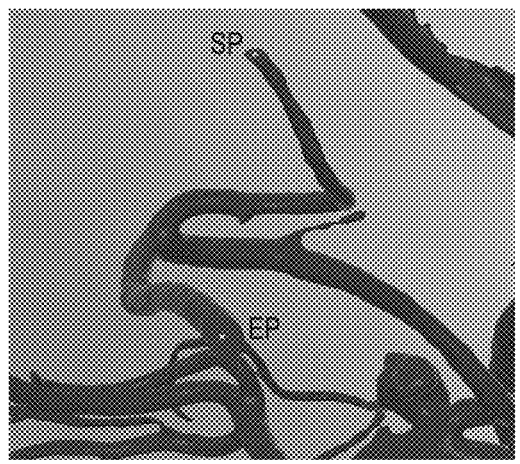
FIG. 8A illustrates start and end points of a patient specific anatomical feature.
Figure 8B:
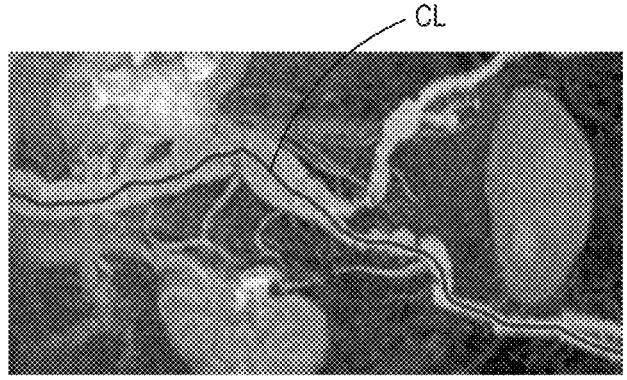
FIG. 8B illustrates a centerline of the patient specific anatomical feature.
Figure 8C:
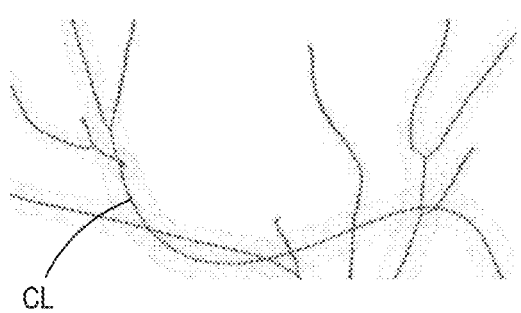
FIG. 8C illustrates the centerlines of various patient specific anatomical features.
Figure 8D:
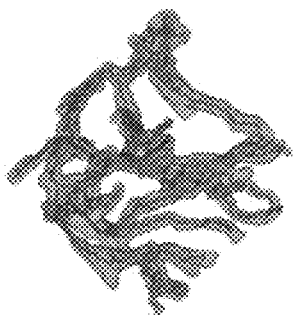
FIG. 8D illustrates the centerlines of a network of patient specific anatomical features.

At step 512, the centerline of the isolated anatomical feature may be determined based on the totality of center points, e.g., CP1, CP2, CP3 . . . . CPn. For example, the centerline may be a line drawn through all of the calculated center points of the isolated anatomical feature, as shown in FIG. 6. FIG. 7B illustrates centerline CL of an isolated anatomical feature as a line drawn through all of center points CP of FIG. 7A. Accordingly, as shown in FIG. 7C, the overall length of centerline CL of the isolated anatomical feature may be determined. FIG. 7D illustrates the 3D surface mesh model of the isolated anatomical feature of FIGS. 7A to 7C across the original medical images.

Referring now to FIG. 8, method 500 may be used to determine the centerlines of a vast network of patient specific anatomical features. For example, FIG. 8A illustrates the start and end points determined for a 3D surface mesh model of an isolated anatomical feature. FIG. 8B illustrates centerline CL determined for an isolated anatomical feature mapped to the original medical image. FIG. 8C illustrates centerlines CL for an anatomical feature comprising a plurality of vessels, and FIG. 8D illustrates centerlines CL for an anatomical feature comprising a vast network of vessels.

Figure 9:
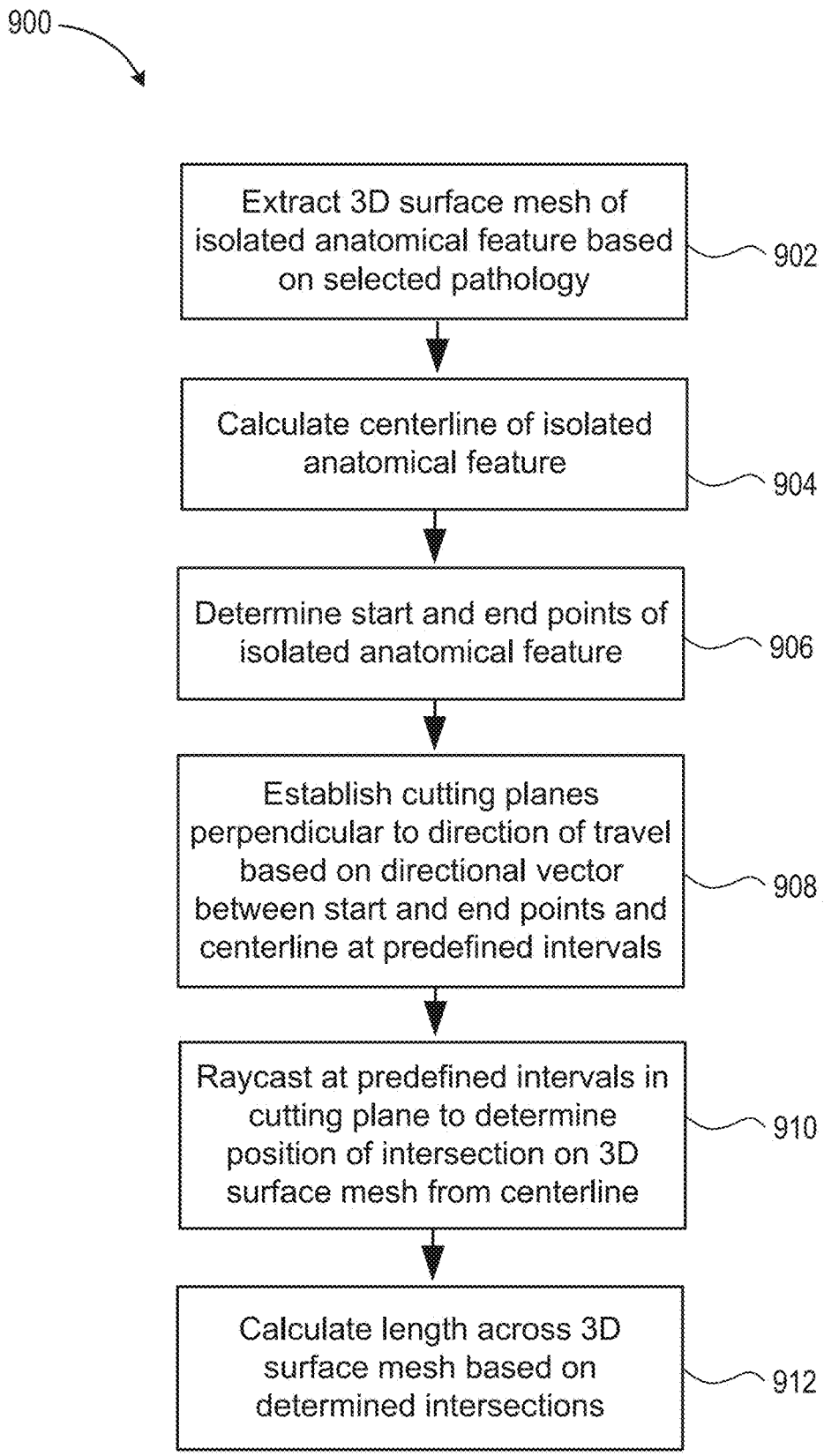
FIG. 9 is a flow chart illustrating exemplary method steps for generating surface length measurements of a patient specific anatomical feature in accordance with some embodiments.

Referring now to FIG. 9, exemplary method 900 for generating surface length measurements of a patient specific anatomical feature is provided. As described above with regard to step 210 of method 200 for multi-schema analysis of patient specific anatomical features from medical images of FIG. 2, physiological information, e.g., surface length measurements of the patient specific anatomical feature associated with the selected pathology, may be generated from the generated 3D surface mesh model. For example, at step 902, a specific anatomical feature may be isolated from the patient specific anatomical features within the medical images based on the selected pathology, as described above, such that a 3D surface mesh model of the isolated anatomical feature may be extracted from the 3D surface mesh model of the patient specific anatomical features and recorded.

Figure 10:
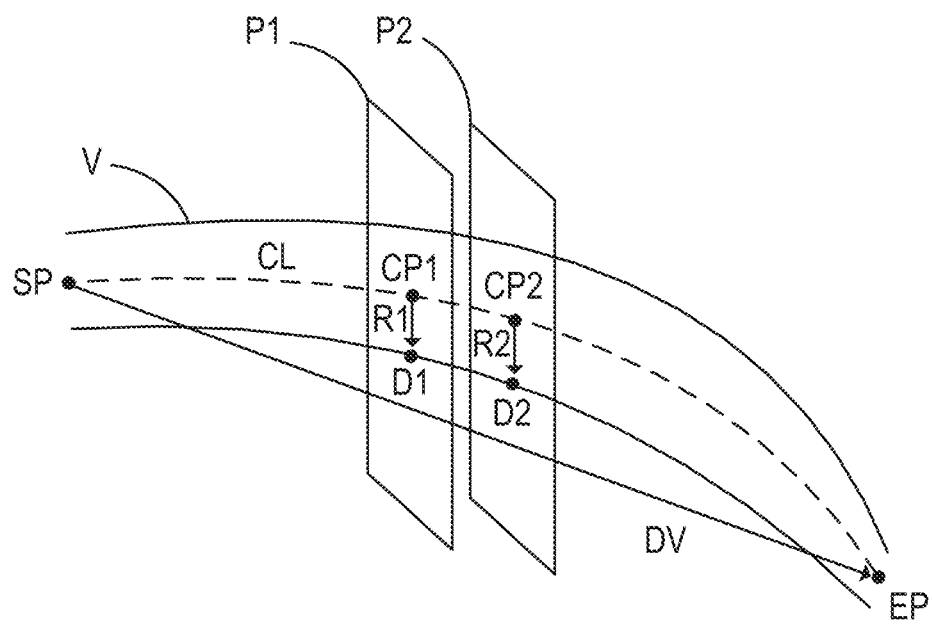
FIG. 10 illustrates determination of a surface length in accordance with some embodiments.

At step 904, the centerline of the isolated anatomical feature may be determined, e.g., via method 500 described above. At step 906, a start point and an end point of the isolated anatomical feature may be determined, e.g., at opposite ends of the isolated anatomical feature. At step 908, a predetermined step size may be determined, such that a cutting plane may be established at regular intervals defined by the predetermined step size along an axis of the isolated anatomical feature. As shown in FIG. 10, the cutting planes, e.g., P1, P2, at each interval of the isolated anatomical feature, e.g., vessel V, may be perpendicular to the direction of travel associated with the interval, e.g., the direction of travel of the centerline at the interval as described above, and may include the center point along centerline CL, e.g., CP1, CP2, at the respective interval and a point along directional vector DV extending from start point SP to end point EP.

Figure 11:
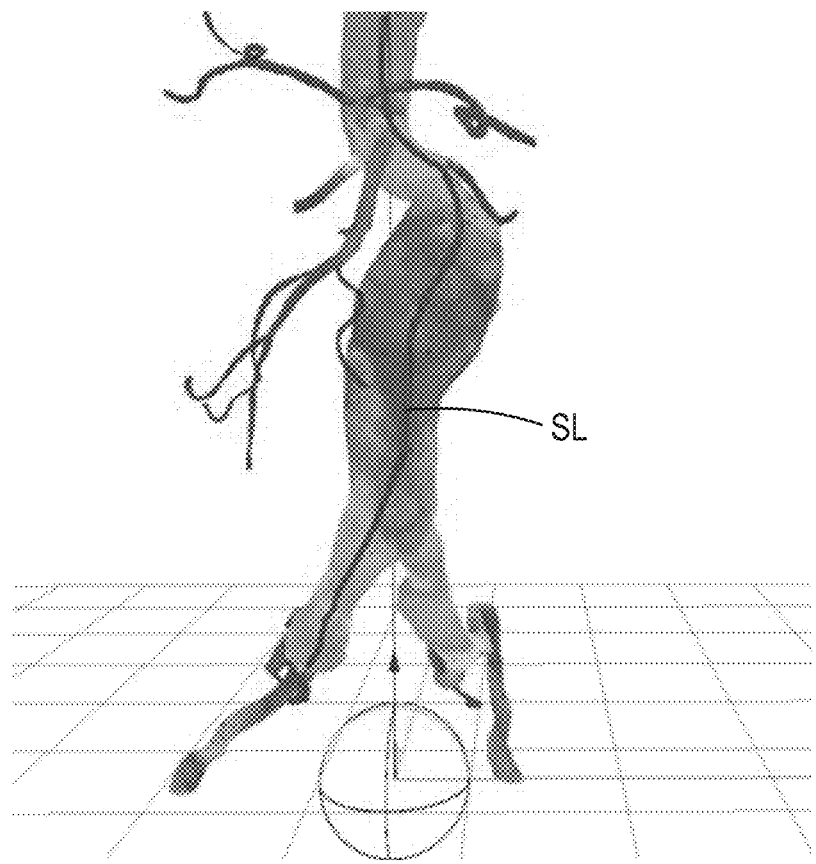
FIG. 11 illustrates a surface length of a patient specific anatomical feature.

At step 910, a ray, e.g., rays R1, R2, may be cast along each cutting plane, e.g., cutting plane P1, P2, at each interval from the respective center point, e.g., center points CP1, CP2, radially outwardly toward the 3D surface mesh model, such that the position of the intersection between the rays and the 3D surface mesh model are recorded, e.g., intersection points D1, D2. Step 10 may be repeated at each predefined interval to determine a series of intersection points along the surface topology of the 3D surface mesh model. At step 912, the overall length of a line extending across the surface of the 3D surface mesh model of the isolated anatomical feature, as defined by the intersection points determined at step 910, may be calculated based on the determined intersection points. FIG. 11 illustrates surface line SL extending across the surface topology of a 3D surface mesh model of an isolated anatomical feature.

For example, regarding cardiac image segmentation, once the automated segmentation has been completed, a 3D surface mesh model of the heart surrounding vessels will be created. This 3D data may then be automatically analyzed to assess specific lengths pertaining to the landmarks of the heart which may include, but are not limited to: atrium; ventricle; aorta; vena cava; mitral valve; pulmonary valve; aortic valve; tricuspid valve; myocardium; coronary arteries; left atrial appendages. The landmarks of the heart may be identified as described in further detail below with regard to FIG. 31A.

Figure 12:
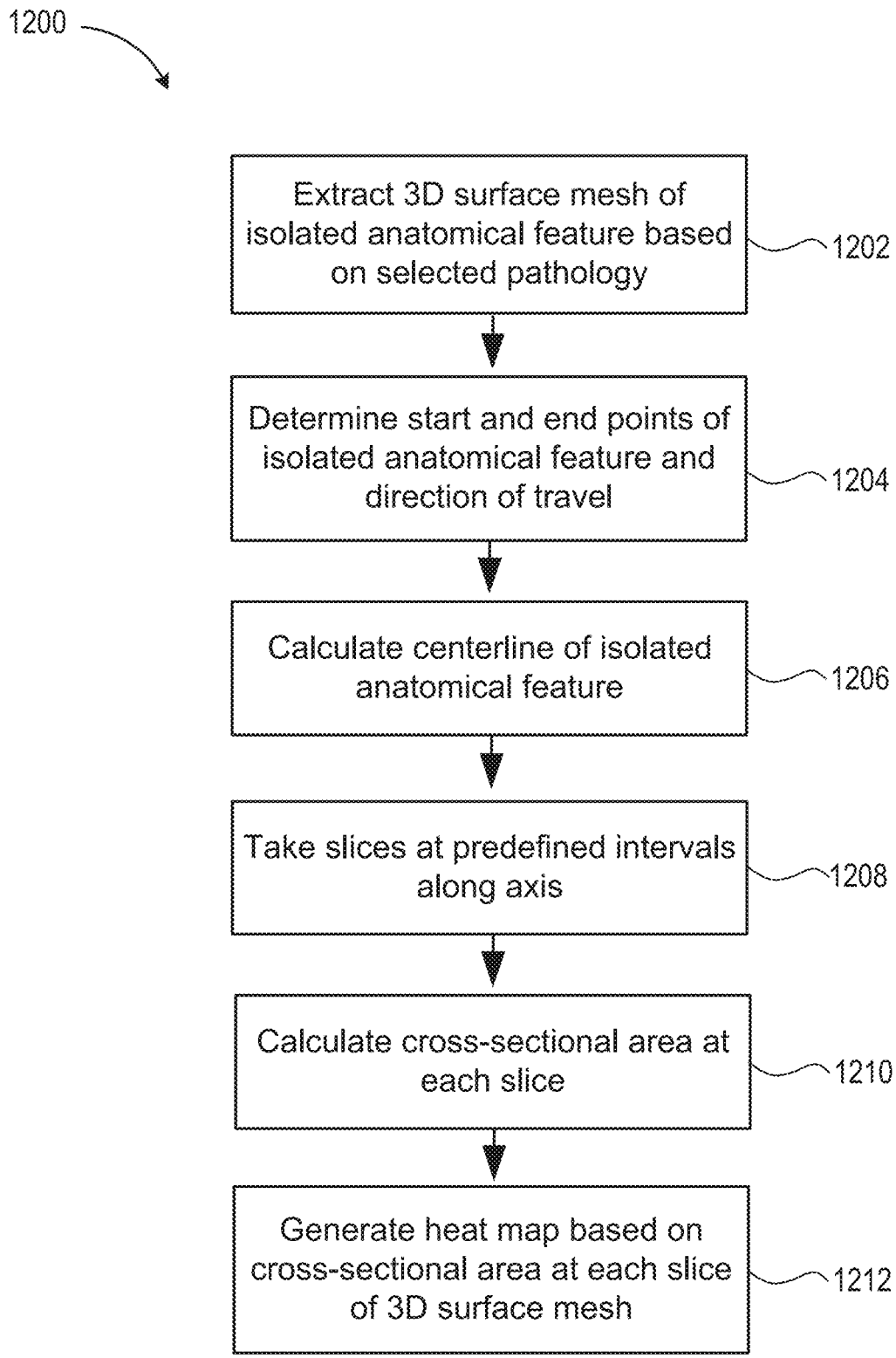
FIG. 12 is a flow chart illustrating exemplary method steps for generating a heat map of a patient specific anatomical feature based on volume in accordance with some embodiments.

Referring now to FIG. 12, exemplary method 1200 for generating a heat map of a patient specific anatomical feature based on volume is provided. As described above, the cross-sectional area of the isolated anatomical feature at predefined intervals along an axis of the isolated anatomical feature may be determined, such that a heat map of the 3D surface mesh model may be generated based on cross-sectional areas of the 3D surface mesh model along the axis of the isolated anatomical feature. For example, at step 1202, a specific anatomical feature may be isolated from the patient specific anatomical features within the medical images based on the selected pathology, as described above, such that a 3D surface mesh model of the isolated anatomical feature may be extracted from the 3D surface mesh model of the patient specific anatomical features and recorded. At step 1204, a start point and an end point of the isolated anatomical feature is determined, and an initial direction of travel may be determined consistent with the directional vector extending from the start point to the end point. At step 1206, the centerline of the isolated anatomical feature may be determined, e.g., via method 500 described above.

Figure 13A:
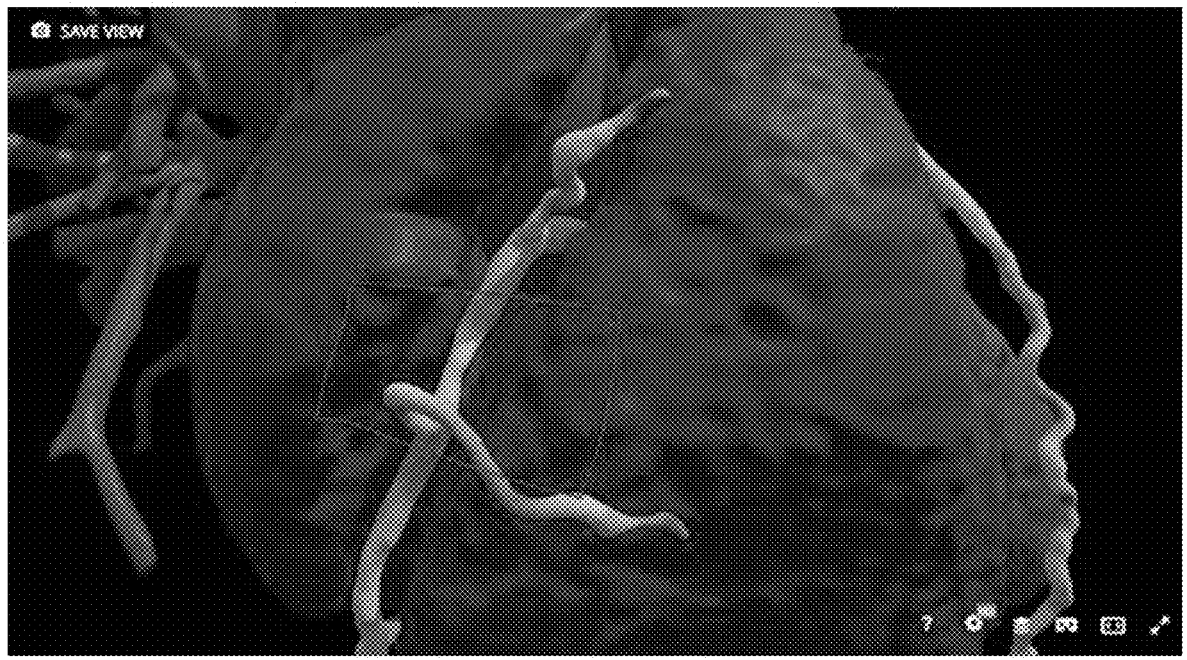
FIGS. 13A and 13B illustrate volume-based heat maps of a patient specific anatomical feature.
Figure 13B:
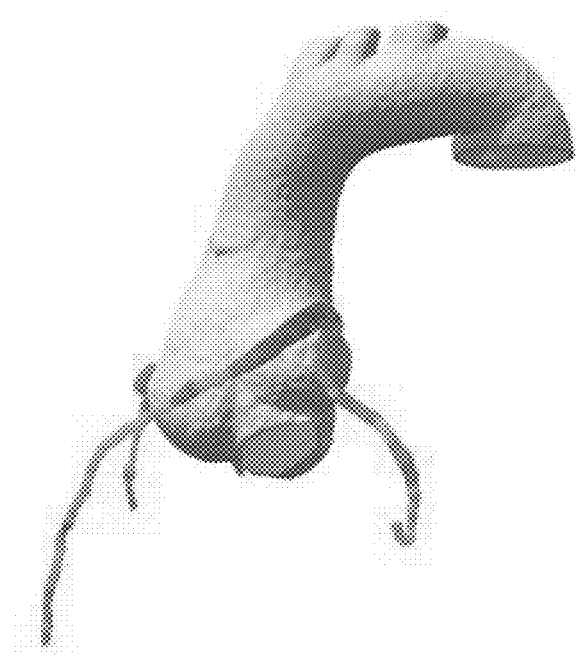

At step 1208, a predetermined step size may be determined, such that slices may be taken at regular intervals defined by the predetermined step size along the centerline of the isolated anatomical feature. Accordingly, a slice of the isolated anatomical feature may be taken at each interval perpendicular to the direction of travel along the centerline. At step 1210, using standard computational functions, the cross-sectional area at each slice of the isolated anatomical feature may be calculated, as defined by the perimeter of the isolated anatomical feature. At step 1210, a heat map may be generated based on the cross-sectional areas at each slice of the 3D surface mesh model, thereby visually indicating the change in volume throughout the isolated anatomical feature, as shown in FIGS. 13A and 13B.

Figure 14:
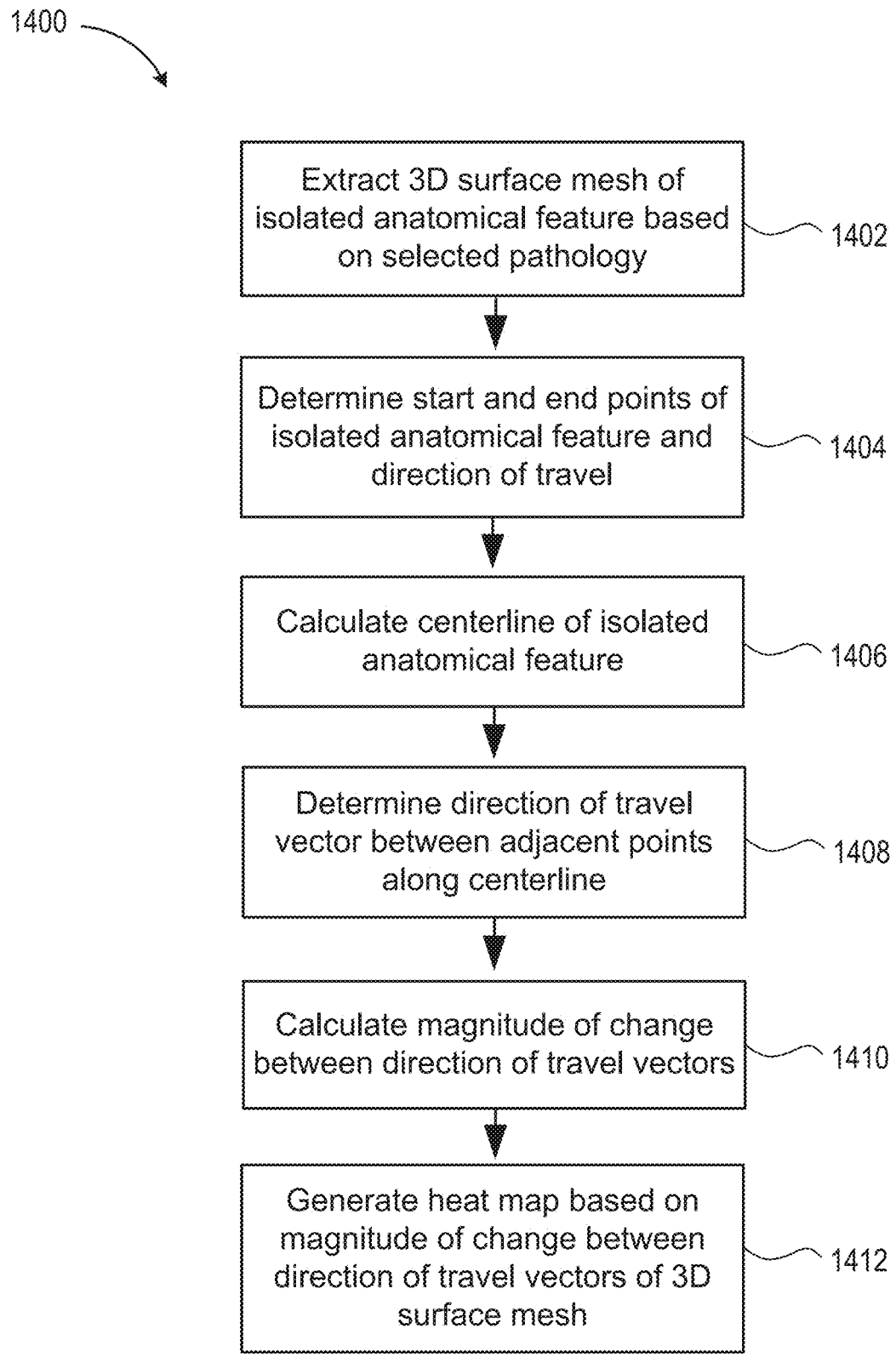
FIG. 14 is a flow chart illustrating exemplary method steps for generating a heat map of a patient specific anatomical feature based on tortuosity in accordance with some embodiments.

Referring now to FIG. 14, exemplary method 1400 for generating a heat map of a patient specific anatomical feature based on tortuosity is provided. As described above, the direction of travel at predefined intervals of the centerline of the isolated anatomical feature may be determined, such that a heat map of the 3D surface mesh model may be generated based on the magnitude of change of the direction of travel along the axis of the isolated anatomical feature. For example, at step 1402, a specific anatomical feature may be isolated from the patient specific anatomical features within the medical images based on the selected pathology, as described above, such that a 3D surface mesh model of the isolated anatomical feature may be extracted from the 3D surface mesh model of the patient specific anatomical features and recorded. At step 1404, a start point and an end point of the isolated anatomical feature is determined, and an initial direction of travel may be determined consistent with the directional vector extending from the start point to the end point. At step 1406, the centerline of the isolated anatomical feature may be determined, e.g., via method 500 described above.

Figure 15:
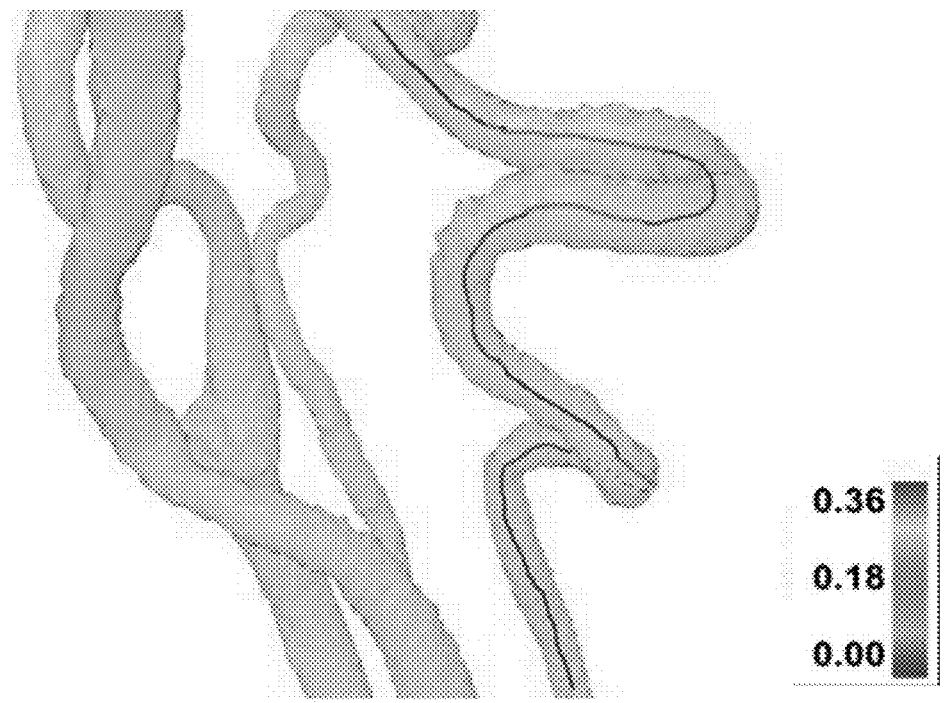
FIG. 15 illustrates a tortuosity-based heat map of a patient specific anatomical feature.

At step 1408, the direction of travel at predefined intervals of the centerline of the isolated anatomical feature may be determined, e.g., based on the directional vectors extending between adjacent center points along the centerline as described above. At step 1410, the magnitude of change between the direction of travel of adjacent intervals may be determined. For example, the magnitude of change may be calculated using the directional vectors associated with the respective directions of travel at each interval. At step 1412, a heat map may be generated based on the magnitudes of change between the direction of travel of adjacent intervals along the axis of the 3D surface mesh model, thereby visually indicating the tortuosity of the isolated anatomical feature, as shown in FIG. 15. Accordingly, the magnitude of change, e.g., angular changes, that are outputted from the analysis may be cross-referenced with an existing knowledge database of known classification angular deviations, and displayed to the user. The tortuosity value may be depicted as a total change in angle of the vessel and scored, e.g., 760 degrees rotation score.

Figure 16:
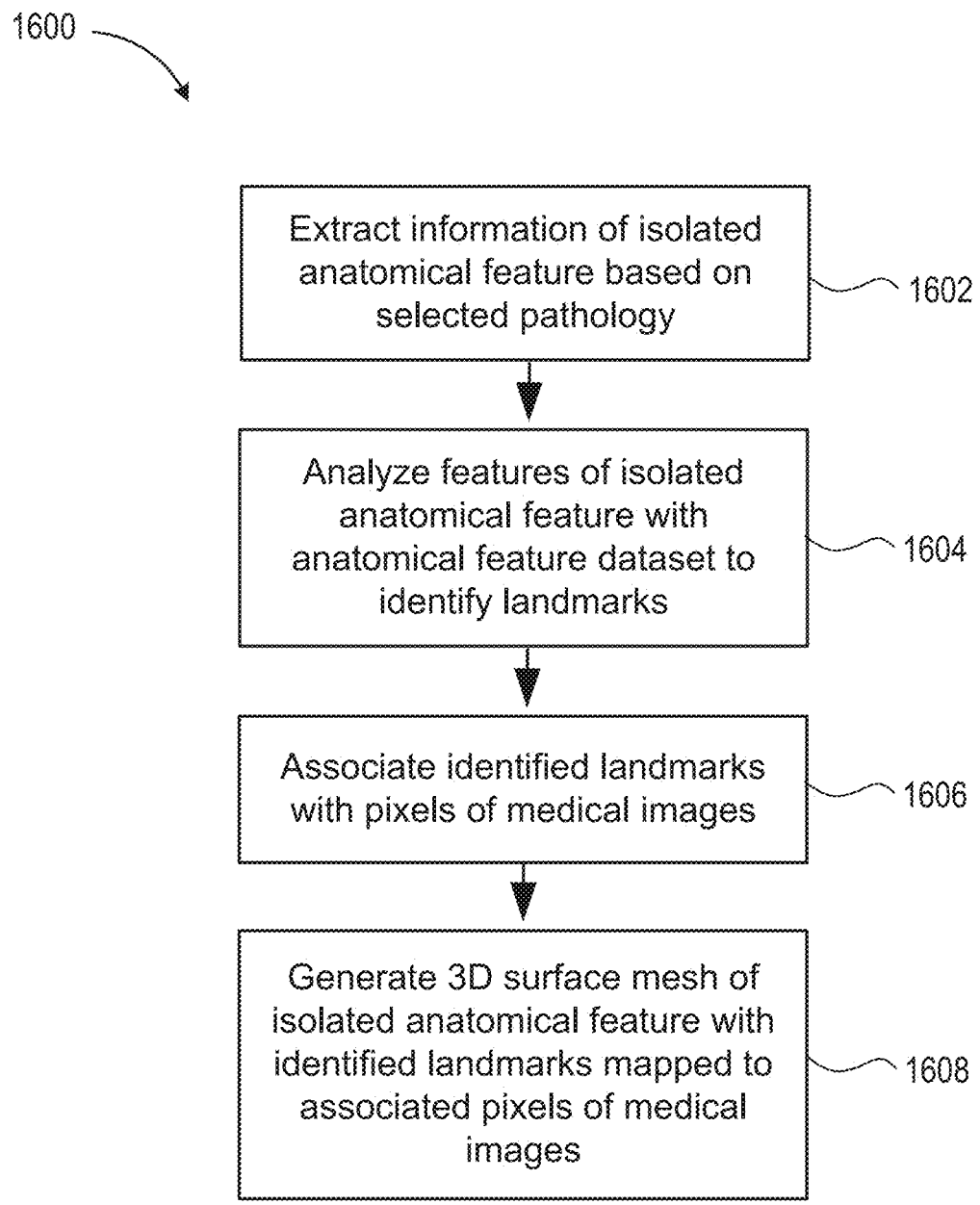
FIG. 16 is a flow chart illustrating exemplary method steps for generating a 3D surface mesh model of a patient specific anatomical feature with identified landmarks in accordance with some embodiments.

Referring now to FIG. 16, exemplary method 1600 for generating a 3D surface mesh model of a patient specific anatomical feature with identified landmarks is provided. As described above with regard to FIG. 2, medical images, as shown in 1702 of FIG. 17A, may be automatically processed to identify patient specific anatomical features, as shown in 1704 of FIG. 17A, such that a 3D surface mesh model of the classified patient specific anatomical features within the medical images may be generated. Method 1600 further identifies corresponding landmarks of the patient specific anatomical features, e.g., a bone notch or heart valve, such that the landmarks may be depicted in the 3D surface mesh model. For example, prior to generation of the 3D surface mesh model based on the classified patient specific anatomical features, at step 1602, information indicative of a specific anatomical feature may be isolated from the data representing the patient specific anatomical features within the medical images based on the selected pathology, as shown in 1706 of FIG. 17A (anatomy delineation).

At step 1604, features of the isolated anatomical feature may be analyzed with an anatomical feature dataset to identify one or more landmarks of the isolated anatomical feature associated with the selected pathology, e.g., using the automated anatomical landmark detection algorithms described above. For example, the anatomical feature dataset may include knowledge of anatomical landmarks, e.g., existing semantically labeled anatomical feature datasets, associated with various patient specific anatomical features, such that the landmarks may be identified and individually labeled by establishing links between the classified, isolated anatomical feature and the anatomical feature dataset. Additionally, or alternatively, the anatomical landmarks may be automatically identified by leveraging Deep Learning Reinforcement (DLR) techniques, as described in further detail below with regard to FIGS. 31A to 31E. At step 1606, the identified, labeled landmarks may be associated with pixels of the original medical images, as shown in 1708 of FIG. 17A. At step 1608, a 3D surface mesh model of the isolated anatomical feature may be generated depicting the identified landmarks mapped to the pixels of the medical images associated therewith, as shown in 1710 of FIG. 17A.

Figure 17A:
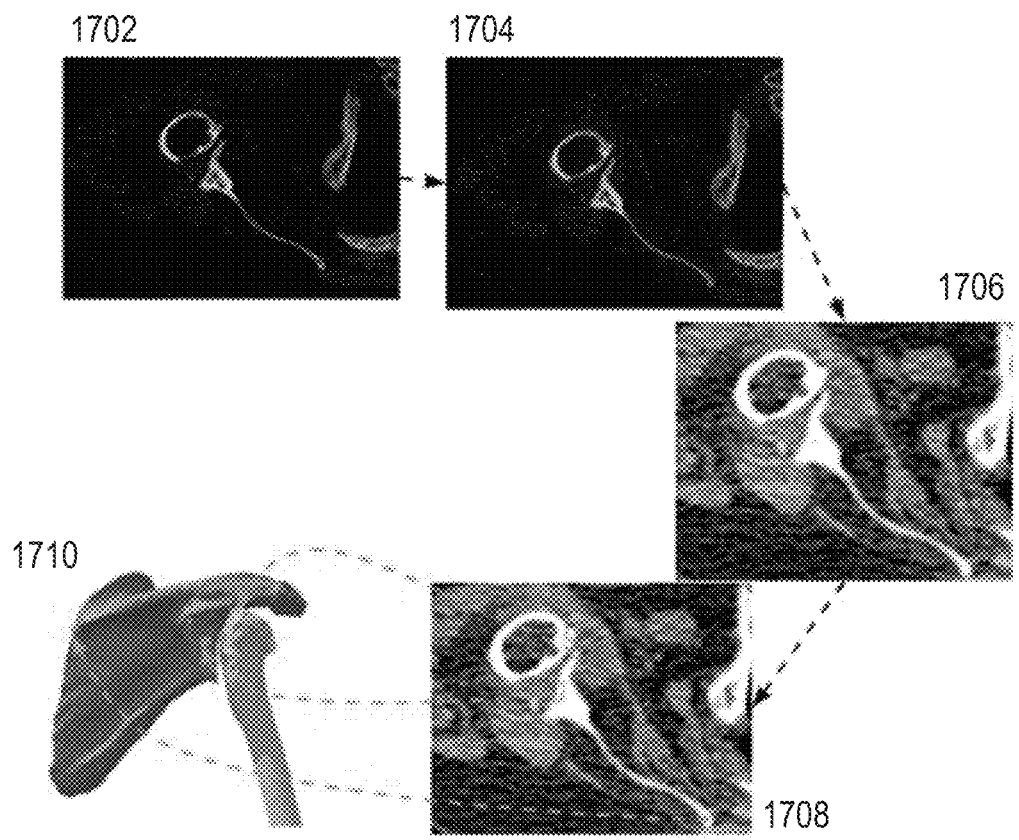
FIG. 17A illustrates exemplary method steps for mapping identified landmarks of a patient specific anatomical feature to a 3D surface mesh model in accordance with some embodiments.
Figure 17B:
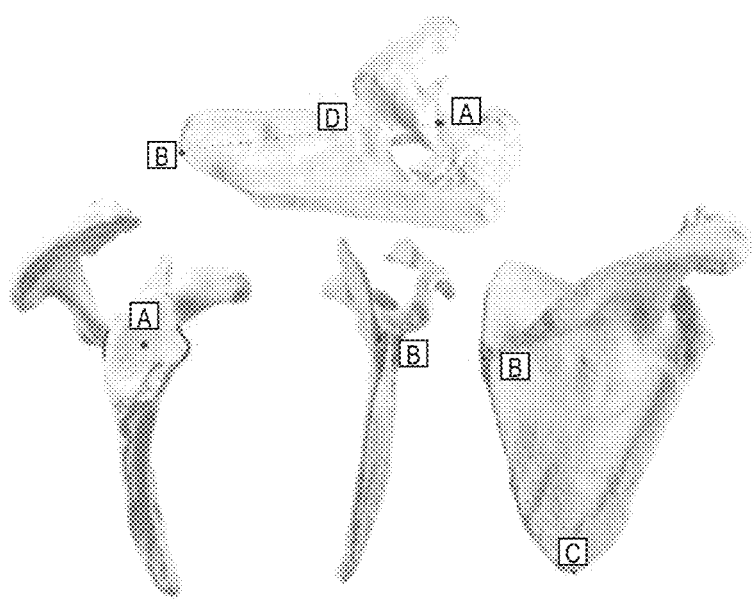
FIG. 17B illustrates identified landmarks of a patient specific anatomical feature mapped to a 3D surface mesh model.

The identified anatomical landmarks are a meaningful point in a patient's anatomy that has significance to its form or function, such as orientation and insertion points for other anatomical features and/or medical devices. The identified landmarks may help surgeons ensure the landmarks correspond to a specific portion of anatomy and ensure its proper function and orientation. The identified landmarks further may be utilized within clinical practice as markers on anatomy to facilitate diagnosis and/or treatment of a patient, e.g., as an initial reference for anatomical guide fixation and trajectory planning. For example, specific anatomical landmarks identified for each bone may be automatically detected, such that a guide may be generated for cutting and drilling of the bone, as described in further detail below with regard to FIG. 32. Thus, the identified anatomical landmarks may be used as inputs for clinical functions have significant benefits. For example, FIG. 17B illustrates the following identified landmarks: (A) fossa center, (B) trigonum, (C), inferior angle, (D) center of spine of scapula, mapped to the isolated anatomical feature, e.g., a scapula for shoulder replacement. Accordingly, the identified landmarks may serve as a reference to provide guidance for cutting planes and drilling trajectories within bones, as well as for device fixation in the bone.

Figure 18:
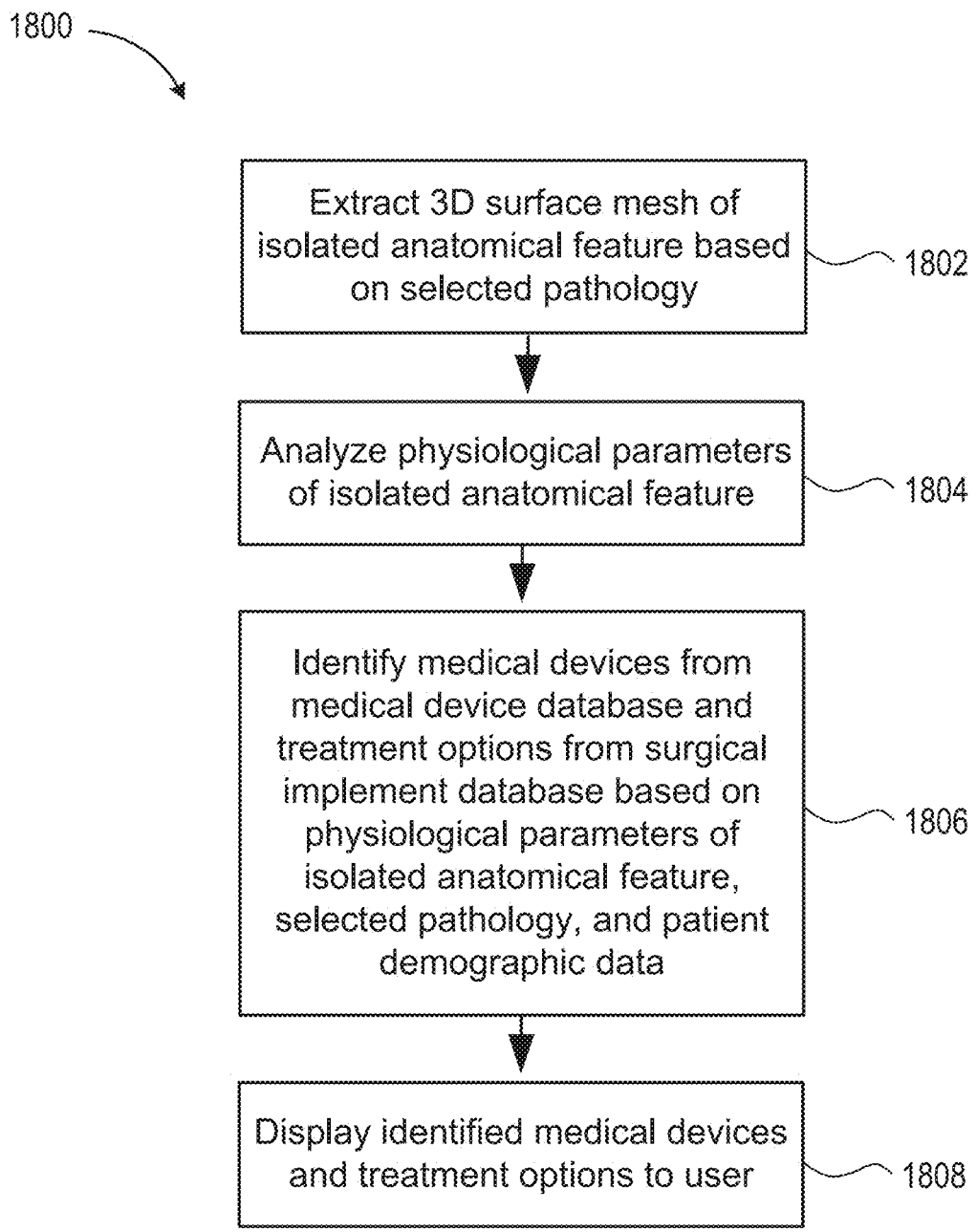
FIG. 18 is a flow chart illustrating exemplary method steps for identifying medical devices and treatment options for a pathology in accordance with some embodiments.
Figure 19A:
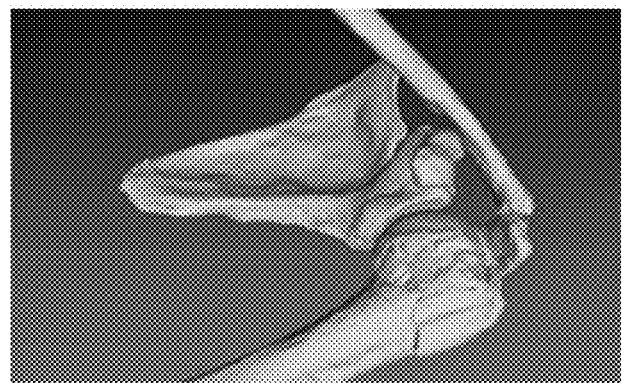
FIG. 19A illustrates a pathology of a bone.

Referring now to FIG. 18, exemplary method 1800 for identifying medical devices and treatment options for a pathology is provided. For example, at step 1802, a specific anatomical feature may be isolated from the patient specific anatomical features within the medical images based on the selected pathology, as described above, such that a 3D surface mesh model of the isolated anatomical feature may be extracted from the 3D surface mesh model of the patient specific anatomical features and recorded, as shown in FIG. 19A. At step 1804, physiological parameters of the isolated anatomical feature may be analyzed, as described above, for example, to determine measurements such as volume, centerline, surface length, cross-sectional area, diameter, density, etc.

Figure 19B:
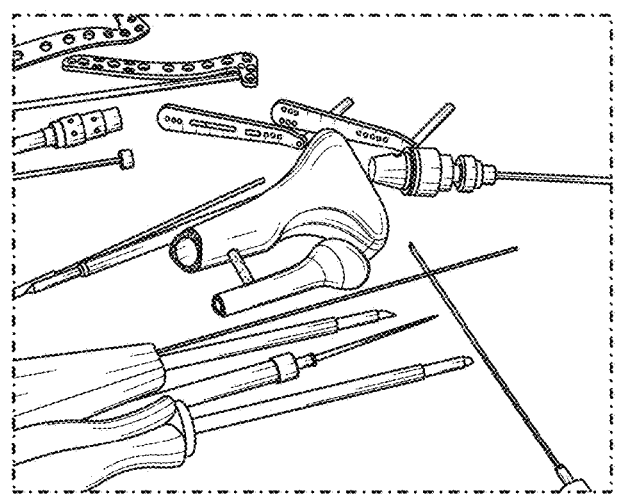
FIGS. 19B and 19C illustrate various medical devices that may be used for treatment of the pathology.
Figure 19C:
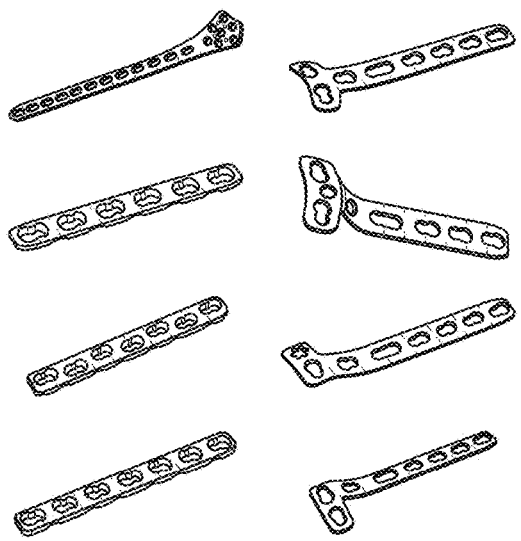

Based on the physiological parameters of the isolated anatomical feature as well as patient demographic data associated with the medical images, at step 1806, one or more medical devices and/or treatment options may be identified from a medical device database having knowledge of various medical devices including their function and specifications and/or a surgical implement database having knowledge of pathology-specific treatment options. For example, physiological parameters of the isolated anatomical feature may indicate the size of a selected pathology, such that a specific sized medical device that is known to be used to treat the selected pathology may be identified for use in treating the pathology. The identified medical devices may further be selected from an internal inventory, e.g., medical devices available or provided by a specific hospital. The knowledge datasets described herein may further include knowledge of the combination of anatomy with non-organic material, e.g., polymers, metals and ceramic, such that non-organic material may also be auto-segmented. In addition, the knowledge datasets may include knowledge of medical devices which may be used as inputs for creation of patient specific guides, e.g., knowledge of preexisting implants for the correction of bony pathologies. For example, known dimensions and variabilities of the devices may be used as inputs in the device's automated design. At step 1808, the identified medical devices and/or treatment options may be displayed to the user, such that the user may make an informed decisions regarding preoperative planning and treatment, as shown in FIGS. 19B and 19C.

The ability to provide the automated segmentation opens up a number of beneficial pathology specific applications. For example, some specific pathologies/treatments that require higher volume 3D models (virtual or physical) are listed in Table 1 below. Moreover, patient specific 3D digital models of medical devices may be generated based on the specific pathology to be treated, e.g., the pathologies listed below, and further 3D printed to create a physical, patient specific medical device, as described in further detail below with regard to FIG. 32

TABLE 1

| Where | Pathology | How to treat |
|---|---|---|
| C | LAA—left atrial appendage | Occlusion device (watchman) |
| C | Mitral valve regurgitation | Mitral valve replacement |
| C | Aortic valve regurgitation | TAVI/TAVR—Transcatheter aortic valve implantation |
| C | Aortic aneurysms | Patient specific stent |
| IR | AAA—Abdominal aortic aneurysms | Patient specific Stent |

TABLE 1-continued

| Where | Pathology | How to treat |
|---|---|---|
| C | Septal defects (ventricle or atrium) | Occlusion device |
| C | Coronary heart disease | Arthrectomy/Angioplasty via catheter or coronary bypass |
| N | Ischemic Stroke | Aspiration stent or no stent retrieval catheter |
| N | Hemorrhagic stroke | Craniotomy |
| N | Neuro Aneurysm (ICA) | Stent, coil or clip |
| O | Bone Fractures | Plates or Patient specific instrumentation |
| O | Primary orthopaedic replacement failure (Hip, knee, pelvis) | Revision instrument— Patient specific guide & Patient specific instrumentation |
| O-On | Osteosarcoma | Patient specific guide & Patient specific instrumentation |
| O | Scoliosis | Plates or Patient specific instrumentation |
| O | Osteoarthritis—hip | Joint replacement, primary hip replacement Ortho instruments |
| O | Osteoarthritis—knee | Joint replacement, primary knee replacement Ortho instruments |
| O | Osteoarthritis—knee | Joint replacement, primary shoulder replacement Ortho instruments |
| ON | General oncology (lung, liver, Kidney, skull base, brain) | Resection or radiation of tumor mass |
| M | Midface deformities | Le Fort procedure—facial reconstruction with osteotomies |
| G | Colon disease—Bowel cancer, Crohn's disease,, colitis, diverticulitis | Stoma and colostomy bag |
| G | Prostate enlargement, bladder cancer & urinary incontinence | Urinary catheter |
| O | Cruciate ligament/ meniscus tears | Knee replacements |
| C | Aortic Stenosis | Transcatheter aortic valve replacement |

Figure 20:
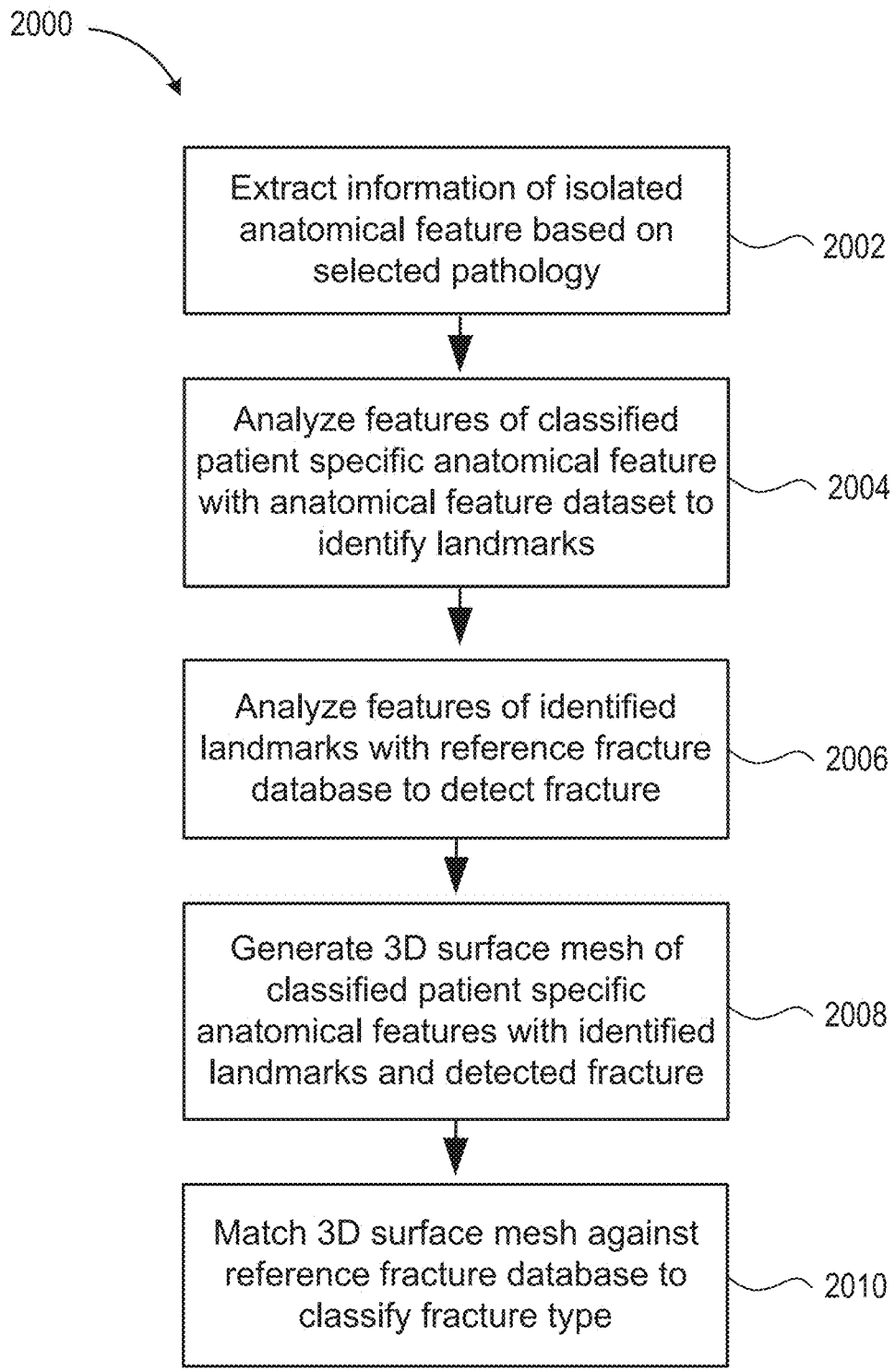
FIG. 20 is a flow chart illustrating exemplary method steps for detecting and classifying a fracture of a patient specific anatomical feature in accordance with some embodiments.
Figure 21A:
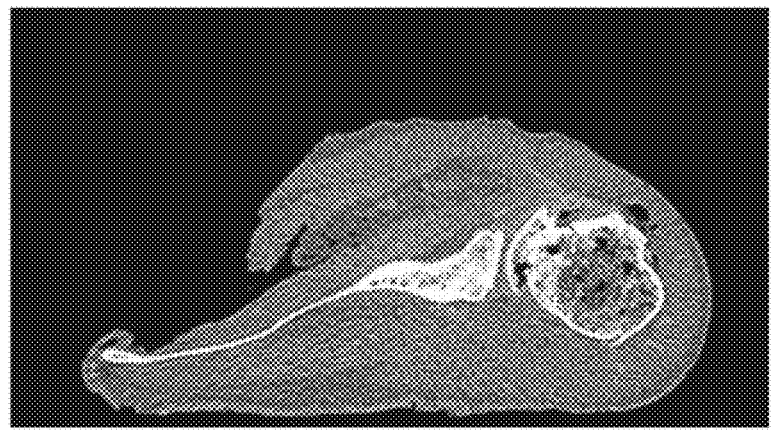
FIGS. 21A to 21D illustrate mapping a detected fracture of a patient specific anatomical feature to a 3D surface mesh model in accordance with some embodiments.
Figure 21B:
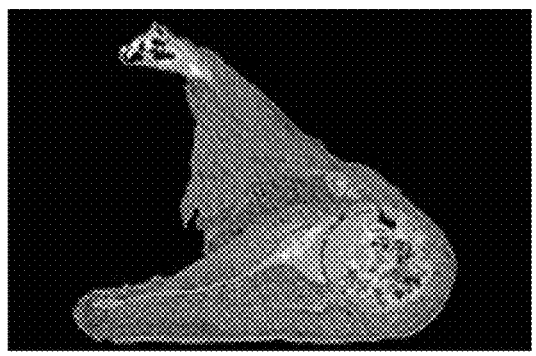
Figure 21C:

O—Ortho
C—cardiac/cardiology
N—Neuro
G—General
M—Max fax
On—Oncology
IR—Interventional radiology Referring now to FIG. 20, exemplary method 2000 for detecting and classifying a fracture of a patient specific anatomical feature is provided. As described above with regard to FIG. 2, medical images, as shown in FIG. 21A, may be automatically processed to identify patient specific anatomical features, such that a 3D surface mesh model of the classified patient specific anatomical features within the medical images may be generated. Method 1600 further detects/identifies corresponding fractures of the patient specific anatomical features, e.g., in a bone such as the tibia, fibia, or medial malleolus, such that the fractures may be depicted in the 3D surface mesh model. For example, prior to generation of the 3D surface mesh model based on the classified patient specific anatomical features, at step 2002, information indicative of a specific anatomical feature may be isolated from the data representing the patient specific anatomical features within the medical images based on the selected pathology, as shown in FIGS. 21B and 21C.

Figure 21D:
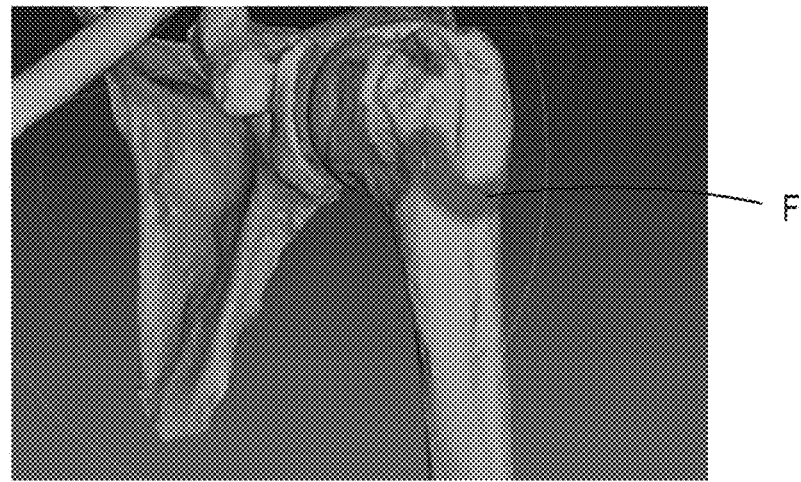

At step 2004, features of the isolated anatomical feature may be analyzed with an anatomical feature dataset to identify one or more landmarks of the isolated anatomical feature, e.g., a bone notch, associated with the selected pathology. As described above, the anatomical feature dataset may include knowledge of anatomical landmarks associated with various patient specific anatomical features, such that the landmarks may be identified and individually labeled by establishing links between the classified, isolated anatomical feature and the anatomical feature dataset. At step 2006, features of the identified landmark may be analyzed with an reference fracture database to identify one or more fractures of the identified landmark of the isolated anatomical feature associated with the selected pathology. The reference fracture database may include knowledge of various fractures, e.g., existing semantically labeled reference fracture datasets, associated with various patient specific anatomical features, such that the fractures may be identified and individually labeled by establishing links between the classified, isolated anatomical feature and the anatomical feature dataset. At step 2008, a 3D surface mesh model of the isolated anatomical feature may be generated depicting the identified landmarks and detected fracture F, as shown in FIG. 21D. Moreover, at step 2010, the 3D surface mesh model may be matched against the reference fracture database to classify the fracture type.

Figure 22:
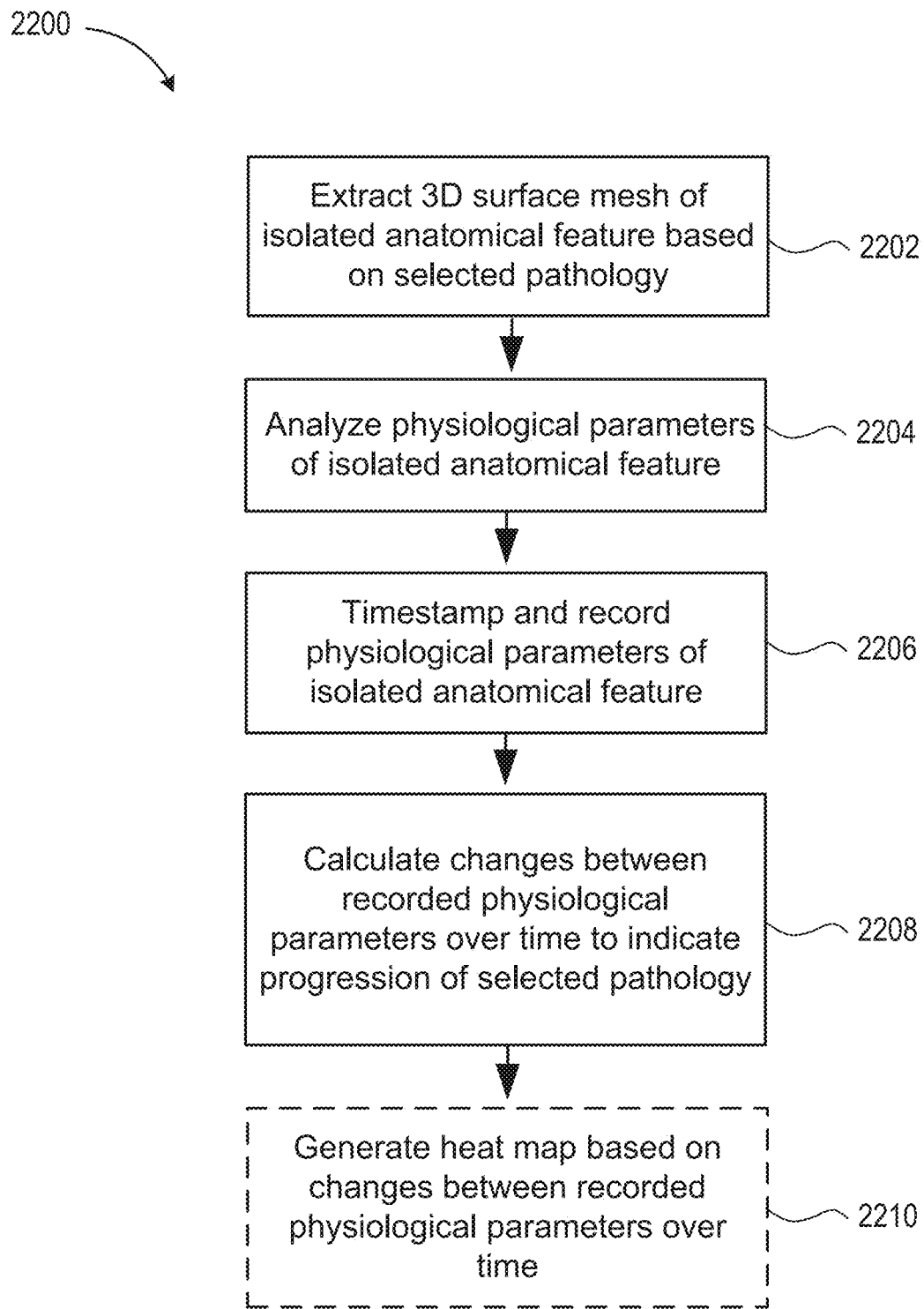
FIG. 22 is a flow chart illustrating exemplary method steps for tracking progression of a pathology over time in accordance with some embodiments.
Figure 23A:
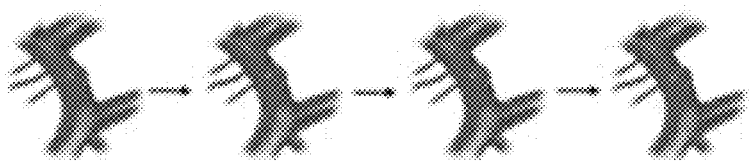
FIGS. 23A to 23F illustrate various progressions of pathologies over time.
Figure 23B:
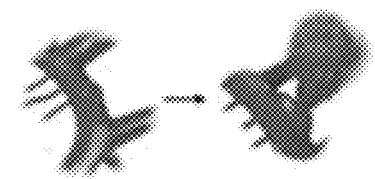
Figure 23C:
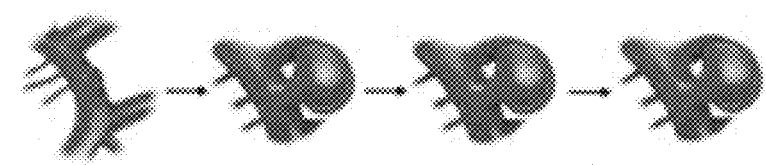
Figure 23D:
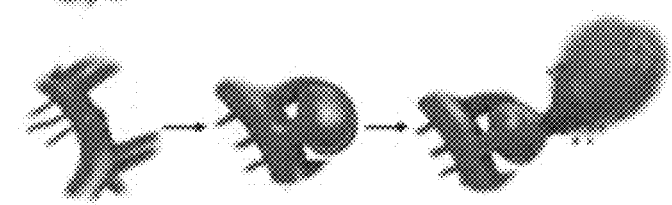
Figure 23E:
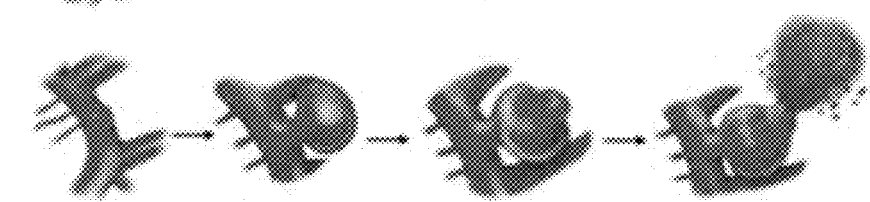
Figure 23F:
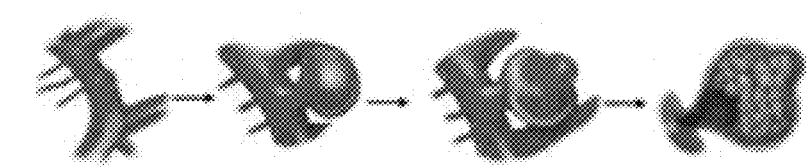
Figures 24A, 24B, 24C, 24D, 24E, 24F:
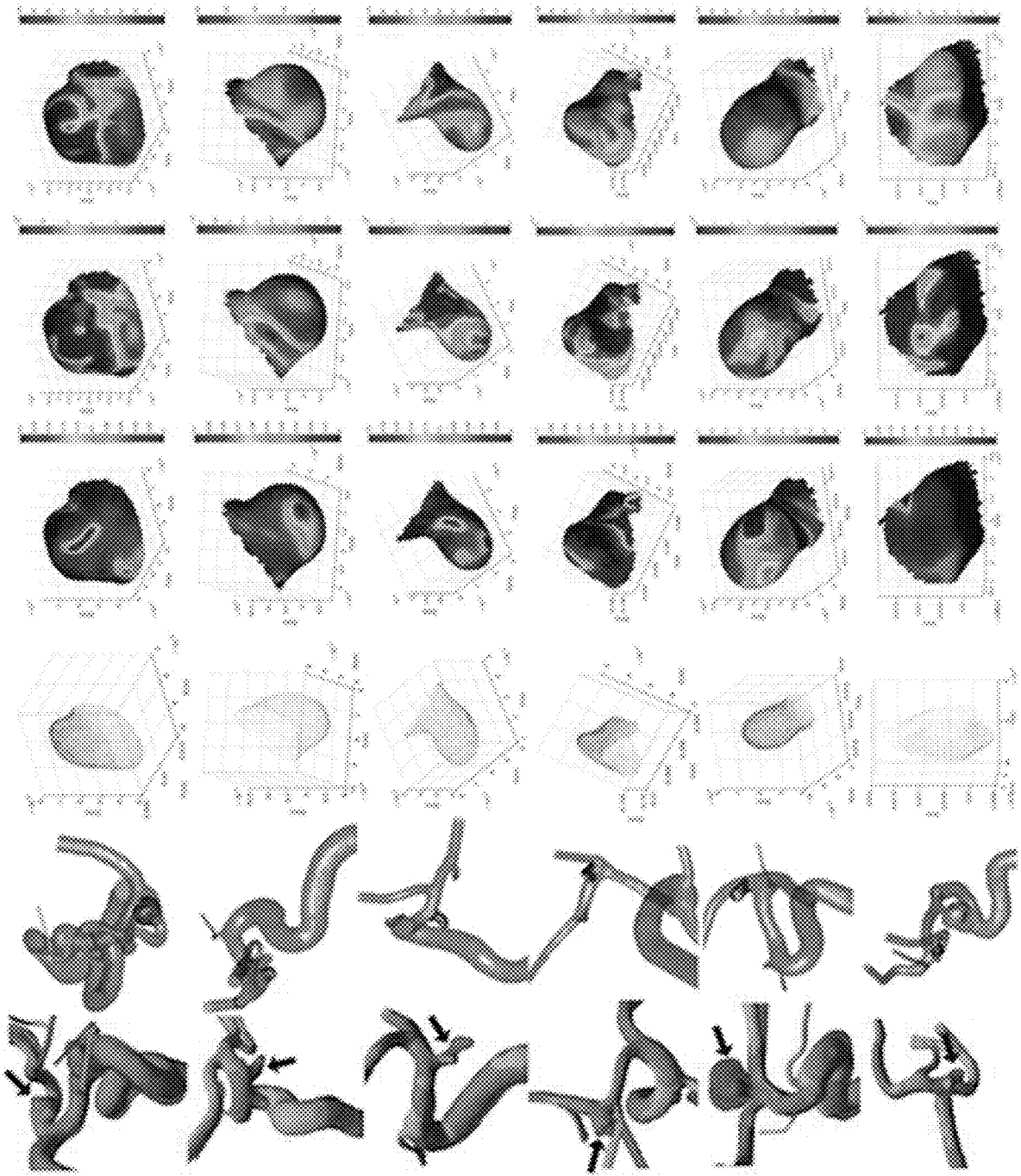
FIGS. 24A to 24F illustrate heat maps of various progressions of pathologies over time.

Referring now to FIG. 22, exemplary method 2200 for tracking progression of a pathology over time is provided. For example, at step 2202, a specific anatomical feature may be isolated from the patient specific anatomical features within the medical images based on the selected pathology, as described above, such that a 3D surface mesh model of the isolated anatomical feature may be extracted from the 3D surface mesh model of the patient specific anatomical features and recorded. At step 2204, physiological parameters of the isolated anatomical feature may be analyzed, as described above, for example, to determine measurements such as volume, centerline, surface length, cross-sectional area, diameter, density, etc.

For example, once the automated segmentation has been completed, a 3D surface mesh model of the aneurysm and vascular anatomy may be generated. This 3D data may then be automatically analyzed to assess specific lengths pertaining to the aneurysm morphology, which may include, but are not limited to measurements of the aneurysm neck, diameter measurements of the aneurysm at maximum distances, and measurements of center points of the superior and inferior aneurysm necks.

At step 2206, the analyzed physiological parameters of the isolated anatomical feature may be timestamped and recorded, such that over time, there is a chronological record of the physiological parameters for a specific patient. At step 2208, changes between the recorded/timestamped physiological parameters over time may be calculated to indicate, e.g., progression and prognosis of the selected pathology. For example, FIGS. 23A to 23F illustratively show growth of various aneurysms over time, leading to eventual rupture. Optionally, at step 2210, a heat map may be generated to visually depict the changes between the recorded/timestamped physiological parameters over time, as shown in FIGS. 24A to 24F.

Figure 25:
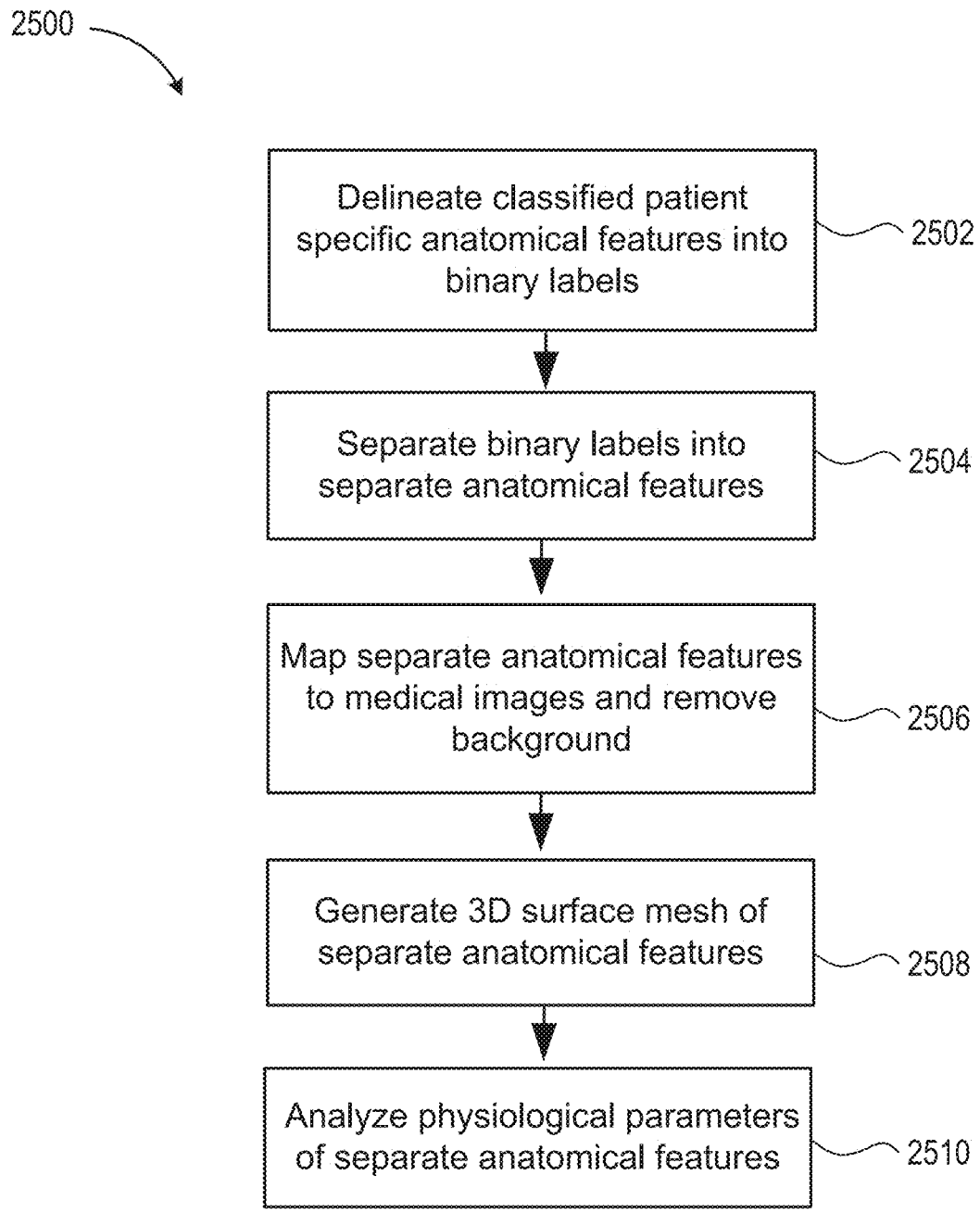
FIG. 25 is a flow chart illustrating exemplary method steps for analyzing physiological parameters of separate anatomical features in accordance with some embodiments.

Referring now to FIG. 25, exemplary method 2500 for semantic volume rendering is provided. A single medical image 2602 of a stack of medical images 2604 is shown in FIG. 26. Volume rendering is an important solution that is adopted by medical professionals globally to visualize medical imaging datasets in 3D space. They work by mapping pixel characteristics such as specific color, intensity, or opacity to specific voxels within the 3D scene. There are deficiencies associated with this method of imaging whereby overlapping and deep structures are not easily visualized in detail. Thus, to cure these deficiencies, method 2500 generates 3D surface mesh models of separate anatomical features, such that physiological parameters of the separate anatomical features may be analyzed.

For example, the results of the automatic image segmentation may take the form of a series of binary pixel arrays contained in medical images, e.g., DICOM files. When assembled into a volume, the binary pixel arrays may be used to mask the areas of the source pixel volume that are not relevant to the identified anatomy. The remaining Hounsfield value volume may then be rendered using standard volume rendering techniques with the color transfer function, such that pixel intensity may be determined based on the Hounsfield values. Moreover, the length of the anatomical feature, e.g., a vessel, may be calculated based on the output from the automated segmentation algorithm and subsequent 3D reconstruction. The data extracted from the 3D reconstruction may then be automatically analyzed to output a length from one specific anatomical landmark or abnormality to another, e.g., the length from the aortic arch to the thrombus in the case of a stroke. The measurement in the case of a vessel may be calculated by creating a center point on a cross section of the vessel, and extrapolated the center points through the vessel and joining the center points to create a centerline of the anatomy. This centerline may then be automatically measured and outputted to the user as a length value.

Figure 27A:
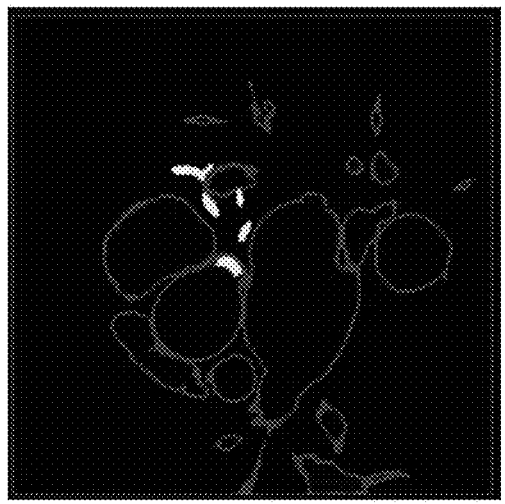
FIG. 27A illustrates an original medical image of a patient specific anatomical feature.
Figure 27B:
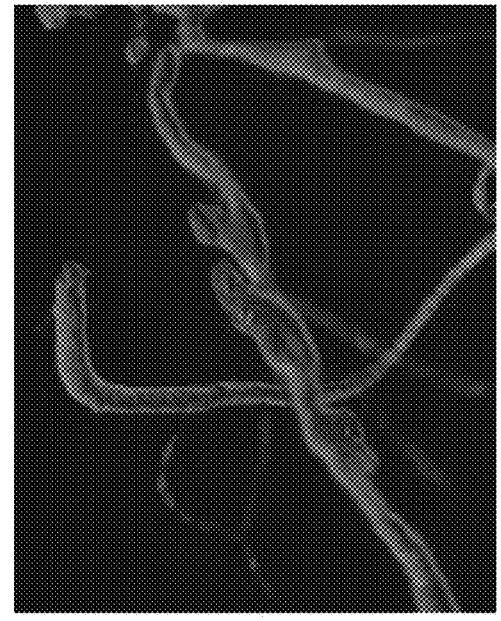
FIG. 27B illustrates separate anatomical features overlaid on the original medical image.
Figure 27C:
FIG. 27C illustrates the separate anatomical features with the background removed.

For example, at step 2502, the classified patient specific anatomical features generated using the segmentation algorithm described above are delineated into binary labels, e.g., bone/not bone, vessel/not vessel, organ/not organ, etc. At step 2504, the binary labels are separated into separate anatomical features, e.g., myocardium of heart, aorta, coronary arteries, etc. At step 2506, the separate anatomical features are mapped to the original medical images, such that only the original grey scale values or Hounsfield units for the separate anatomical features are shown in the medical images, as shown in 2606 and 2608 of FIG. 26 and FIG. 27B, and the background may be removed from the medical images as shown in 2610 and 2612 of FIG. 26 and FIG. 27C, leaving visible only the separate anatomical features depicted in the original grey scale values or Hounsfield units.

At step 2508, a 3D surface mesh model of the separate anatomical features may be generated. The 3D surface mesh model may define a surface of the separate anatomical features, as shown in 2614 of FIG. 26. Additionally or alternatively, the specific colors of transparency values may be mapped to labeled 3D surface mesh model to generate a volumetric render, as shown in 2616 of FIG. 26 and FIG. 27D. For example, a color map of the pixel intensities may be mapped directly to the 3D voxel intensities within only the segmentation to allow for specific volumetric visualization of the isolated anatomical feature. The voxels may be given a specific color automatically depending on the intensities of the original image, which may be indicative of normal blood flow or lack thereof. The ability to color specific regions of interest such as a clot, break, or anatomy, allows for greater insight into a specific pathology of a region.

Figure 27D:
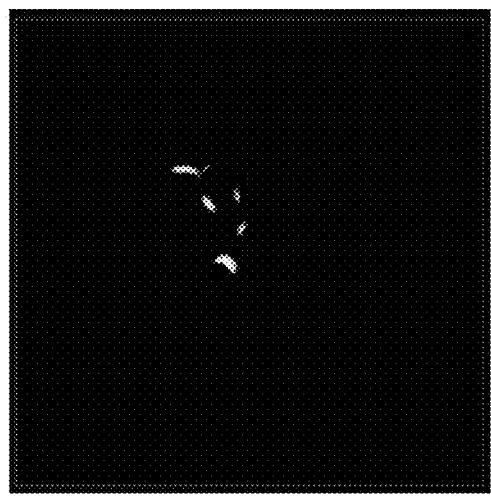
FIG. 27D illustrates a 3D volumetric rendering of the separate anatomical features.
Figure 28A:
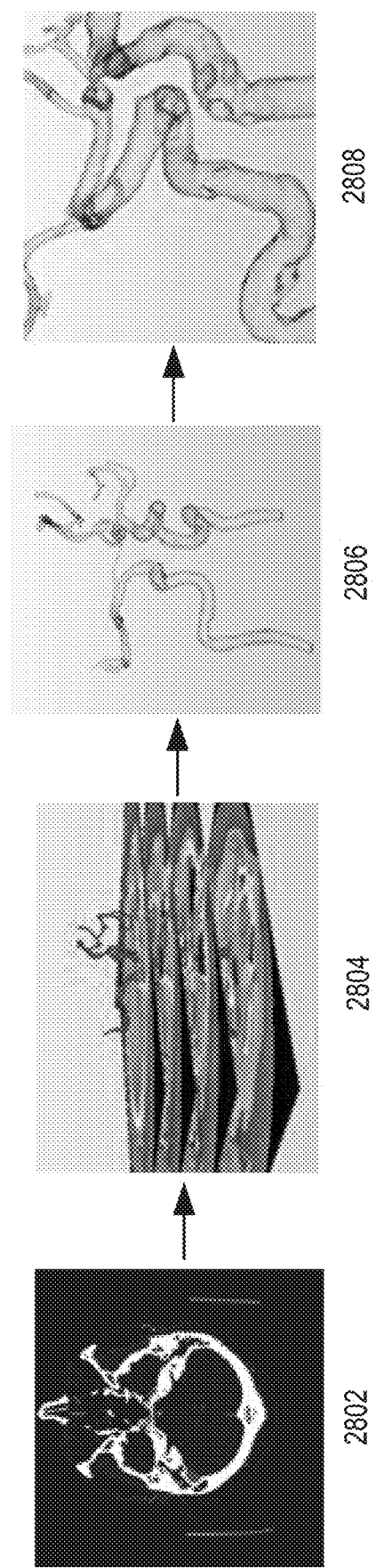
FIGS. 28A and 28B illustrate exemplary method steps for measuring an occlusion of a patient specific anatomical feature in accordance with some embodiments.
Figure 28B:
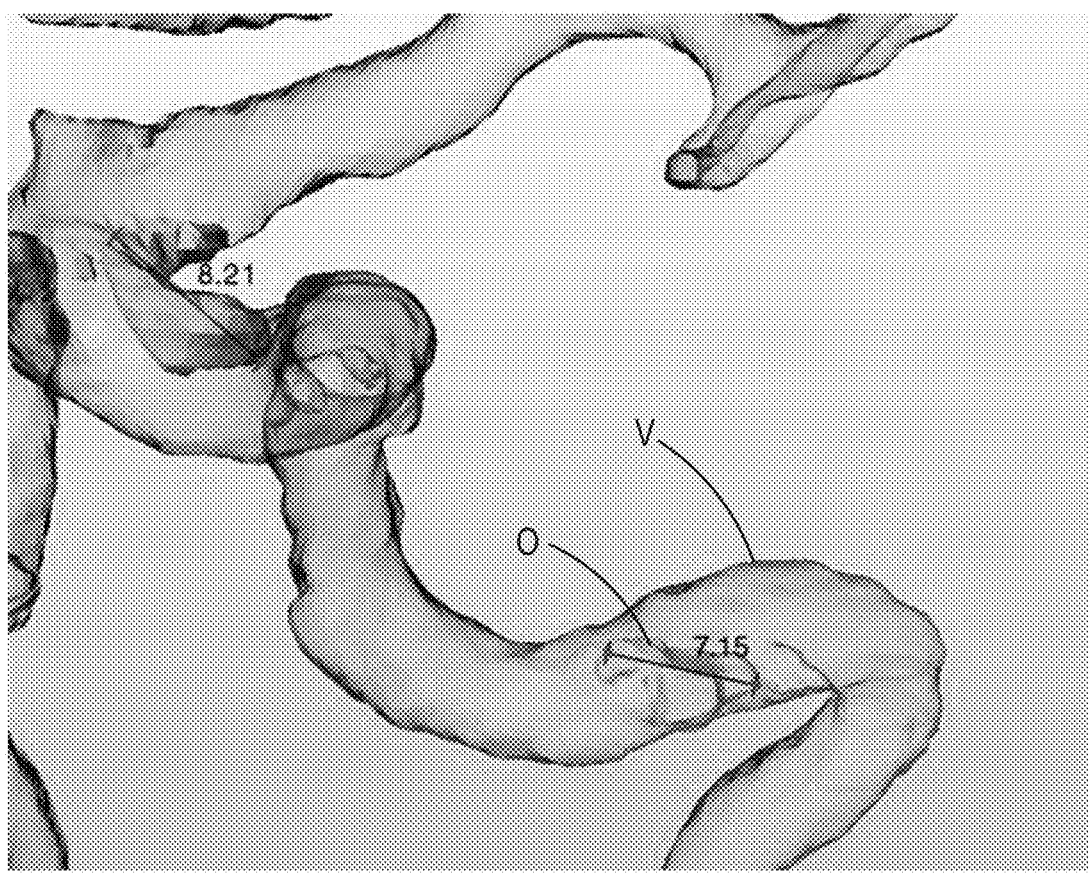

As shown in FIG. 27D, the 3D volumetric render may indicate the presence of a clot/occlusion. This data may then be rendered on an end-user application such that the 3D volumetric render may be rotated or otherwise manipulated and viewed. This data also may be used to indicate to the user if calcification is present from, e.g., a grouping of high intensity pixels, and further may provide a calcification "score" by indicating the percent of the clot or occlusion that is representative of the calcified structure. For example, predictions of the occlusions/calcifications may be made and applied as a mask on the original medical image, such that the background portions of the medical image may be removed, as shown in 2802 of FIG. 28A. Accordingly, a 3D surface mesh model may be generated that takes into account the pixel intensity of the various materials, as shown in 2804, 2806, and 2808 of FIG. 28A. As shown in FIG. 28B, the size of occlusion O depicted in vessel V of the 3D volumetric render may be measured, e.g., for assisting in the diagnosis and treatment for stroke patients.

The 3D volumetric render may be set by the user or automatically derived to visualize specific features by referencing the anatomical features depicted in the volumetric render, such as clots within vascular structures, coronary arteries, neuro vessels, thereby indicating a potential stroke. Accordingly, the medical images may be automatically segmented and reconstructed, e.g., by utilizing CTA's/XA/NM vessel imaging for the patient, to create a 3D representation of both a vessel and associated occlusions using machine learning from a semantically labeled 3D anatomical knowledge dataset that may be easily viewed on a mobile device or similar platform.

Once the 3D surface mesh model is generated from the automated segmentation, it will be possible to generate a number of measurements about the anatomy or pathology in the medical scan. Moreover, the scaling information along with reference points permits placement of the patient specific anatomical features within a physical scene. At the most simple level, physical measurements may be generated of the mesh, or any sub-mesh, or otherwise delineated region in the physical scene, which may include: length, breadth, height, angles, curvature, tortuosity of a mesh, etc. Given a filled structure, measurements may also be made of the volume, surface area, and diameter.

Derived properties of the materials to be segmented may also be measured. At a basic level, these may include thickness of the material (blood vessel or bone), and a known derivation from the normal (patient or general), which may permit generation of predictions about, e.g., the likely pressure required to break the material, or simply supply a visualization of the thickness and stress lines. Visualization of any of the above mentioned measurements provides great value as any more information available to the surgeon would be helpful in the determination of the best course of action for treatment, and would provide the ability to give an accurate analysis of the diagnosis. This may be achieved through a simple overlay of the derived variable over the mesh or by providing the data for additional analysis of the input/desired attribute.

Aside from the determining the structure of a patient specific anatomical feature as described above, an extracted polygonal model may further provide a convenient basis for determining numerous useful measurements that would otherwise be difficult to ascertain from volumetric pixel data alone, e.g., bone and vessel dimensions, angle and tortuosity differentials and relative scales, density etc. Normally determining these measurements would require careful manual assessment of a mesh in order to identify areas of interest and meaningful reference points. However, the exploratory geometric algorithms described herein provides a reliable automated alternative. For example, the following pseudocode outlines how vessel length, diameter and curvature information may be automatically collected without human intervention:

```
getVesselInfo (mesh) {
    -get Bounding Box of input mesh
    -get minimum and maximum coordinates along each axis
    -any vertices existing at these extreme points can be presumed to form
part of the circular opening of a vessel
    -build circular/elliptical entry points by clustering previously identified
extreme vertices
    -get centre points of vessel openings
    -determine inward direction of vessels from volume
    -for each entry point centre
        -while ray cast hasn't collided with planes defined by vessel entry
points
            -create new measurement line
            -raycast at different equidistant angles
            -take longest distance
            -advance along distance line
            -centre in vessel diameter by calculating centre of smallest
diameter line
            -(save diameter value for determining thickness differential later)
            -add new location to measurement line
            -in the event of multiple peaks in the array of distances
                -foreach branch continue march
        -remove exit point from entrypoint list
    -return resulting directional paths
```

Figure 29:
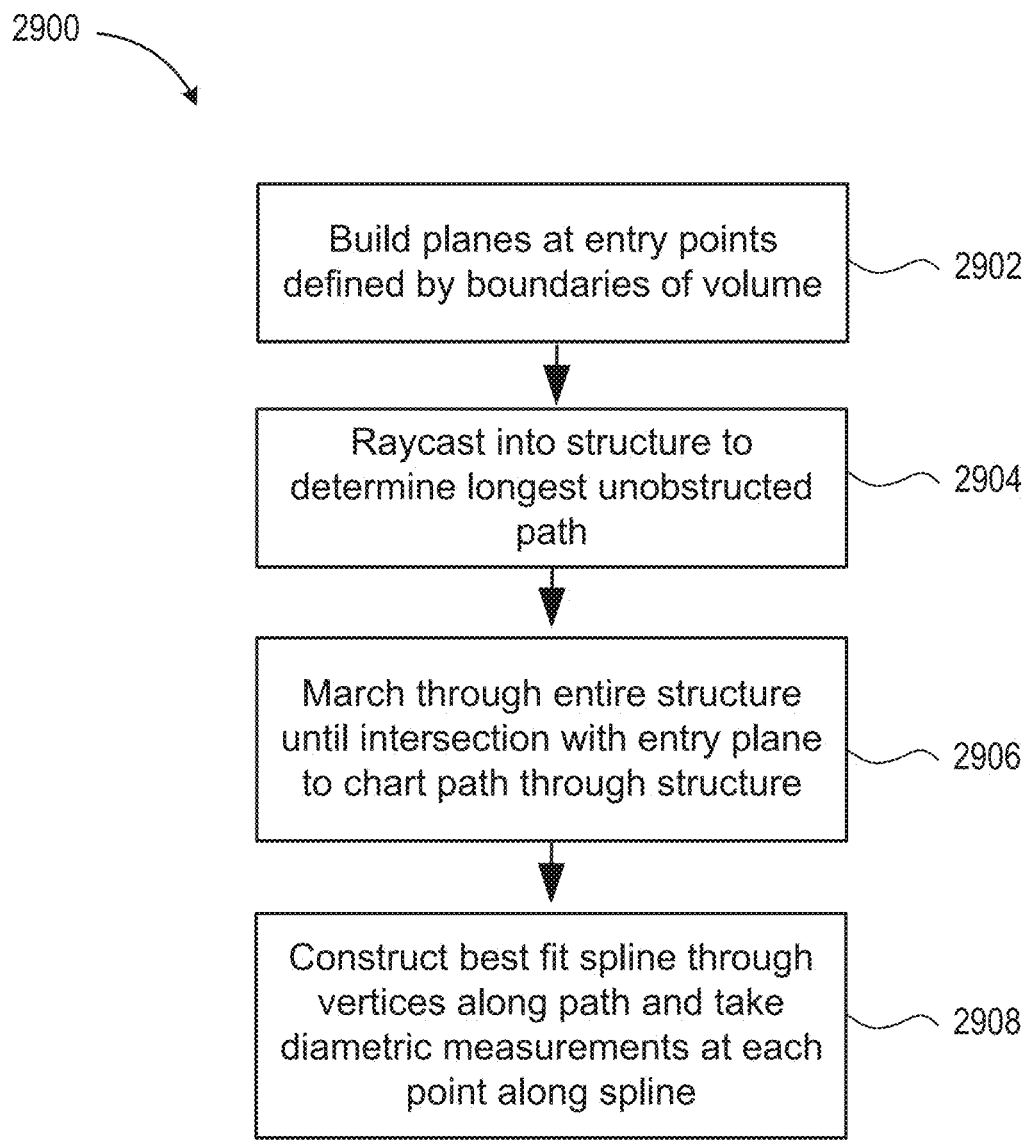
FIG. 29 is a flow chart illustrating exemplary method steps for analyzing physiological parameters of separate anatomical features in accordance with some embodiments.

Referring now to FIG. 29, exemplary method 2900 for analyzing physiological parameters of separate anatomical features is provided. Some of the steps of method 2900 may be further elaborated by referring to FIGS. 30A to 30E, which depict a 2D example of a cross-section of a vessel with branching paths. FIG. 30A illustrates branched vessel V. At step 2902, planes P1, P2, P3 may be built at the entry points of vessel V, defined by the boundaries of the volume of vessel V, as shown in FIG. 30B. At step 2904, center points C1, C2, C3 of entry planes P1, P2, P3, respectively, may be calculated, as shown in FIG. 30C. As shown in FIG. 30C, multiples ray may be raycast from center point C3 into the structure of vessel V to determine the longest unobstructed path within vessel V. Because of the branching paths of vessel V, there are two peak points PP1, PP2 depicted in FIG. 30C. This may be determined by assessing the number of inflection points in the graph of distance values. Having determined that there are numerous paths forward at this point in the algorithm, each branch may be assessed individually by branching off the control flow.

At step 2906, the entire structure of vessel V is marched through until the rays cast at each point along lines L1, L2 intersect with entry planes P2 and P3, respectively, as shown in FIG. 30D, resulting in a series of vertices charting each of the paths through vessel V. At step 2908, a best fit spline line may be constructed through the vertices along lines L1, L2, as shown in FIG. 30E, such that diametric measurements may be taken at each point along lines L1, L2 to thereby provide a complete representation of vessel V, of which slope/tortuosity, diameter, internal volume, etc. may be determined.

Moreover, working from the pseudocode described above, the presence of a pathology such as an aneurysm would result in the search point getting stuck in a loop. Whenever the points of the measurement line begin to repeatedly change direction. The algorithm may break out of the search loop and presume that an aneurysm has been entered. Accordingly, the physiological measurements of the aneurysm may be determined, e.g., by determining points around the entry to the aneurysm, building entry plane to the aneurysm, determining the center point of the entry plane, and raycasting into the aneurysm structure to determine the most distant point, and when the max distance has been determined, building a line between the entry plane and max distant point, and begin checking perpendicular distances by raycasting.

The results of the segmentation may be quantified by, e.g., measuring the density of a segmented area, identifying the proximity to other pieces of anatomy, and identifying and delineating boundaries, especially with regard to oncology. Once a region has been identified and delineated within the physical scene, statements about the region may be made in relation to other structures within the scene. For example, delineating tumor boundaries and understanding their distance from key structures in the anatomical neighborhood would be useful to oncologists. Moreover, the density of a given structure would provide clinically relevant information, e.g., in the case of oncology, it would provide insight into hypoxia within the tumor, and in the case of a blood clot, it would allow insight into how the clot could be treated.

The ability to measure the density and thickness of an anatomical region would allow the ability to provide guidance on, e.g., screw selection in trauma applications or catheter diameter in vascular applications. Moreover, the ability to measure the diameters along an anatomical feature would allow the diameter measurements to be cross-referenced with a medical device database to indicate to the surgeon the best sized device for that patient.

As described above, anatomical landmarks are meaningful points in a patient's anatomy that has significance to its form or function, such as orientation and insertion points for other anatomical features and/or medical devices, and may help surgeons reliably and readily identify specific portions of anatomy. Specifically, medical anatomical landmarking is the process of identifying and defining specific points on the human body that may serve as reference points for describing the location and orientation of other anatomical structures and/or for planning surgical procedures on the anatomical structure including, for example, medical device implantation. These landmarks are biologically meaningful and may be used to provide a spatial map of the body, facilitating accurate communication among healthcare professionals and researchers. Anatomical landmarks play a crucial role in various medical applications including, for example: medical imaging, where landmarks serve as reference points for image navigation and evidence for anomaly diagnosis in medical imaging modalities such as MRI, CT, and X-ray; surgery, where landmarks help surgeons locate specific areas of the body and guide their movements during surgical procedures; anatomy education, where landmarks provide a framework for teaching and learning human anatomy, enabling students to understand the relationships between different body parts; research, where landmarks are used as reference points for studying anatomical variations, developmental biology, and disease diagnosis; and medical devices, where landmarks serve as inputs to the design of patient specific devices generated by OEMs such a patient specific cutting guides or in situ device such as joint replacement hardware, as described in further detail below with regard to FIG. 32.

Anatomical landmark detection can be challenging due to, for example: variability in anatomy, as anatomical structures can vary between individuals, making it difficult to define consistent landmarks; noise and artefacts, as medical images may contain noise and artefacts that affect landmark detection; limited visibility, as some landmarks may not be visible in certain medical images; and manual annotation, as landmarks that are manually identified and annotated by experts can be very time consuming. As anatomical landmarking is a crucial aspect of medical imaging, surgery, anatomy education, and research, accurate detection and definition of landmarks are essential for ensuring precise communication and diagnosis among healthcare professionals. By understanding the importance and challenges of anatomical landmarking, the accuracy and efficiency of medical imaging and surgical procedures can be improved, as described herein.

Figure 31A:
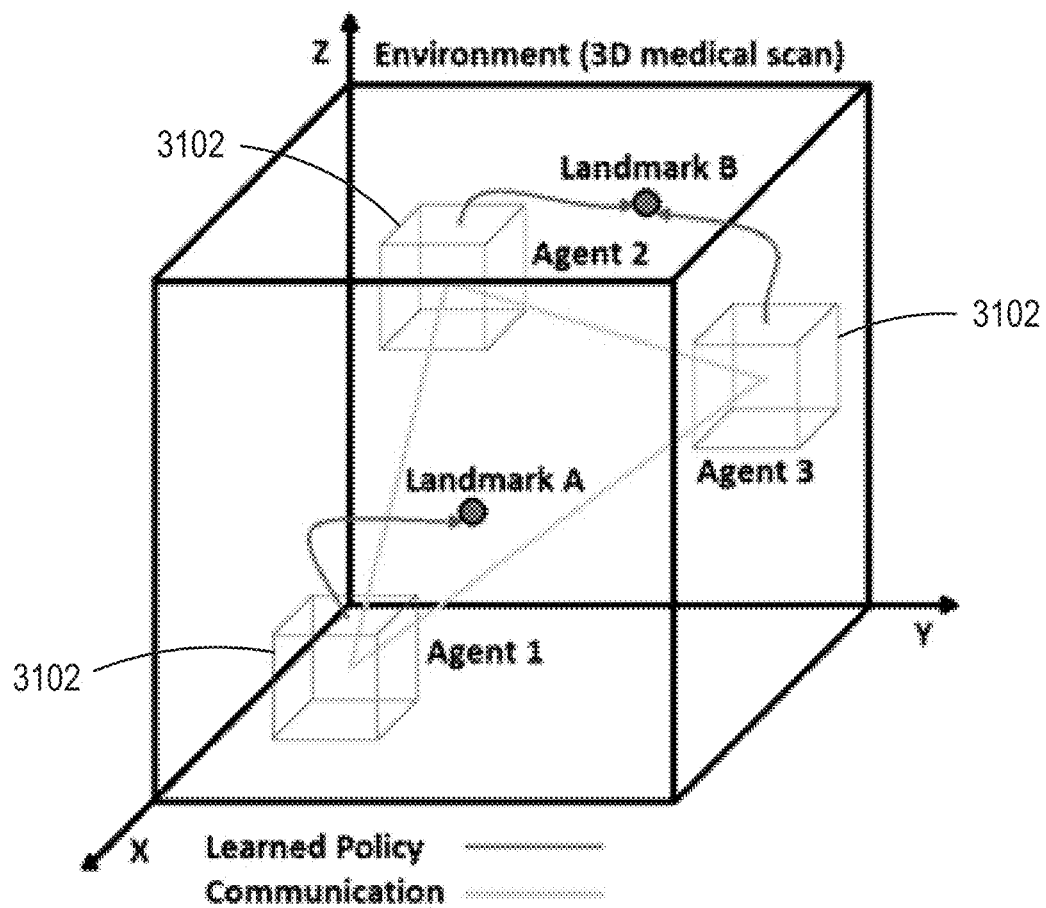
FIG. 31A illustrates a schematic visualization of automated anatomical landmark detection leveraging Deep Reinforcement Learning (DRL) techniques in accordance with some embodiments.

Referring now to FIGS. 31A to 31E, automated anatomical landmark detection leveraging Deep Reinforcement Learning (DRL) techniques is provided. Automated anatomical landmarking is defined herein as a communicative Deep Quality Network (DQN) based task, where Reinforcement Learning (RL) agents are trained by the DQN model, e.g., during a training phase, to search for anatomical landmarks in 3D medical scans. For example, the DQN model is an RL algorithm which combines a Q-learning algorithm, e.g., a model-free reinforcement learning technique that allows an RL agent to learn the optimal action to take in a given state by maximizing the expected future reward, and a Deep Neural Network. FIG. 31A illustrates a schematic visualization of multiple RL agents, e.g., Agent 1, Agent 2, and Agent 3, navigating in and interacting with a 3D environment, such as a CT scan volume. During the training phase, the objective of each RL agent is to navigate towards a target landmark, e.g., Landmark A and Landmark B, within a single medical scan, starting from a random initial position that is strategically placed within a certain predetermined distance from the target landmark. This setup simplifies the task to a manageable scope, allowing a focused evaluation of the RL agents' learning capabilities.

At each step of navigation, each RL agent takes an action that would move it towards a target anatomical landmark, e.g., Landmark A for Agent 1, and Landmark B for Agents 2 and 3. During the training phase, the DQN formulates a learned policy based on the path taken by a given RL agent, e.g., as a series of sequential actions, between the initial starting point of the RL agent and the respective target landmark, and the observational input, e.g., observation input 3102, of the RL agent at each step, depicted as a localized cube surrounding the RL agent in FIG. 31A. For example, at each step, observational input 3102 of the RL agent (e.g., the RL agent's field of vision) defines the possible actions available to the RL agent, e.g., the six different directions of movement (e.g., up, down, left, right, backward and forward), each direction pointing towards a different path the RL agent can take. In formulating the learned policy, the DON model allocates a weight to each possible action of each observational input 3102 based on the probability that the action, if taken, will move the RL agent closer to the target landmark, in view of the environment. Thus, the learned policy is an application of the weights of each action taken by the RL agent from the initial starting position to the target landmark, learned during the training phase.

Accordingly, during the inference phase, the RL agent employs the learned policy formulated by the DQN, which processes the RL agent's current observational input and determines the optimal action for the RL agent to take to move towards the target landmark, e.g., based on the weights of each possible action learned during the training phase. Thus, during the inference phase, the DQN's role is to assess the current observational input of the RL agent and select the action that it predicts will most effectively guide the RL agent closer to the target landmark. This process encapsulates the RL agent's decision-making strategy, honed through repeated training episodes to refine its ability to accurately identify and move towards the desired anatomical point in the 3D medical image.

The various stages and processes involved in training the DQN may include, for example, episodic learning in a 3D environment, balance of exploration and exploitation, action and feedback loop, use of replay memory, separate target and policy networks, model training and periodic updating, and performance evaluation and adaptation, which are described in further detail below. For example, for episodic learning in a 3D environment, the RL agent is trained in a series of episodes within a 3D medical imaging environment, each episode involving multiple steps, with the RL agent interacting with and learning from the environment in a structured, spatial context. Regarding balance of exploration and exploitation, throughout its training, the RL agent employs a strategy that balances exploration, e.g., trying new actions to discover effective strategies, which is crucial for learning about unknown aspects of the environment, and exploitation, e.g., using the knowledge already gained to make the best decisions based on current understanding. This balance is key in ensuring that the RL agent learns optimally, avoiding the pitfalls of sticking only to known strategies or constantly seeking new ones without leveraging learned knowledge.

Regarding the action and feedback loop, in each step during training, the RL agent takes an action and receives feedback from the environment, which may include details about the environment's current state, how effective the action was (e.g., measured as a distance to a target landmark in the context of 3D imaging), and a reward signal. Accordingly, the agent may adjust its decision-making process based on the feedback received during the training phase. Regarding use of replay memory, the RL agent's experiences (e.g., states, actions, rewards, and subsequent states) are stored in a replay memory, which is a critical component of the learning process.

Specifically, the replay memory allows the RL agent to learn from a diverse set of past experiences and avoid short-term, over-fitting biases. For example, the state of an environment, e.g., a 3D scan of the knee, may include specific brightness patterns, such that when the RL agent encounters a similar environment having similar a brightness pattern, as recognized from the RL agent's learned knowledge, the learned policy employed by the RL agent will cause the RL agent to take the appropriate action to move toward and locate the target landmark based on learned knowledge of the typical spatial location of the target landmark relative to the recognized brightness pattern.

Moreover, regarding separate target and policy networks, the RL agent may utilize two neural networks, a policy network and a target network. The policy network, e.g., the learned policy, is directly involved in making decisions and/or selecting actions based on the current environmental state and observational input, as described above. The target network is used to provide a stable target for the updates of the policy network. For example, the target network may be updated with the weights of the policy network, e.g., the weight of each possible action allocated by the DQN, every N episodes. The separation of the target and policy networks stabilizes the learning process, as it prevents the moving target problem often encountered in deep reinforcement learning.

Regarding model training and periodic updating, the RL agent's learning model, represented by the policy network, is trained and periodically updated based on learned experiences drawn from the RL agent's replay memory. Training the policy network improves the RL agent's ability to take actions to accurately locate the target landmark, measured by how well the RL agent's decisions align with optimal outcomes. The separate target network may be updated less frequently to provide consistent learning targets. Regarding performance evaluation and adaptation, after each episode, the RL agent's performance may be evaluated using various metrics, such as the distance to the target landmark at the start and end of the episode, which helps in understanding the RL agent's learning progress. Over time, the RL agent's decision-making strategy evolves from being exploration-dominant to being more exploitation-focused as it learns more about the environment.

Figure 31B:
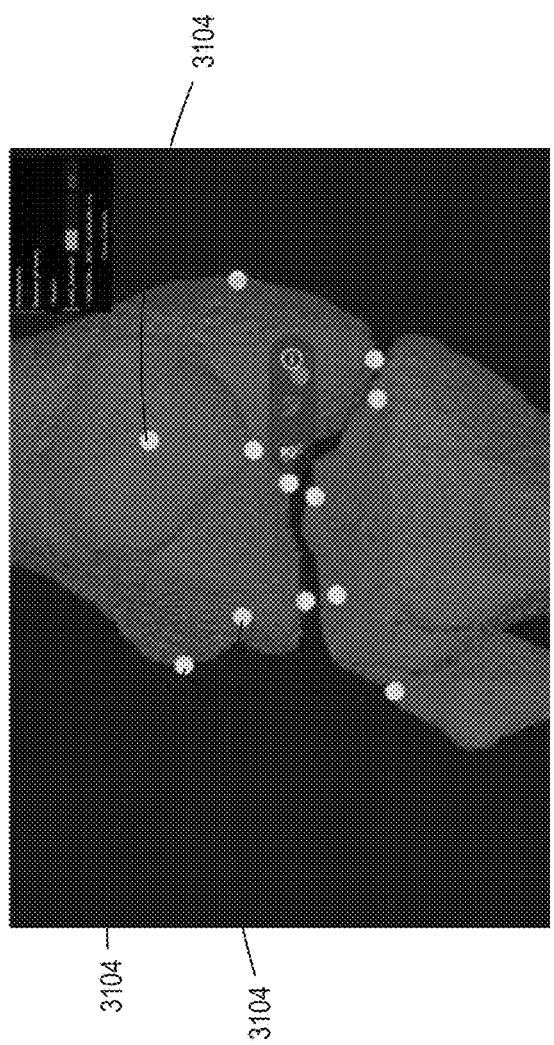
FIGS. 31B and 31C illustrate anatomical landmarks identified on a patient specific anatomical feature based on automated anatomical landmark detection.

The training processes described above showcase the dynamics of reinforcement learning, where an RL agent iteratively improves its decision-making in a complex environment. Moreover, the use of dual networks and a replay memory, combined with the strategic balance of exploration and exploitation, enables the RL agent to learn efficiently and adaptively in the task of automated anatomical landmarking within 3D medical images. Accordingly, as shown in FIG. 31B, during the inference phase, the automated anatomical landmark detection algorithm may be executed to automatically locate one or more anatomical landmarks (collectively referred to as landmark 3104) associated with the patient specific anatomical feature in the 3D medical images. For example, with knowledge of one or more anatomical features, e.g., the femur and the tibia, in the 3D medical images, a volume, e.g., a cube, may be cropped at a predetermined location on the patient specific anatomical feature, e.g., around a center point between the femur and the tibia in the 3D medical images, and the RL agent may be placed at random within the cube as the initial starting point for locating the target landmarks. As described above, multiple RL agents may be deployed, each within their respective cropped volume, and the RL agents may communicate with each other during each step of the inference phase. The location of the femur and the tibia may be identified within the 3D medical images via semantic segmentation, as described above.

Figure 31C:
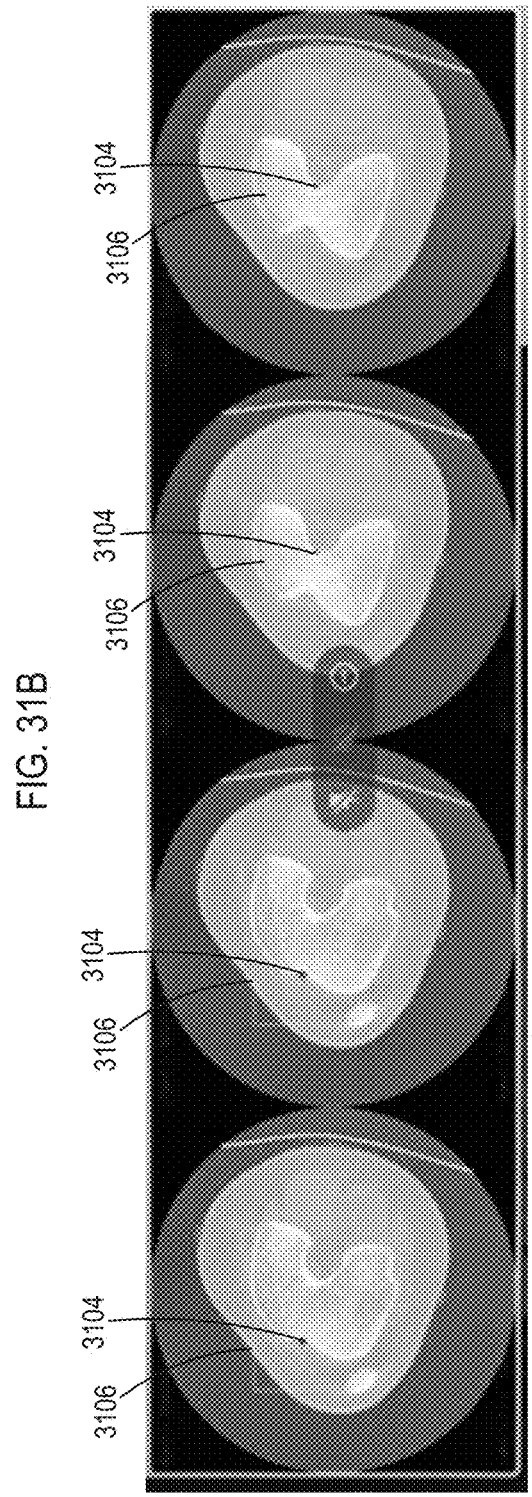

Automated anatomical landmark detection as described herein provides anatomical reference points that may be useful in various downstream applications. For example, as shown in FIG. 31C, upon identification of anatomical landmarks 3104, bounding box 3106 may be generated around the identified landmarks 3104, to identify a region of interest within the 3D medical images, e.g., within a DICOM volume. For example, bounding box 3106 may be determined based on logic associated with landmark 3104, e.g., a predetermined distance posterior and lateral from landmark 3104 would provide an upper limit to bounding box 3106 that contains the anatomical region of interest, and a predetermined distance anterior and lateral from landmark 3104 would provide a lower limit to bounding box 3106 that contains the anatomical region of interest.

Additionally, the identified region of interest may be used as a means to increase machine learning confidence and performance, e.g., speed and accuracy of the machine learning algorithms. For example, automated pathology based segmentation as described herein, e.g., based on metadata extracted from the 3D medical images, may be executed with a unique label schema for the identified region of interest, e.g., a label schema that contains specific anatomy or materials relevant to the pathology. For example, a cardiac label schema with calcification as a specific material may be relevant to coronary heart disease evaluation. Accordingly, the identified region of interest may be extracted for generating ground truth data, e.g., for training purposes. In addition, the identified landmarks may be used as a plugin for a Picture Archiving Communication System (PACS), e.g., a hospital repository that images are held in, to enable rapid navigation to the region of interest in the PACS workstation, e.g., for radiologist review. Moreover, automated anatomical landmark detection may be used to ensure the 3D medical images contain the required anatomy. For example, as each anatomical feature may have known anatomical landmarks associated therewith, by confirming that the associated landmarks are present in the 3D medical image, it may be determined with confidence that the required anatomical feature is present in the 3D medical image.

In addition, automated anatomical landmark detection may be used to ensure the 3D medical images are oriented correctly for display in end-user devices and/or model orientation. For example, the known spatial relation, e.g., orientation, between two or more landmarks associated with an anatomical feature may inform the appropriate orientation of the 3D medical image. Accordingly, the 3D medical images may be automatically reoriented in a predetermined orientation, e.g., upright, or alternatively, a user may manually reorient the 3D medical images based on observation of the identified anatomical landmarks. Moreover, automated anatomical landmark detection may be used to enhance the development of Statistical Shape Models (SSM), which describe the mean anatomical shapes and parameterize main modes of variation from the mean anatomical shape for a given population, which may be utilized in generating 3D patient specific anatomical models from 2D medical images, e.g., 3D reconstruction from 3D biplanar image data. For example, automated anatomical landmark detection may enhance the performance of SSM by providing anatomically derived parameters for the development of the SSM, specifically in the training data. Examples of anatomically derived parameters may include distance between landmarks, angle between landmarks, circumference around one or more landmarks, etc.

Figure 31D:
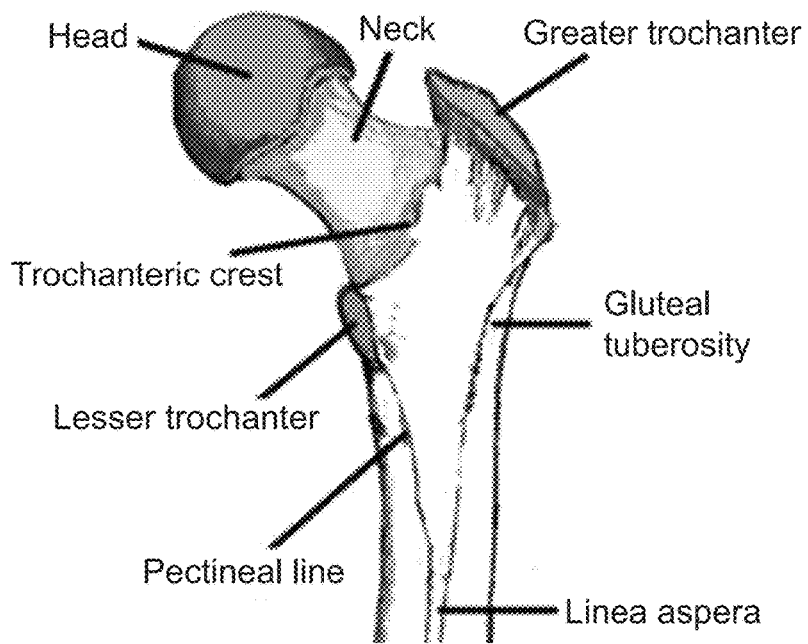
FIGS. 31D and 31E illustrate semantic labeling of various areas of a patient specific anatomical feature based on automated anatomical landmark detection.
Figure 31E:
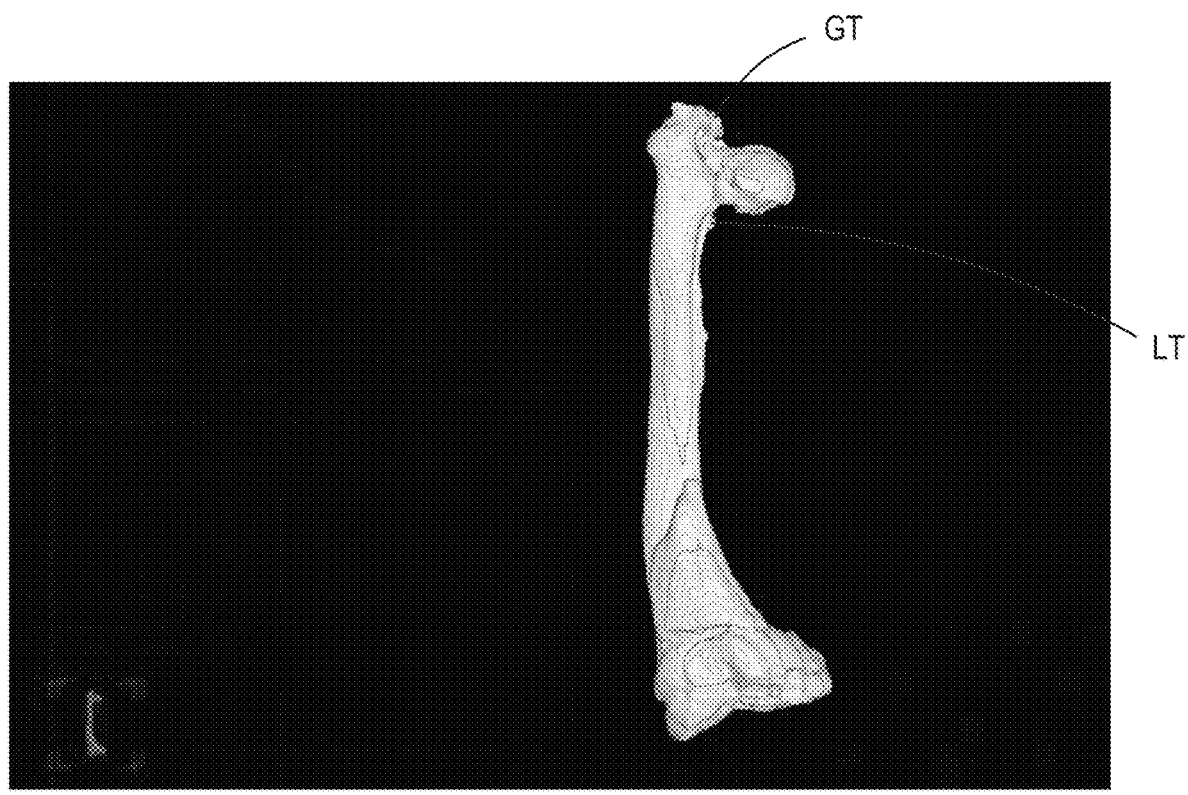

Moreover, the probabilistic shape of the SSM may be applied to increase confidence in semantic labeling, e.g., the labeling of subregions or areas of macro anatomy. For example, the confidence of semantic labeling of the greater trochanter and the lesser trochanter, as shown in FIG. 31D, may be increased if it is driven by the fact that relevant anatomical landmarks have been identified in those anatomical areas. Additionally, identifying one or more landmarks of a first anatomical feature, e.g., greater trochanter GT, may indicate that another associated anatomical feature, e.g., lesser trochanter LT, is also likely to be within the 3D medical image in the vicinity of greater trochanter GT, as shown in FIG. 31E. Identified landmarks may be embedded as metadata and labeled images in digital file formats.

Figure 32:
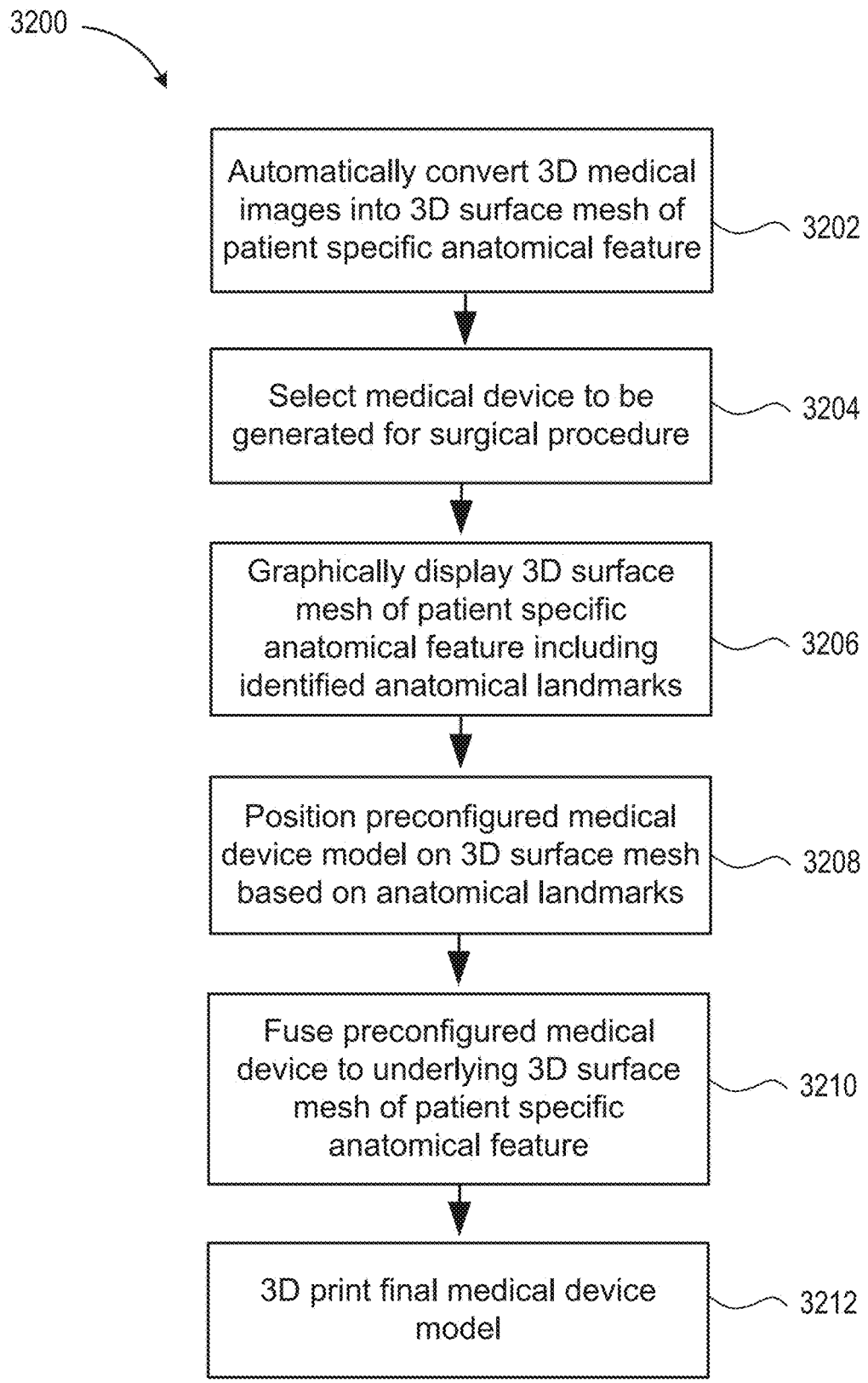
FIG. 32 is a flow chart illustrating exemplary method steps for automatically designing patient specific medical devices in accordance with some embodiments.

In addition, automated detection of anatomical landmarks in a DICOM volume and/or 3D surface mesh may facilitate surgical planning of patient specific procedures, e.g., surgical procedures where a medical device is being implanted or a surgical guide is being used such as, for example, total knee arthroplasty, Distal Femoral Osteotomy (DFO), High Tibial Osteotomy (HTO), shoulder arthroplasty, etc., without surgeon intervention or manual placement of landmarks, as described in further detail below with regard to FIG. 32. Moreover, automated anatomical landmark detection may be used in combination with Natural Language Processing (NLP) techniques to navigate 3D files/DICOMS to thereby facilitate Multi-Disciplinary Team (MDT) meetings.

Referring now to FIG. 32, exemplary method 3200 for automated design of patient specific medical devices is provided. Some of the steps of method 3200 may be further elaborated by referring to FIGS. 33A to 34B, which depict the design and generation of patient specific devices based on identified anatomical landmarks. As an illustrative example, FIGS. 33A to 33G depict generation of a cutting guide for a surgical bone cutting procedure, and FIGS. 34A and 34B depict generation of a pin guide for a surgical shoulder replacement procedure. Automated design for the additive manufacturing of patient specific devices begins with analysis of the patient's anatomy. At step 3202, the 3D medical images, e.g., 3D CT scans, including the patient specific anatomical feature of interest are automatically converted into a 3D surface mesh, e.g., using the automated segmentation algorithms described herein. Accordingly, the medical device may be built around the 3D surface mesh such that it is specific to the patient's anatomy. For example, as described above, the patient specific anatomical feature of interest may be isolated based on the pathology, such that only the patient specific anatomical feature associated with the pathology is depicted in the 3D surface mesh. The 3D surface mesh may be displayed via a graphical user interface, e.g., user interface 108, to the user.

At step 3204, the user may select the desired medical device, e.g., from a drop-down menu of a library of medical devices, e.g., a medical device database or surgical implement database, to be generated for the surgical procedure to be performed. For example, the library of medical devices may include drill guides (long, short, thickness, etc.), saw slots (long, short, thickness, etc.), bone touch points/grips (smooth, rough, spiky, etc.), etc., which may be selected based on the surgical procedure to be performed, e.g., placement of bone fragments, tools and implants, cuts, hole placements, screw placements, bone realignment, or other bone manipulations. In some embodiments, step 3204 may occur prior to step 3202, such that the 3D surface mesh is generated for a patient specific anatomical feature of interest based on the selected medical device.

Figure 33A:
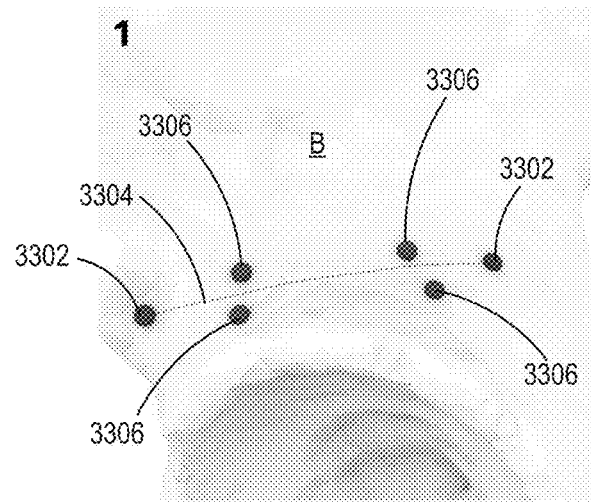
FIGS. 33A to 33G illustrate generation of a cutting guide for a surgical bone cutting procedure in accordance with some embodiments.
Figure 34B:
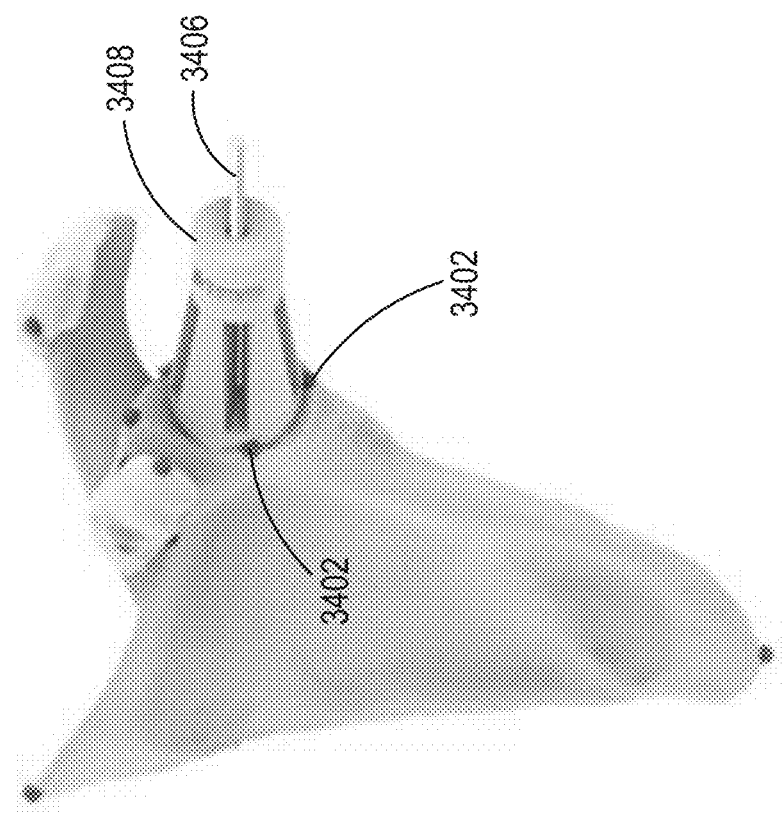
FIGS. 34A and 34B depict generation of a pin guide for a surgical shoulder replacement procedure in accordance with some embodiments.
Figure 34A:
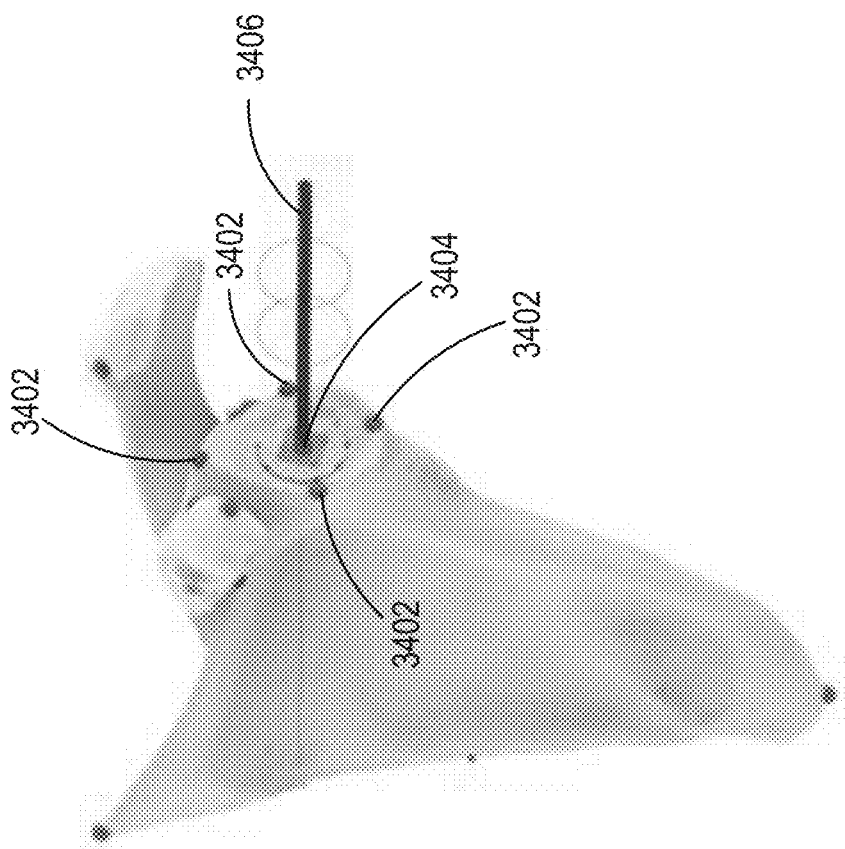

At step 3206, one or more anatomical landmarks associated with the patient specific anatomical feature may be identified and graphically displayed on the 3D surface mesh of the patient specific anatomical feature, e.g., bone B, as shown in FIG. 33A. For example, the landmarks may be identified based on the pathology, and accordingly, the medical device to be implanted and/or used, as selected by the user. As described above, the anatomical landmarks may be automatically identified by executing automated anatomical landmark detection algorithms leveraging DRL techniques to search for anatomical landmarks in 3D medical scans, and/or anatomical feature datasets including knowledge of anatomical landmarks, e.g., existing semantically labeled anatomical feature datasets. Additionally, or alternatively, the user may manually locate anatomical landmarks directly on the 3D surface mesh, e.g., via user interface 108. Moreover, the user may manually adjust the position of the landmarks on the 3D surface mesh. When generating a surgical cutting guide, as shown in FIG. 33A, landmarks 3302 define the cut for a surgical cutting procedure, e.g., cutting line 3304, on bone B, and landmarks 3306 define the location for the positioning of cutting guide screws on bone B. By relying on anatomical landmarks, the medical device components/subcomponents may be moved into position and oriented relative to the patient specific anatomical feature in a reproducible manner.

Figure 33B:
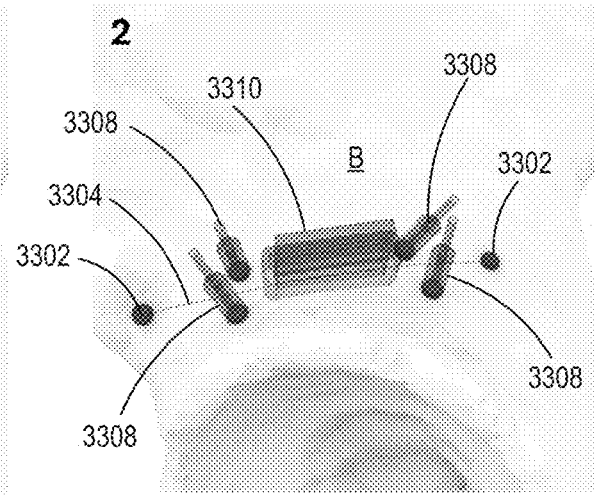
Figure 33C:
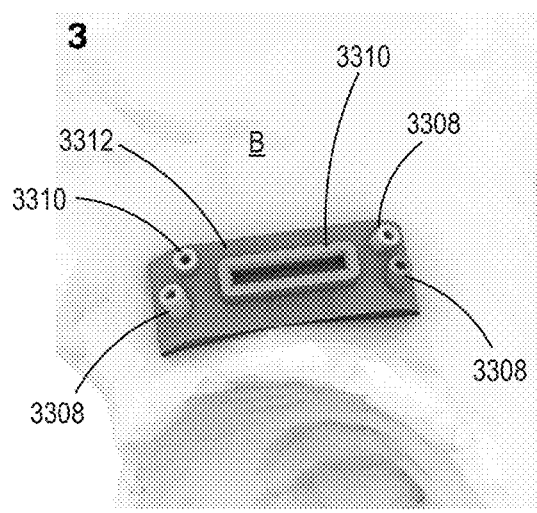

At step 3208, the user may manually move a graphical representation of the selected preconfigured medical device, e.g., a 3D surface mesh model of the selected medical device, in 3D space until it fits the landmarks on the 3D surface mesh, e.g., landmarks 3302 and 3306, which allows users to build the medical device around anatomy of any size and shape. Based on an analysis of the anatomy, e.g., the surface contour of the patient specific anatomic feature, bone screws 3308 may be automatically placed/oriented such that they extend perpendicular to the surface of bone B at the respective landmarks 3306, as shown in FIG. 33B. Similarly, cutting slot 3310 of the cutting guide may be automatically placed/oriented such that it extends perpendicular to the surface of bone B along cutting line 3304. FIG. 33C illustrates the preconfigured subcomponents of the cutting guide, e.g., bone screws 3308, cutting slot 3310, and cutting guide plate 3312, in the final position selected by the user on bone B, which may be colorized to easily distinguish the subcomponents. At step 3208, the medical device is not yet fused.

Figure 33D:
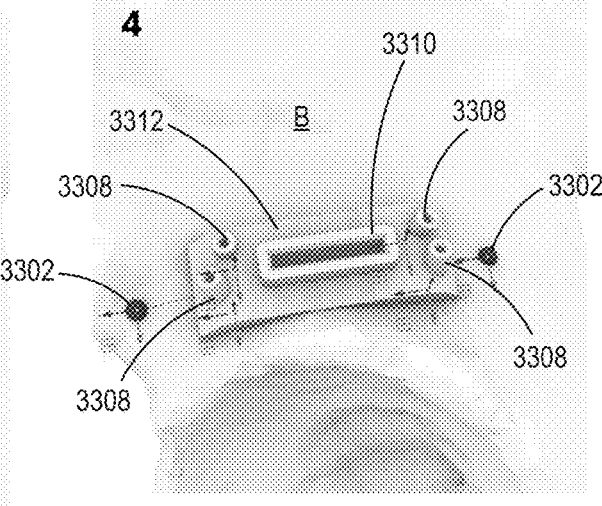
Figure 33E:
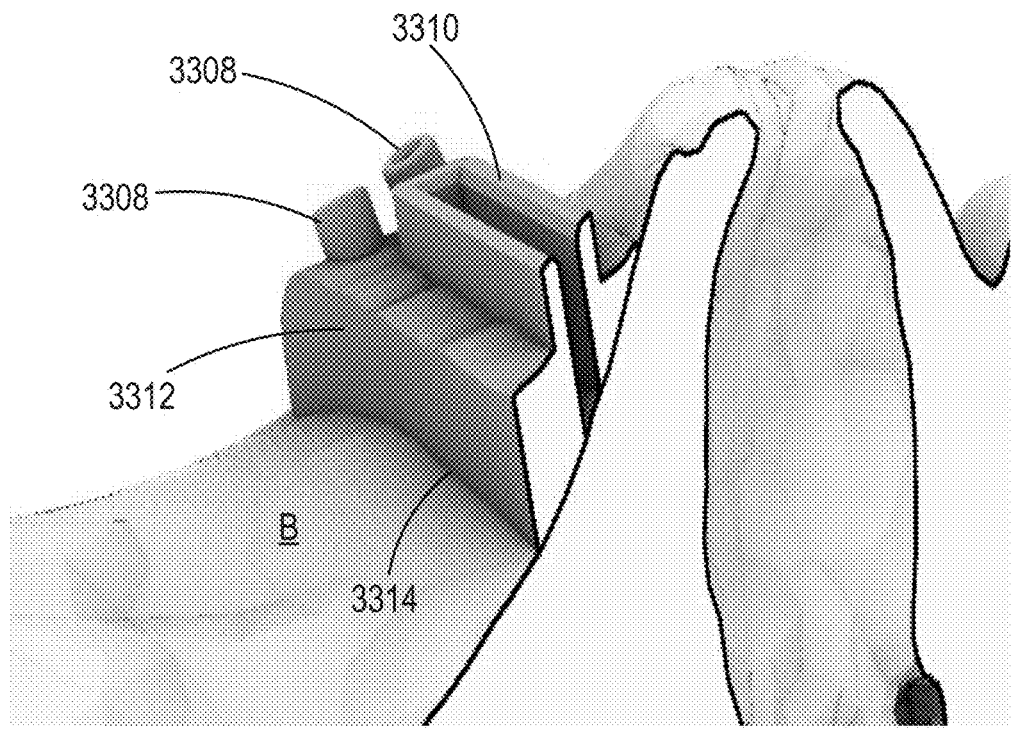
Figure 33F:
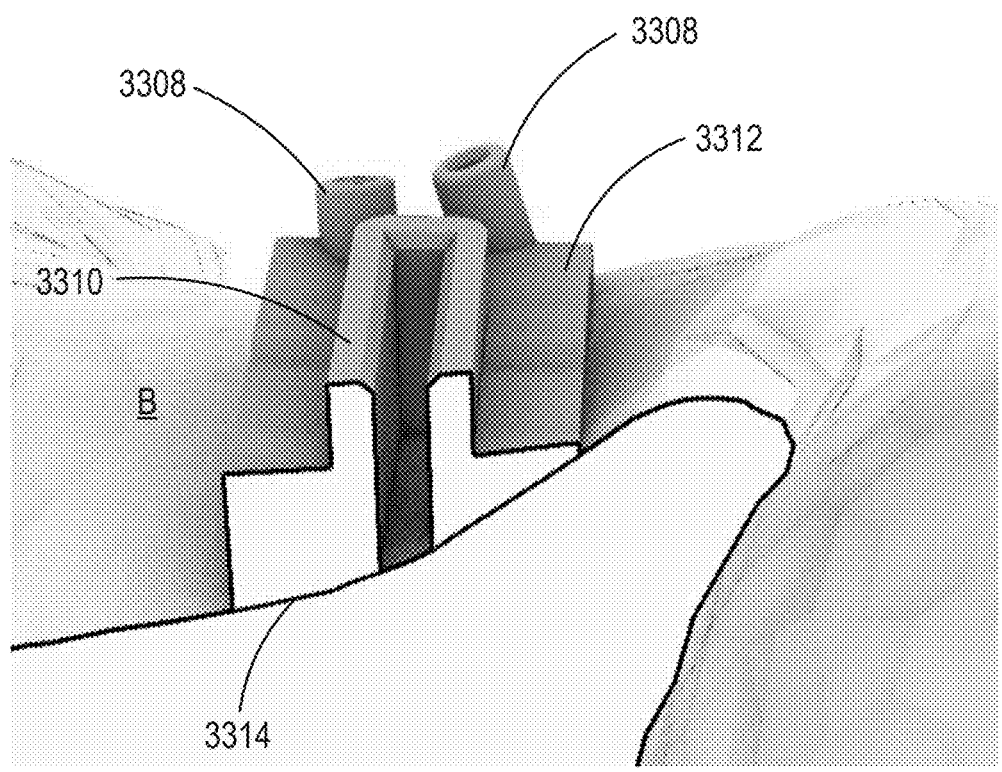
Figure 33G:
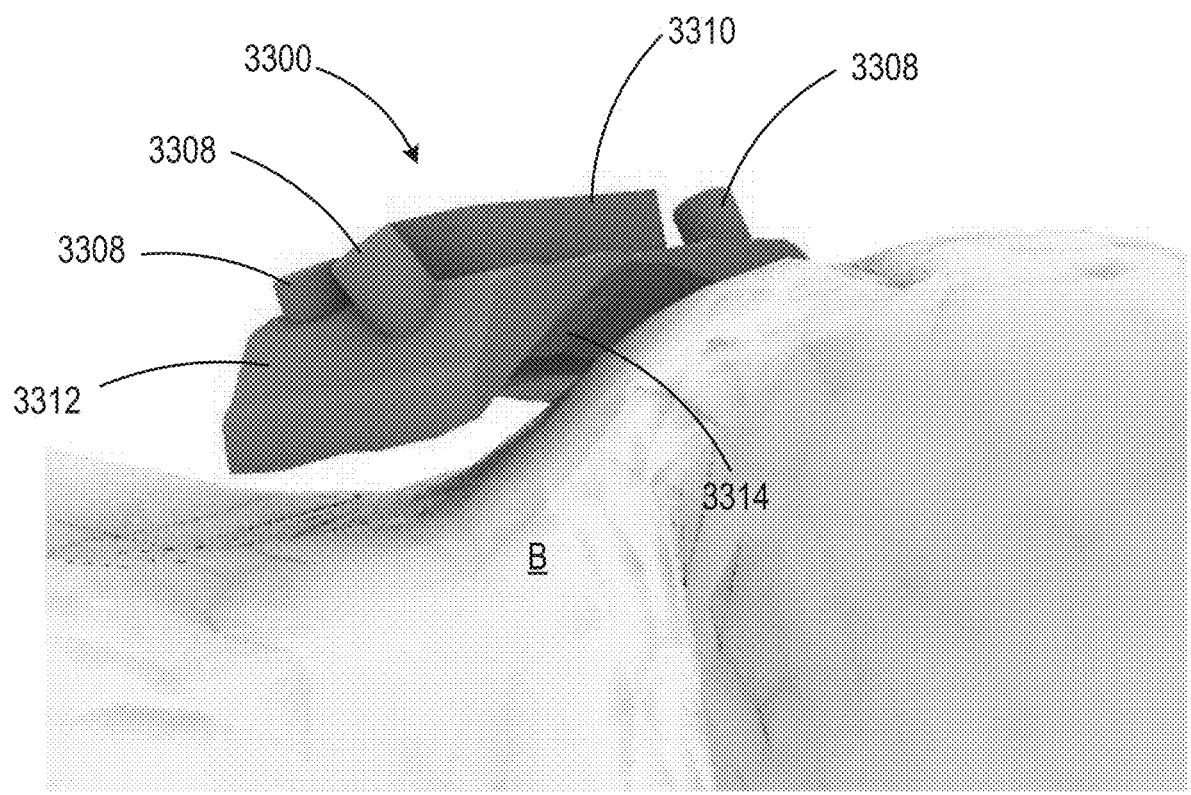

Accordingly, at step 3210, when the medical device is in the desired location, e.g., relative to bone B, based on the anatomical landmarks, as shown in FIG. 33D, the medical device may be fused to the underlying 3D surface mesh of the patient specific anatomical feature, such that the contour of the surface of the medical device in contact with the patient specific anatomical feature (e.g., fitting surface 3314 of the medical device) matches the surface contour of the underlying 3D surface mesh of the patient specific anatomical feature, as shown in FIGS. 33E and 33F. For example, a Boolean difference may be completed on fitting surface 3314 of the medical device to remove a corresponding volume thereof, such that the final surface contour of fitting surface 3314 matches the surface contour of the underlying patient specific anatomical feature. At step 3412, the final medical device model, e.g., a 3D digital model 3300 generated based on the fused medical device, as shown in FIG. 33G, may then be exported, and 3D printed for use in the surgical procedure. While every patient's specific anatomy may differ, method 3200 provides a standard recipe that may be applied consistently for each patient, e.g., in almost exactly the same way each time.

FIGS. 34A and 34B illustrates the design generation of a pin guide for a surgical shoulder replacement procedure using method 3200, described above. As shown in FIG. 34A, anatomical landmarks 3402 and 3404 may be identified and graphically displayed on a 3D surface mesh of a shoulder bone to guide placement of a pin guide used for a shoulder replacement procedure. The user may then manually move a graphical representation of preconfigured pin guide 3408, e.g., a 3D surface mesh model of the pin guide, in 3D space until it fits the landmarks on the 3D surface mesh, e.g., landmarks 3402 and 3404, as shown in FIG. 34B. As described above, pin 3406 of pin guide 3408 may be automatically placed/oriented such that it extends perpendicular to the surface of the bone at the respective landmark 3404, as shown in FIG. 34A. When pin guide 3408 is in the final desired position relative to the 3D surface mesh of the shoulder bone, the fitting surface of pin guide 3408 may be fused to the surface contour of the underlying shoulder bone, such that the surface contour of the fitting surface of pin guide 3408 matches the surface contour of the underlying 3D surface mesh of the shoulder bone. A 3D model of pin guide 3408 may then be 3D printed based on the 3D surface mesh of pin guide 3408 for use in the surgical shoulder replacement procedure. As will be understood by a person having ordinary skill in the art, patient specific medical devices used for surgical procedures on anatomies other than bone may be generated using method 3200, based on the surgical procedure to be performed.

The machine learning based algorithms described herein may be trained and predicted on the axial axis, which is typically the axis that the medical scans are carried out in. A modification to the machine learning based algorithm may involve changing the prediction function, and another modification may involve changing the training and the prediction function. For example, a modification to the machine learning based algorithm may include making predictions in all three axis and then merging the results. This approach would work best where the voxels are isotropic, as in the case with the rimasys data. The merging of the predictions may follow a number of different strategies, for example, taking an average (mean) of the three results for a given pixel/voxel, or more complex solutions such as taking a weighted average of an axial slice plus the others. Alternatively, it would be possible to switch to a different primary axis, e.g., switching from an axial axis to a sagittal.

Training the algorithm on all three axes may take advantage of the additional information from the different axes. Thus, an axial inference model, a sagittal inference model, and a coronal model may be trained. As described above, the results of all three predictions may be combined with a simple merging strategy. However, preferably, either the output layer of the three models may be combined in a larger network or an ensemble model may be created that combines their results.

As described in U.S. Pat. No. 11,436,801, the algorithm may to work natively in 3D, which may be very expensive from a memory allocation point of view. One other approach to mitigate this restriction would be to consider a cube rather than a slice at a time. The advantage of this approach is that it may be possible to take into consideration the more pertinent and immediate context in the training, such that instead of considering a large thick slab, the algorithm is trained on small cubes of volume, which are slid over the entire volume.

The sandwich approach described in U.S. Pat. No. 11,436,801 may be extended to incorporate a larger number of slices, may also more explicitly incorporate the pixels from the surrounding slices in the model. For example, instead of using additional channels in the image, multiple channels, e.g., three channels, of most image formats may be leveraged to achieve this compression. By making the surrounding images into full images, the number of surrounding images in a scan may be generically increased. As the size of GPUs increase, the number of surrounding images in a scan may also be increased. Moreover, The algorithm may implement a version of D-Unet which takes into account the 3D contextual information (via 3D convolution kernels), and the amount of slices the model analyzes at a time may be increased to provide the algorithm much more spatial context. This architecture upgrade together with improvements to the loss functions and access to more data has resulted in increasingly better segmentation models.

Figure 35:
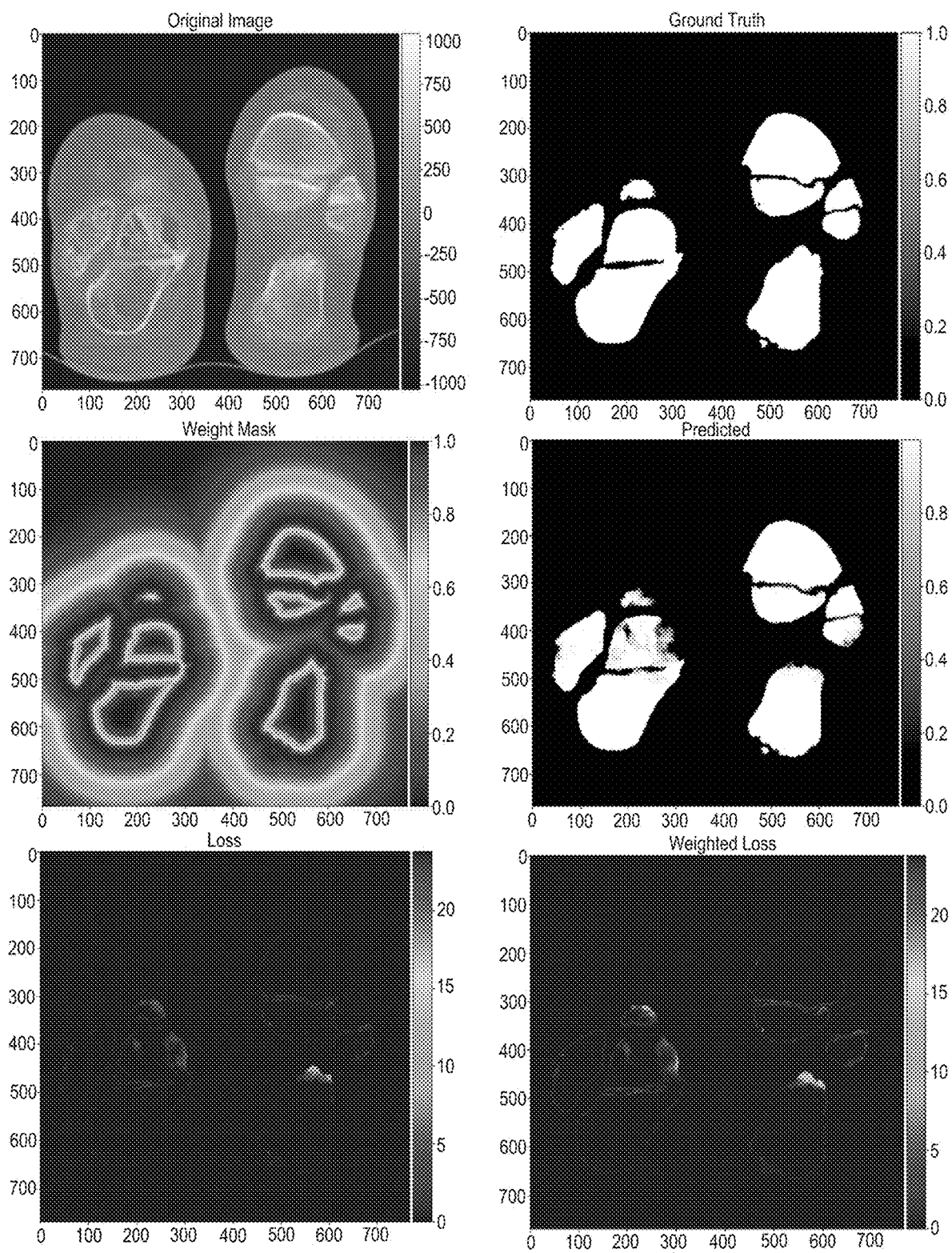
FIG. 35 illustrates weight masks generated with the Euclidean distance weight approach, as well as their effect on the loss function in accordance with some embodiments.

Moreover, the methods described herein further may utilize an Euclidean distance weight approach to influence the loss component in the machine learning model training process. This approach helps guide the learning process to focus on areas of greater importance. For example, in orthopedics segmentation, the most difficult errors to detect/find and fix are small connections between bones that are very close to each other; whereas, small holes on the inside of the bones are more simple to correct. FIG. 35 illustrates weight masks generated with the Euclidean distance weight approach, as well as their effect on the loss function, e.g., categorical cross entropy.

A multi-schema approach to ground truth dataset for training is provided. Specifically, there are many different segmentation labeling schemas that may be used to adapt the training labels depending on the goal of the model to be trained. For example, as it may be very difficult to define the inner materials of trauma bones, they are generally segmented as hollow, and thus the predictions from a trauma model trained on hollow bone labels are much easier to work with, as shown in Table 2 below.

TABLE 2

Bone Segmentation Labelling Schemas

| Original Labels | Meaning | Outer Bone | Hollow Bone | Solid Bone | Solid Bone Only |
|---|---|---|---|---|---|
| 0 | Background | 0 (background) | 0 (background) | 0 (background) | 0 (background) |
| 1 | External | 0 (background) | 0 (background) | 0 (background) | 0 (background) |
| 2 | Outer trabecular | 1 (bone) | 1 (bone) | 1 (bone) | 1 (bone) |
| 3 | Inner trabecular | 0 (background) | 0 (background) | 1 (bone) | 1 (bone) |
| 4 | Outer cortical | 1 (bone) | 1 (bone) | 1 (bone) | 1 (bone) |
| 5 | Inner cortical | 0 (background) | 1 (bone) | 1 (bone) | 1 (bone) |
| 6 | Outer marrow | 1 (bone) | 1 (bone) | 1 (bone) | 1 (bone) |
| 7 | Inner marrow | 0 (background) | 0 (background) | 1 (bone) | 1 (bone) |
| 8 | Artifact | 2 (artifact) | 2 (artifact) | 2 (artifact) | 0 (background) |
| 9 | Air | 0 (background) | 0 (background) | 0 (background) | 0 (background) |

Figure 36:
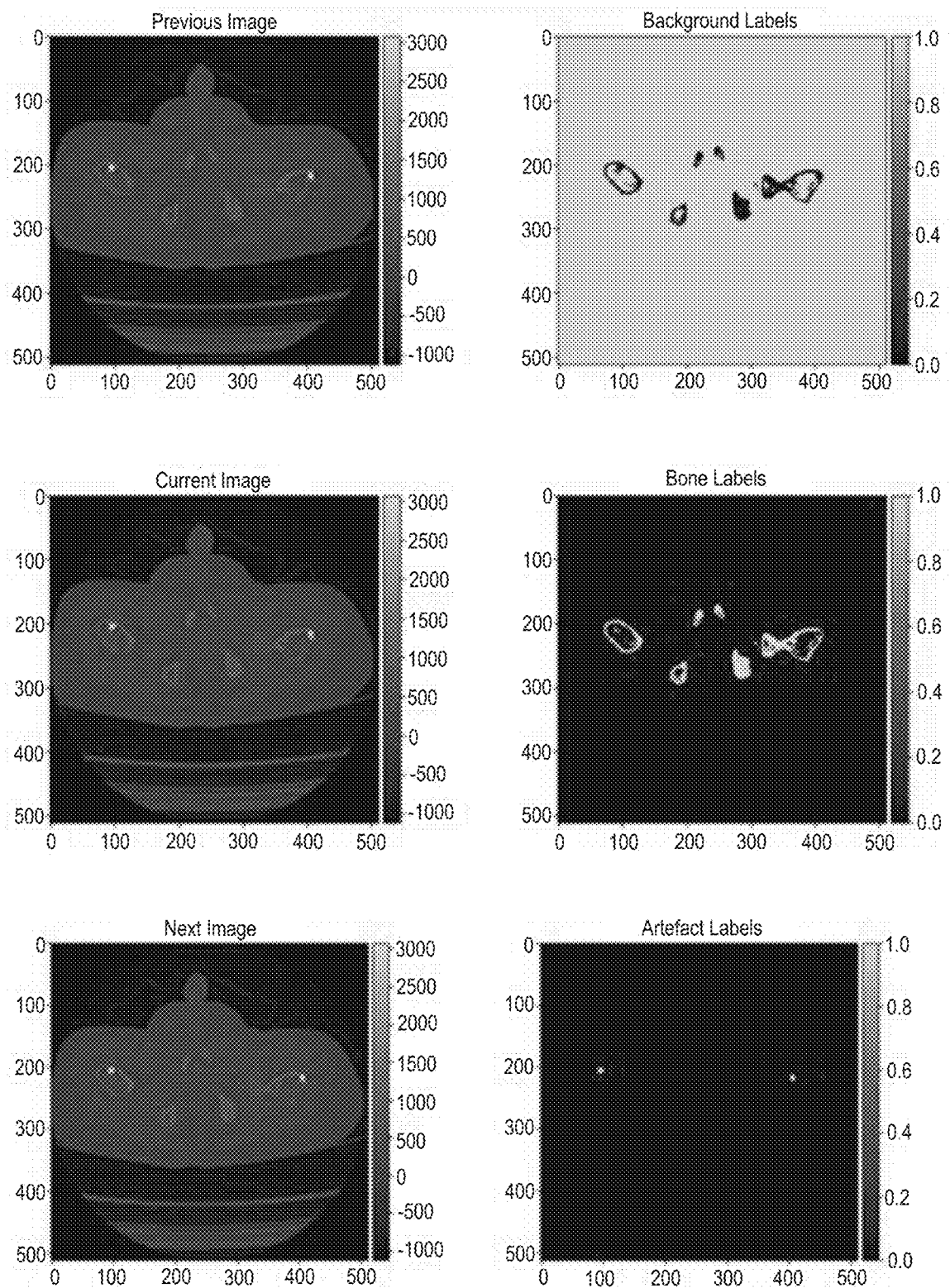
FIG. 36 illustrates various segmentations of bone within medical images for training purposes in accordance with some embodiments.

FIG. 36 illustrates various segmentations of bone within medical images using the multi-schema approach to ground truth data for training purposes, as described above. Similarly, Table 3 illustrates cardiac segmentation labelling schemas used with the multi-schema approach to ground truth data.

TABLE 3

Cardiac Segmentation Labelling Schemas

| Original Labels | Meaning | Cardiac | Cardiac Only |
|---|---|---|---|
| 0 | Background | 0 (background) | 0 (background) |
| 1 | External | 0 (background) | 0 (background) |
| 2 | Blood-flow | 1 (blood-flow) | 1 (blood-flow) |
| 3 | Myocardium | 2 (myocardium) | 2 (myocardium) |
| 4 | Artifact | 3 (artifact) | 0 (background) |
| 5 | Calcification | 4 (calcification) | 1 (blood-flow) |

Figure 37:
FIG. 37 illustrates various segmentations of a myocardium within medical images of ground truth data for training purposes in accordance with some embodiments.

FIG. 37 illustrates various segmentations of a myocardium within medical images of ground truth data for training purposes.

These same techniques for adapting label schemas may be used to define normal versus pathological tissues, or lack of tissue in some examples, which will allow semantic segmentation of a pathology as a region of interest, and further allow pathology specific workflows to be automatically started. Moreover, the multi-schema approach of the using multiple labels to differentiate anatomies and pathologies may be used to semantically label each anatomical feature of the human body. Examples of various schema labels may include, but are not limited to: Nasal; Lacrimal; Inferior Nasal Concha; Maxiallary; Zygomatic; Temporal; Palatine; Parietal; Malleus; Incus; Stapes; Frontal; Ethmoid; Vomer; Sphenoid; Mandible; Occipital; Rib 1; Rib 2; Rib 3; Rib 4; Rib 5; Rib 6; Rib 7; Rib 8 (False); Rib 9 (False); Rib 10 (False); Rib 11 (Floating); Rib 12 (Floating); Hyoid; Sternum; Cervical Vertebrae 1 (atlas); C2 (axis); C3; C4; C5; C6; C7; Thoracic Vertebrae 1; T2; T3; T4; T5; T6; T7; T8; T9; T10; T11; T12; Lumbar Vertebrae 1; L2; L3; L4; L5; Sacrum; Coccyx; Scapula; Clavicle; Humerus; Radius; Ulna; Scaphoid; Lunate; Triquetrum; Pisiform; Hamate; Capitate; Trapezoid; Trapezium; Metacarpal 1; Proximal Phalange 1; Distal Phalange 1; Metacarpal 2; Proximal Phalange 2; Middle Phalange 2; Distal Phalange 2; Metacarpal 3; Proximal Phalange 3; Middle Phalange 3; Distal Phalange 3; Metacarpal 4; Proximal Phalange 4; Middle Phalange 4; Distal Phalange 4; Metacarpal 5; Proximal Phalange 5; Middle Phalange 5; Distal Phalange 5; Hip (Ilium, Ischium, Pubis); Femur; Patella; Tibia; Fibula; Talus; Calcaneus; Navicular; Medial Cuneiform; Middle Cuneiform; Lateral Cuneiform; Cuboid; Metatarsal 1; Proximal Phalange 1; Distal Phalange 1; Metatarsal 2; Proximal Phalange 2; Middle Phalange 2; Distal Phalange 2; Metatarsal 3; Proximal Phalange 3; Middle Phalange 3; Distal Phalange 3; Metatarsal 4; Proximal Phalange 4; Middle Phalange 4; Distal Phalange 4; Metatarsal 5; Proximal Phalange 5; Middle Phalange 5; Distal Phalange 5; Circle of Willis; Anterior Cerebral Artery; Middle Cerebral Artery; Posterior Cerebral Artery; Lenticulostriate Arteries; brachiocephalic artery; right common carotid; right subclavian artery; vertebral artery; basilar artery; Posterior cerebral artery; posterior cerebral artery; posterior communicating artery; left common carotid artery; internal carotid artery (ICA); external carotid artery (ECA); left subclavian artery; right subclavian artery; internal thoracic artery; thyrocervical trunk; costocervical trunk; left subclavian artery; aorta; Vena Cava; axilla; axillary artery; brachial artery; radial artery; ulnar artery; descending aorta; thoracic aorta; abdominal aorta; hypogastric artery; external iliac artery; femoral artery; popliteal artery; anterior tibial artery; arteria *dorsalis* pedis; posterior tibial artery; tricuspid valve; pulmonary valve; mitral valve; aortic valve; Right Ventricle; Left ventricle; Right atrium; Left atrium; Left atrium; Liver; Kidney; Spleen; Bowel; Prostate; Cerebrum; Brainstem; Cerebellum; Pons; Medulla; Spinal cord; Frontal lobe; Parietal lobe; Occipital lobe; Temporal lobe; Right coronary artery; left main coronary; left anterior descending; left circumflex artery.

Hybrid data labeling for reinforced learning is provided. With a majority of machine learning models, creating a large corpus of data to train on is essential. With regard to segmentation algorithms for labeling DICOMS, as described herein, the ability to create large amounts of data for robust algorithms is limited by the resources of skilled engineers or imaging specialists. By utilizing the initial results of segmentation algorithms, the methods described herein may speed up the time it takes to create a large dataset. For example:

Time to segment a single image (no automation)=10 seconds;

Assumption for robust algorithms—100,000 labeled images;

100,000 images segmented sequentially would take ~278 hours of time;

In a theoretical worked example, wherein the model was trained four times and algorithm training was linear:

0-25,000—69 hours—train;
25,001-50,000 (25% completed by algorithm) 52 hours—retrain;
50,001-75,000 (50% completed by algorithm) 35 hours—retrain;
75,001-100,000 (75% completed by algorithm) 17 hours;
100,000 images segmented using hybrid of algorithm and skilled personnel—173 hours The above simplified examples indicates that the segmentation algorithm will be able to achieve the desired level of automation much faster with the aid of retraining. In addition, this may be taken one step further by retraining the algorithm after each dataset is added to the training set. This could be achieved by using cloud infrastructures and event driven serverless computing platforms, such as AWS Lambdas. Showing the user an updated set of labels after each retraining may dramatically reduce the time to create large amounts of data. Moreover, most medical image segmentation applications require a very high level of accuracy, and thus, the medical images may be used in their original full resolution. However, in cases where there is an inherent need to look at the whole, or most of the, 3D scan in order to detect a pathology, e.g., an aneurysm, most 2D based approaches would not be sufficient. Further, due to limitations in current hardware or prohibitive costs a 3D approach may not be applied to the full resolution scans.

Thus, the methods described herein may down-sample the review volume to find key features by using a D-Unet based architecture to segment the vasculature in CT scans, e.g., neuro CT scans. This architecture looks at small stacks of 2D images, e.g., 4 slices below and 4 slices above, thereby providing some small 3D contextual information. In the case of aneurysm detection, the current approach may not be sufficient to distinguish between aneurysm and healthy vessels as it looks at only a few 2D images at a time, which may not be enough to achieve the context needed to be able to correctly identify aneurysms. This is mainly because the texture and general appearance of aneurysms is indistinguishable from other vasculature when looked at in isolation, e.g. in a few 2D images.

Being able to automatically identify and potentially locate and measure aneurysms, clots, and occlusions may revolutionize neurosurgery and save lives. For example, the methods described herein may use more advanced methods that can look at the whole scan from a 3D perspective in order to differentiate these abnormalities from the rest of the vasculature. Accordingly, the methods described herein may implement a two-step approach where the first step identifies the vasculature in the stack of images using a full resolution approach, and then a separate model would look at a low resolution version of the scan in three dimensions in the second step. After obtaining the region where the aneurysm is in the low resolution volume, the region may be co-registered with the high resolution version, such that the aneurysm may be segmented from the general vasculature segmentation. This approach has a lot of potential for other high resolution 3D volume applications where there is a need to distinguish between similarly textured elements which require a much larger context in order to be correctly identified.

The preparation of images for the purposes of generating a model (physical or virtual) using real life medical images requires a certain amount of pre-filtering and improvement in order to generate an accurate model. Thus, a number of transformations must be performed to the images in order to dramatically improve the ultimate model quality. For example, interpolation of images may be very amenable as a large dataset of existing images may be used to train the algorithm. This type of problem is particularly suited to adversarial networks. Moreover, registration of images may be important as the number of cases that involve multiple scanning modalities is increasing, and this there may be a need to register CT→MRI images. For example, images from multiple scanning modalities may be registered by aligning two different datasets together, e.g., if a medical scan of a patient's head is provided and a tumor is wanted from an MRI scan and a bone is wanted from a CT scan, landmarks may be picked that are visible on both MRI and CT scan in order to register the pixels and voxels in the same position. Even MRI scans where the images have been taken in multiple perspectives/planes in a single session may require registration as the difference between the planes may produce significantly different views of the patient highlighting completely different aspects of the anatomy.

Focusing specifically on the integrations required to make the end-to-end possible rather than the individual processes themselves, the systems and methods described herein focuses on how to integrate data upstream and downstream of the platform. This area may include all the integrations downstream such as the Electronic Medical/Health Records. Moreover, information from the EMR (potentially to associate with outcomes later c.f. Prognosis Section) may be collated, which would also include any upstream integrations such as with couriers or printing bureaus. Key to the value in this area is the idea of provenance of the data and showing the digital thread of the production of the model from data ingress right through to the manufactured object/virtual object and beyond.

While various illustrative embodiments of the invention are described above, it will be apparent to one skilled in the art that various changes and modifications may be made therein without departing from the invention. The appended claims are intended to cover all such changes and modifications that fall within the true scope of the invention.

What is claimed:

1. A system for multi-schema analysis of patient specific anatomical features from medical images, the system comprising a server and configured to:
   receive medical images of a patient and metadata associated with the medical images indicative of a selected pathology;
   automatically segment the medical images to identify one or more patient specific anatomical features within the medical images;
   extract an isolated patient specific anatomical feature comprising the selected pathology from the one or more patient specific anatomical features based on the metadata;
   generate an isolated 3D surface mesh model defining a surface of the isolated patient specific anatomical feature; and
   provide a medical device to be used to treat the selected pathology based on physiological parameters of the isolated patient specific anatomical feature.

2. The system of claim 1, wherein the physiological parameters of the isolated anatomical feature comprise a size of the selected pathology, and wherein the medical device provided comprises a specific sized medical device for treating the selected pathology.

3. The system of claim 1, wherein the system is configured to generate physiological information associated with the selected pathology for the isolated 3D surface mesh model.

4. The system of claim 3, wherein the physiological information comprises a volume, cross-sectional area, diameter, centerline, surface, density, thickness, tortuosity, fracture size and location, blood clots, occlusions, and/or rate of growth over time of the anatomical feature and/or corresponding landmark.

5. The system of claim 1, wherein the system is configured to automatically segment the medical images to identify the one or more patient specific anatomical features via a segmentation algorithm programmed to label pixels of the medical images and an anatomical feature identification algorithm programmed to classify the one or more patient specific anatomical features within the medical images based on the labeled pixels.

6. The system of claim 1, wherein the medical device is selected for fixation to bone and to provide guidance for cutting planes.

7. The system of claim 1, wherein the medical device is selected for fixation to bone and to provide drilling trajectories within the bone.

8. The system of claim 1, wherein the medical device is selected based on a surgical procedure to be performed on the isolated patient specific anatomical feature to treat the selected pathology.

9. The system of claim 8, wherein the surgical procedure comprises placement of bone fragments, tools, implants, holes, and/or screws, cutting, and/or bone realignment.

10. The system of claim 1, wherein the medical device is selectable from a hospital inventory of available medical devices.

11. The system of claim 1, wherein the system is configured to:
access a medical device database having knowledge of various medical devices, the knowledge comprising function and/or specifications of the various medical devices,
wherein the medical device is selectable from a list of medical devices extracted from the medical device database.

12. The system of claim 1, wherein the system is configured to:
access a surgical implement database having knowledge of pathology-specific treatment options,
wherein the medical device is selectable from a list of medical devices extracted from the surgical implement database.

13. The system of claim 1, wherein the system is configured to provide the medical device by providing a 3D digital model of the medical device specific to the physiological parameters of the isolated patient specific anatomical feature.

14. The system of claim 13, wherein the system is configured to:
receive patient demographic data,
wherein the 3D digital model of the medical device is provided based at least partially on the patient demographic data.

15. The system of claim 13, wherein the system is configured to cause a display to display the 3D digital model of the medical device.

16. The system of claim 15, wherein the display comprises a graphical user interface, and wherein the system is configured to permit a user to move the 3D digital model of the medical device relative to the isolated patient specific anatomical feature via the graphical user interface to position the 3D digital model of the medical device at a target location relative to the isolated patient specific anatomical feature.

17. The system of claim 16, wherein the system is configured to display one or more anatomical landmarks associated with the isolated patient specific anatomical feature, the one or more anatomical landmarks configured to serve as a guide for positioning of the 3D digital model of the medical device at the target location.

18. The system of claim 16, wherein the system is configured to fuse the 3D digital model of the medical device with the isolated patient specific anatomical feature such that a fitting surface of the 3D digital model matches a surface contour of the isolated patient specific anatomical feature at the target location.

19. The system of claim 1, wherein the system is further configured to cause the 3D digital model to be 3D printed to generate a physical, patient specific medical device.

20. The system of claim 19, wherein the physical, patient-specific medical device is a cutting guide, pin guide, occlusion device, mitral valve implant, aortic valve implant, stent, coil, clip, fusion plate, or joint replacement implant.

21. A method for multi-schema analysis of patient specific anatomical features from medical images, the method comprising:
receiving medical images of a patient and metadata associated with the medical images indicative of a selected pathology;
automatically segmenting the medical images to identify one or more patient specific anatomical features within the medical images;
extracting an isolated patient specific anatomical feature comprising the selected pathology from the one or more patient specific anatomical features based on the metadata;
generating an isolated 3D surface mesh model defining a surface of the isolated patient specific anatomical feature; and
providing a medical device to be used to treat the selected pathology based on physiological parameters of the isolated patient specific anatomical feature.

22. The method of claim 21, wherein the physiological parameters of the isolated anatomical feature comprise a size of the selected pathology, and wherein the medical device provided comprises a specific sized medical device for treating the selected pathology.

23. The method of claim 21, wherein automatically segmenting the medical images to identify the one or more patient specific anatomical features comprises executing a segmentation algorithm programmed to label pixels of the medical images and an anatomical feature identification algorithm programmed to classify the one or more patient specific anatomical features within the medical images based on the labeled pixels.

24. The method of claim 21, wherein the medical device is selected for fixation to bone and to provide guidance for cutting planes, selected for fixation to bone and to provide drilling trajectories within the bone, and/or selected based on a surgical procedure to be performed on the isolated patient specific anatomical feature to treat the selected pathology.

25. The method of claim 21, wherein providing the medical device comprises providing a 3D digital model of the medical device specific to the physiological parameters of the isolated patient specific anatomical feature.

26. The method of claim 25, further comprising:
  causing a graphical user interface to display the 3D digital model of the medical device; and
  permitting, via the graphical user interface, a user to move the 3D digital model of the medical device relative to the isolated patient specific anatomical feature to position the 3D digital model of the medical device at a target location relative to the isolated patient specific anatomical feature.

27. The method of claim 26, further comprising causing the graphical user interface to display one or more anatomical landmarks associated with the isolated patient specific anatomical feature, the one or more anatomical landmarks configured to serve as a guide for positioning of the 3D digital model of the medical device at the target location.

28. The method of claim 25, further comprising fusing the 3D digital model of the medical device with the isolated patient specific anatomical feature such that a fitting surface of the 3D digital model matches a surface contour of the isolated patient specific anatomical feature at the target location.

29. The method of claim 25, further comprising 3D printing the 3D digital model to generate a physical, patient specific medical device.

30. The method of claim 29, wherein the physical, patient-specific medical device is a cutting guide, pin guide, occlusion device, mitral valve implant, aortic valve implant, stent, coil, clip, fusion plate, or joint replacement implant.

* * * * *